(12) United States Patent
Ko et al.

(10) Patent No.: US 12,273,566 B2
(45) Date of Patent: Apr. 8, 2025

(54) METHOD AND DEVICE FOR PROCESSING VIDEO SIGNAL BY USING SUBBLOCK-BASED MOTION COMPENSATION

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Anyang-Si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 98 days.

(21) Appl. No.: 18/360,645

(22) Filed: Jul. 27, 2023

(65) Prior Publication Data

US 2024/0040156 A1    Feb. 1, 2024

Related U.S. Application Data

(63) Continuation of application No. 17/234,688, filed on Apr. 19, 2021, now abandoned, which is a
(Continued)

(30) Foreign Application Priority Data

Oct. 23, 2018  (KR) .................. 10-2018-0126782
Nov. 9, 2018   (KR) .................. 10-2018-0137704
(Continued)

(51) Int. Cl.
*H04N 19/70*     (2014.01)
*H04N 19/159*    (2014.01)
(Continued)

(52) U.S. Cl.
CPC .......... *H04N 19/70* (2014.11); *H04N 19/159* (2014.11); *H04N 19/176* (2014.11); *H04N 19/52* (2014.11)

(58) Field of Classification Search
CPC .... H04N 19/70; H04N 19/159; H04N 19/176; H04N 19/52
See application file for complete search history.

(56) References Cited

U.S. PATENT DOCUMENTS

| 10,869,050 B2 | 12/2020 | Li et al. |
| 11,172,204 B2 | 11/2021 | Jeong |
| | (Continued) | |

FOREIGN PATENT DOCUMENTS

| CN | 107113424 A | 8/2017 |
| CN | 107925758 A | 4/2018 |
| | (Continued) | |

OTHER PUBLICATIONS

International Search Report of the International Searching Authority_PCT/KR2019/014016_Feb. 11, 2020.
(Continued)

*Primary Examiner* — Jonathan R Messmore

(57) ABSTRACT

A video signal processing method may comprise the steps of: acquiring a first syntax element indicating whether a subblock-based merging mode is applied to a current block; acquiring a second syntax element indicating whether a merging mode using motion vector difference is applied to the current block, when the first syntax element indicates that the subblock-based merging mode is not applied to the current block; and acquiring a third syntax element indicating a candidate to be used in inter-prediction for the current block, among candidates contained in a mergence candidate list for the current block, when the second syntax element
(Continued)

| | Descriptor |
|---|---|
| mmvd_idx_coding( x0, y0 ) { | |
|   if( MaxNumMergeCand > 1 ) | |
|     base_mv_idx[ x0 ][ y0 ] | ae(v) |
|     distance_idx[ x0 ][ y0 ] | ae(v) |
|     direction_idx[ x0 ][ y0 ] | ae(v) |
| } | | indicates that the merging mode using motion vector difference is applied to the current block.

7 Claims, 27 Drawing Sheets

Related U.S. Application Data continuation of application No. PCT/KR2019/014016, filed on Oct. 23, 2019.

(30) Foreign Application Priority Data

| Jan. 2, 2019 | (KR) | 10-2019-0000479 |
| Feb. 13, 2019 | (KR) | 10-2019-0016537 |

(51) Int. Cl.
*H04N 19/176* (2014.01)
*H04N 19/52* (2014.01)

(56) References Cited

U.S. PATENT DOCUMENTS

| 2012/0257678 | A1 | 10/2012 | Zhou et al. |
| 2012/0328209 | A1 | 12/2012 | Sasai et al. |
| 2013/0070855 | A1 | 3/2013 | Zheng et al. |
| 2013/0343455 | A1 | 12/2013 | Yamamoto |
| 2017/0142418 | A1 | 5/2017 | Li et al. |
| 2018/0220149 | A1 | 8/2018 | Son et al. |
| 2018/0310017 | A1 | 10/2018 | Chen |
| 2020/0154124 | A1 | 5/2020 | Lee |
| 2020/0374528 | A1 | 11/2020 | Huang et al. |

FOREIGN PATENT DOCUMENTS

| CN | 108432250 | A | 8/2018 |
| KR | 10-2013-0050407 | A | 5/2013 |
| KR | 1020180000303 | A | 1/2018 |
| KR | 1020180007345 | A | 1/2018 |
| KR | 20200084300 | A | 7/2020 |
| TW | 201817238 | A | 5/2018 |
| WO | 2017039117 | A1 | 3/2017 |
| WO | 2017-171107 | A1 | 10/2017 |
| WO | 2018-066927 | A1 | 4/2018 |
| WO | 2020227678 | A1 | 11/2020 |

OTHER PUBLICATIONS

Written Opinion of the International Searching Authoriity_PCT/KR2019/014016_ Feb. 11, 2020.
Han. Yu et al. CE4.2.16: Sub-block merge candidates in BMS and JEM. Joint Video Exploration Team (JVET) of ITU-T SG 16 WP 3 and [SO/IEC JTC 1/SC 29/WG I I. JVET-K0338. 11th Meeting: Ljubljana, SI. pp. 1-5, Jul. 18, 2018 [Retrieved on Jan. 6, 2020 J, Retrieved from [URL:http://phenix.int-evry.fr/jvet/] See pp. i-5.
Yu, Ruoyang et al. Non-CE4: On maximum number of subblock merge candidates. Joint Video Experts Team (JVET) of ITU-T SG 16 WP 3 and ISO/IEC JTC 1/SC 29/WG 11. JVET-00220. 5th Meeting. Gothenburg, SE. pp. 1-3, Jul. 12, 2019 [Retrieved on Jan. 6, 2020], Retrieved from [URL: http://phenix.int-evry.fr/jvet/] See pp. 1-3.
Office Action from Intellectual Property India for Application No. 202127019359 Dated Feb. 17, 2022.
Office Action from Japanese Intellectual Property Office for Japanese Patent Application No. 2021-521968 Dated Apr. 20, 2022.
Y. Chen, et al., Description of SDR, HDR and 360° video coding technology proposal considering mobile application scenario by Samsung, Huawei, GoPro, and HiSilicon, Joint Video Exploration Team (JVET) of ITU-TSG 16 WP 3 and ISO/IEC JTC 1/SC 29/WG 11,JVET-J0024_v2, Apr. 13, 2018.
JVET-J0024 (PPT)Description of SDR, HDR and 360° video coding technology proposal by Samsung, Huawei, GoPro, and HiSilicon—mobile application scenario Apr. 11, 2018.
JVET-J0024 and JVET-J0025 (PPT) Description of 360° video coding technology proposal by Samsung, Huawei, GoPro, and HiSilicon Apr. 13, 2018.
JVET-J0024_01_SDR_optimize.xlsm Reference: HM16.16 Reference2:JEM7.0 Tested:JVET-J0024_Set2 Note: BD-rate and BD-PSNR is computed using piece-wise cubic interpolation.
Seungsoo Jeong, et al.,CE4 Ultimate motion vector expression in J0024 (Test 4.2.9), Joint Video Exploration Team (JVET) of ITU-T SG 16 WP 3 and ISO/IEC JTC 1/SC29/WG 11, JVET-K0115-v4, Jul. 12, 2018.
Tomonori Hashimoto Eiichi Sasaki Tomohiro Ikai,Non-CE4: Enhanced ultimate motion vector expression, Joint Video Exploration Team (JVET) of ITU-T SG 16 WP 3 and ISO/IEC JTC 1/SC 29/WG 11,JVET-L0355, Sep. 25, 2018.
The extended European search report for EP Application No. 198757569. Dated Jun. 20, 2022.
Yang (Huawei) H: "BoG report on CE4 related contributions", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0691, Oct. 8, 2018 (Oct. 8, 2018), XP030190572, Retrieved from the Internet: URL: http://phenix.int-evry.fr/jvet/doc_end_user/documents/12_Macao/wg11/JVET-L0691-v1.zip JVET-L0691-v1.docx [retrieved on Oct. 8, 2018].
Yang (Huawei) H et al: "Description of Core Experiment 4 (CE4) : Inter prediction and motion vectior coding", 11. JVET Meeting; Jul. 11, 2018-Jul. 18, 2018; Ljubljana; (The Joint Video Exploartaion Team of ISO/IEC JTC1/SC29/WG11 and ITU-T SG.16), No. JVET-K1024, Aug. 9, 2018 (Aug. 9, 2018), XP030249799, Retrieved from the Internet: URL: http://phenix.int-evry.fr/jvet/doc_end_user/documents/11_Ljubljana/wg11/JVET-K1024-v2.zip JVET-K1024-v2.docx [retrieved on Aug. 9, 2018].
Ko (Wilusgroup) G et al: "Non-CE4: Modification of merge data syntax", 13. JVET Meeting; Jan. 9, 2019-Jan. 18, 2019; Marrakech; (The Joint Video Exploration Team of ISO/IEC JTC1/SC29/WG11 and ITU-T SG.16), No. JVET-M0359, Jan. 11, 2019 (Jan. 11, 2019), XP030201535, Retrieved from the Internet: URL:http://phenix.int-evry.fr/jvet/doc_end_user/documents/13_Marrakech/wg11/JVET-M0359-v2.zip JVET-M0359-v2.docx [retrieved on Jan. 11, 2019].
"CE4 Ultimate motion vector expression (Test 4.5.4)" Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0054.
"Proposed WD for CE4 Ultimate motion vector expression (Test 4.5.4)" Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0054_WD.
"CE4-related: Combination of affine mode clean up and line buffer reduction" Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0694-v3.
"Versatile Video Coding (Draft 2)" Joint Video Experts Team (JVET) of ITU-T SG 16 WP 3 and ISO/IEC JTC 1/SC 29/ WG 11 11th Meeting: Ljubljana, SI, Jul. 10-18, 2018. Document: JVET-K1001-v7.
Written Decision on Registration. KR Application No. 10-2021-7012537. Mailed on Mar. 31, 2023.
Office Action on EP Application No. 19 875 756.9-1208. Mailed Mar. 28, 2023.
Notice of Allowance for CN Patent Application No. 201980069820.7 from China National Intellectual Property Administration. Date of Issue: Jul. 6, 2023.
(Joint Video Experts Team (JVET] of ITU-T SG16WP3 and ISO/IEC JTC 1/SC 29/WG 11 12th Meeting: Macao, CN, Oct. 3-12, 2018, Sep. 25, 2018, Huanbang Chen, CE4: Symmetrical MVD mode (Test 4.5.1).
Non-Final Rejection for U.S. Appl. No. 17/234,688 from USPTO dated Nov. 4, 2022.
Notice of Allowance or U.S. Appl. No. 17/234,688 from USPTO dated Apr. 24, 2023.

(56) References Cited

OTHER PUBLICATIONS

Notice of Allowance for U.S. Appl. No. 17/234,688 from USPTO dated Feb. 12, 2024.
Request for the Submission of an Opinion for KR Application No. 10-2023-7021844 from KIPO. Dated Jan. 9, 2024.
Notice of Allowance from Japanese Intellectual Property Office for Japanese Patent Application No. 2022-212171 Dated Oct. 27, 2023. Title: A video signal processing method and apparatus using the compensation of block-based motion.
Seungsoo Jeong, et al. Title: Proposed WD for CE4 Ultimate motion vector expression (Test 4.5.4), Joint Video Experts Team (JVET) of ITU-T SG 16 WP 3 and ISO/IEC JTC 1/SC 29/WG 11, JVET-L0054_WD, 12th Meeting: Macao, CN, Oct. 3-12, 2018.
Geonjung Ko, et al. Title: CE4-1.3: Modification of merge data syntax, Joint Video Experts Team (JVET) of ITU-T SG 16 WP 3 and ISO/IEC JTC 1/SC 29/WG 11, JVET-N0237, 14th Meeting: Geneva, CH, Mar. 19-27, 2019.
Office Action on EP Application No. 19 875 756.9-1208. Mailed Nov. 15, 2023.

| Base candidate ID X | 0 | 1 | 2 | 3 |
|---|---|---|---|---|
| Nth MVP | 1st MVP | 2nd MVP | 3rd MVP | 4th MVP |

(a)

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

(b)

| Direction IDX | 00 | 01 | 10 | 11 |
|---|---|---|---|---|
| x-axis | + | − | N/A | N/A |
| y-axis | N/A | N/A | + | − |

(c)

| coding_unit( x0, y0, cbWidth, cbHeight, treeType ) { | Descriptor |
|---|---|
| /* MODE_INTER */ | |
| if( cu_skip_flag[ x0 ][ y0 ] ) { | |
|   if( parsing_condition_subblock_merge_flag ) | |
|     subblock_merge_flag[ x0 ][ y0 ] | ae(v) |
|   if( subblock_merge_flag[ x0 ][ y0 ] == 1 ) { // subblock merge } | |
|   else { // (subblock_merge_flag[ x0 ][ y0 ] == 0 ) | |
|     mmvd_flag[ x0 ][ y0 ] | ae(v) |
|     if( mmvd_flag[ x0 ][ y0 ] == 1 ) | |
|       mmvd_idx_coding ( x0, y0) | |
|     else if( MaxNumMergeCand > 1 ) | |
|       merge_idx[ x0 ][ y0 ] | ae(v) |
|   } | |
| } else { | |
|   merge_flag[ x0 ][ y0 ] | ae(v) |
|   if( merge_flag[ x0 ][ y0 ] ) { | |
|     if( parsing_condition_subblock_merge_flag ) | |
|       subblock_merge_flag[ x0 ][ y0 ] | ae(v) |
|     if( subblock_merge_flag[ x0 ][ y0 ] == 1 ) { // subblock merge } | |
|     else { // (subblock_merge_flag[ x0 ][ y0 ] == 0 ) | |
|       mmvd_flag[ x0 ][ y0 ] | ae(v) |
|       if( mmvd_flag[ x0 ][ y0 ] == 1 ) | |
|         mmvd_idx_coding ( x0, y0) | |
|       else if( MaxNumMergeCand > 1 ) | |
|         merge_idx[ x0 ][ y0 ] | ae(v) |
|     } | |
|   } else { | |
|     // inter, AMVP, affine inter | |
|   } | |
| } | |
| } | |

*FIG. 22*

| mmvd_idx_coding ( x0, y0 ) { | Descriptor |
|---|---|
|   base_mv_idx[ x0 ][ y0 ] | ae(v) |
|   distance_idx[ x0 ][ y0 ] | ae(v) |
|   direction_idx[ x0 ][ y0 ] | ae(v) |
| } | |

*FIG. 23*

| mmvd_idx_coding ( x0, y0 ) { | Descriptor |
|---|---|
|   if( MaxNumMergeCand > 1 ) | |
|     base_mv_idx[ x0 ][ y0 ] | ae(v) |
|   distance_idx[ x0 ][ y0 ] | ae(v) |
|   direction_idx[ x0 ][ y0 ] | ae(v) |
| } | |

*FIG. 24*

| | Descriptor |
|---|---|
| coding_unit( x0, y0, cbWidth, cbHeight, treeType ) { | |
| /* MODE_INTER */ | |
| if( cu_skip_flag[ x0 ][ y0 ] ) { | |
| // subblock merge | |
| if( subblock_merge_flag[ x0 ][ y0 ] == 0 && MaxNumMergeCand > 1 ) | |
|     merge_idx[ x0 ][ y0 ] | ae(v) |
| if( merge_idx[ x0 ][ y0 ] < num_mmvd_baseCand ) | |
|     mmvd_flag[ x0 ][ y0 ] | ae(v) |
| if( mmvd_flag[ x0 ][ y0 ] == 1 ) { | |
|     distance_idx[ x0 ][ y0 ] | ae(v) |
|     direction_idx[ x0 ][ y0 ] | ae(v) |
| } | |
| } else { | |
| merge_flag[ x0 ][ y0 ] | ae(v) |
| if( merge_flag[ x0 ][ y0 ] ) { | |
| // subblock merge | |
| if( subblock_merge_flag[ x0 ][ y0 ] == 0 && MaxNumMergeCand > 1 ) | |
|     merge_idx[ x0 ][ y0 ] | ae(v) |
| if( merge_idx[ x0 ][ y0 ] < num_mmvd_baseCand ) | |
|     mmvd_flag[ x0 ][ y0 ] | ae(v) |
| if( mmvd_flag[ x0 ][ y0 ] == 1 ) { | |
|     distance_idx[ x0 ][ y0 ] | ae(v) |
|     direction_idx[ x0 ][ y0 ] | ae(v) |
| } | |
| } else { | |
| // inter AMVP, affine inter | |
| } | |
| } | |
| } | |
| } | |

*FIG. 25*

| coding_unit( x0, y0, cbWidth, cbHeight, treeType ) { | Descriptor |
|---|---|
| /* MODE_INTER */ | |
|   if( cu_skip_flag[ x0 ][ y0 ] ) { | |
|     // subblock merge | |
|     if( subblock_merge_flag[ x0 ][ y0 ] = = 0 ) { | |
|       mmvd_flag[ x0 ][ y0 ] | ae(v) |
|       if( mmvd_flag[ x0 ][ y0 ] = = 1 ) | |
|         mmvd_idx_coding( x0, y0 ) | |
|       else if( MaxNumMergeCand > 1 ) | |
|         merge_idx[ x0 ][ y0 ] | ae(v) |
|     } | |
|   } else { | |
|     mmvd_flag[ x0 ][ y0 ] | ae(v) |
|     if( mmvd_flag[ x0 ][ y0 ] ) { | |
|       mmvd_idx_coding( x0, y0 ) | |
|     else { | |
|       merge_flag[ x0 ][ y0 ] | ae(v) |
|       // subblock merge | |
|       if( subblock_merge_flag[ x0 ][ y0 ] = = 0 && MaxNumMergeCand > 1 ) | |
|         merge_idx[ x0 ][ y0 ] | ae(v) |
|     } | |
|     if( merge_flag[ x0 ][ y0 ] ) { | |
|       // inter, AMVP, affine inter | |
|     } | |
|   } | |
|   } | |
| } | |

*FIG. 26*

| coding_unit( x0, y0, cbWidth, cbHeight, treeType ) { | Descriptor |
|---|---|
| /* MODE_INTER */ | |
| if( cu_skip_flag[ x0 ][ y0 ] ) { | |
| // subblock merge | |
| if( subblock_merge_flag[ x0 ][ y0 ] == 0 && MaxNumMergeCand > 1 ) | |
| merge_idx[ x0 ][ y0 ] | ae(v) |
| if( merge_idx[ x0 ][ y0 ] < num_mmvd_baseCand ) { | |
| distance_idx[ x0 ][ y0 ] | ae(v) |
| direction_idx[ x0 ][ y0 ] | ae(v) |
| } | |
| } else { | |
| merge_flag[ x0 ][ y0 ] | ae(v) |
| if( merge_flag[ x0 ][ y0 ] ) { | |
| // subblock merge | |
| if( subblock_merge_flag[ x0 ][ y0 ] == 0 && MaxNumMergeCand > 1 ) | |
| merge_idx[ x0 ][ y0 ] | ae(v) |
| if( merge_idx[ x0 ][ y0 ] < num_mmvd_baseCand ) { | |
| distance_idx[ x0 ][ y0 ] | ae(v) |
| direction_idx[ x0 ][ y0 ] | ae(v) |
| } | |
| } else { | |
| // inter, AMVP, affine inter | |
| } | |
| } | |
| } | |
| } | |

*FIG. 27*

| coding_unit( x0, y0, cbWidth, cbHeight, treeType ) { | Descriptor |
|---|---|
| /* MODE_INTER */ | |
| if( cu_skip_flag[ x0 ][ y0 ] ) { | |
|   mmvd_flag[ x0 ][ y0 ] | ae(v) |
|   if( mmvd_flag[ x0 ][ y0 ] ) | |
|     mmvd_idx_coding ( x0, y0 ) | |
|   else { | |
|     // subblock merge | |
|     if( subblock_merge_flag[ x0 ][ y0 ] = = 0 && MaxNumMergeCand > 1 ) | |
|       merge_idx[ x0 ][ y0 ] | ae(v) |
|   } | |
| } else { | |
|   mmvd_flag[ x0 ][ y0 ] | ae(v) |
|   if( mmvd_flag[ x0 ][ y0 ] ) | |
|     mmvd_idx_coding ( x0, y0 ) | |
|   else { | |
|     merge_flag[ x0 ][ y0 ] | ae(v) |
|     // subblock merge | |
|     if( subblock_merge_flag[ x0 ][ y0 ] = = 0 && MaxNumMergeCand > 1 && merge_flag[ x0 ][ y0 ] = = 1 ) | |
|       merge_idx[ x0 ][ y0 ] | ae(v) |
|   } | |
|   if( merge_flag[ x0 ][ y0 ] = = 0 ) { | |
|     // inter, AMVP, affine inter | |
|     } | |
|   } | |
| } | |
| } | |

*FIG. 28*

| coding_unit( x0, y0, cbWidth, cbHeight, treeType ) { | Descriptor |
|---|---|
| /* MODE_INTER */ | |
| if( cu_skip_flag[ x0 ][ y0 ] ) { | |
| // subblock merge | |
| if( subblock_merge_flag[ x0 ][ y0 ] = = 0 && MaxNumMergeCand > 1 ) | |
| merge_idx[ x0 ][ y0 ] | ae(v) |
| if( merge_idx[ x0 ][ y0 ] < num_mmvd_baseCand ) | |
| mmvd_flag[ x0 ][ y0 ] | ae(v) |
| if( mmvd_flag[ x0 ][ y0 ] ) { | |
| distance_idx[ x0 ][ y0 ] | ae(v) |
| direction_idx[ x0 ][ y0 ] | ae(v) |
| } | |
| } else { | |
| if( MaxNumMergeCand > 1 ) | |
| merge_idx[ x0 ][ y0 ] | ae(v) |
| if( merge_idx[ x0 ][ y0 ] < num_mmvd_baseCand ) | |
| mmvd_flag[ x0 ][ y0 ] | ae(v) |
| if( mmvd_flag[ x0 ][ y0 ] ) { | |
| distance_idx[ x0 ][ y0 ] | ae(v) |
| direction_idx[ x0 ][ y0 ] | ae(v) |
| } else { | |
| merge_flag[ x0 ][ y0 ] | ae(v) |
| if( merge_flag[ x0 ][ y0 ] ) { | |
| // merge, subblock merge | |
| } else { | |
| // inter, AMVP, affine inter | |
| } | |
| } | |
| } | |
| } | |
| } | |

*FIG. 29*

| | Descriptor |
|---|---|
| merge_data( x0, y0, cbWidth, cbHeight ) { | |
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | ae(v) |
|   } else { | |
|     if( sps_mh_intra_enabled_flag && cu_skip_flag[ x0 ][ y0 ] == 0 && | |
|       ( cbWidth * cbHeight ) >= 64 && cbWidth < 128 && cbHeight < 128 ) { | |
|       mh_intra_flag[ x0 ][ y0 ] | ae(v) |
|       if( mh_intra_flag[ x0 ][ y0 ] ) { | |
|         if ( cbWidth <= 2 * cbHeight || cbHeight <= 2 * cbWidth ) | |
|           mh_intra_luma_mpm_flag[ x0 ][ y0 ] | ae(v) |
|         if( mh_intra_luma_mpm_flag[ x0 ][ y0 ] ) | |
|           mh_intra_luma_mpm_idx[ x0 ][ y0 ] | ae(v) |
|       } | |
|     } | |
|     if( sps_triangle_enabled_flag && slice_type == B && cbWidth * cbHeight >= 16 ) | |
|       merge_triangle_flag[ x0 ][ y0 ] | ae(v) |
|     if( merge_triangle_flag[ x0 ][ y0 ] ) | |
|       merge_triangle_idx[ x0 ][ y0 ] | ae(v) |
|     else if( MaxNumMergeCand > 1 ) | |
|       merge_idx[ x0 ][ y0 ] | ae(v) |
|     If( merge_idx[ x0 ][ y0 ] < 2 && !mh_intra_flag[ x0 ][ y0 ] && !merge_triangle_flag[ x0 ][ y0 ] ) { | |
|       mmvd_flag[ x0 ][ y0 ] | ae(v) |
|       if( mmvd_flag[ x0 ][ y0 ] == 1 ) { | |
|         mmvd_distance_idx[ x0 ][ y0 ] | ae(v) |
|         mmvd_direction_idx[ x0 ][ y0 ] | ae(v) |
|       } | |
|     } | |
|   } | |
| } | |

*FIG. 30*

| merge_data( x0, y0, cbWidth, cbHeight ) { | Descriptor |
|---|---|
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | ae(v) |
|   } else { | |
|     if( sps_mh_intra_enabled_flag && cu_skip_flag[ x0 ][ y0 ] == 0 && | |
|       ( cbWidth * cbHeight ) >= 64 && cbWidth < 128 && cbHeight < 128 ) { | |
|       mh_intra_flag[ x0 ][ y0 ] | ae(v) |
|       if( mh_intra_flag[ x0 ][ y0 ] ) { | |
|         if ( cbWidth <= 2 * cbHeight || cbHeight <= 2 * cbWidth ) | |
|           mh_intra_luma_mpm_flag[ x0 ][ y0 ] | ae(v) |
|         if( mh_intra_luma_mpm_flag[ x0 ][ y0 ] ) | |
|           mh_intra_luma_mpm_idx[ x0 ][ y0 ] | ae(v) |
|       } | |
|     } | |
|     if( sps_triangle_enabled_flag && slice_type == B && cbWidth * cbHeight >= 16 ) | |
|       merge_triangle_flag[ x0 ][ y0 ] | ae(v) |
|     if( merge_triangle_flag[ x0 ][ y0 ] ) | |
|       merge_triangle_idx[ x0 ][ y0 ] | ae(v) |
|     if( !mh_intra_flag[ x0 ][ y0 ] && !merge_triangle_flag[ x0 ][ y0 ] ) { | |
|       mmvd_flag[ x0 ][ y0 ] | ae(v) |
|       if( mmvd_flag[ x0 ][ y0 ] == 1 ) { | |
|         mmvd_merge_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else if( MaxNumMergeCand > 1 ) { | |
|         merge_idx[ x0 ][ y0 ] | ae(v) |
|       } | |
|     } | |
|   } | |
| } | |

*FIG. 31*

| merge_data( x0, y0, cbWidth, cbHeight ) { | Descriptor |
|---|---|
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] == 1 ) { | |
|     if( MaxNumSubblockMergeCand > 1 ) | |
|       merge_subblock_idx[ x0 ][ y0 ] | ae(v) |
|   } else { | |
|     if( sps_mh_intra_enabled_flag && cu_skip_flag[ x0 ][ y0 ] == 0 && | |
|       ( cbWidth * cbHeight ) >= 64 && cbWidth < 128 && cbHeight < 128 ) { | |
|       mh_intra_flag[ x0 ][ y0 ] | ae(v) |
|       if( mh_intra_flag[ x0 ][ y0 ] ) { | |
|         if ( cbWidth <= 2 * cbHeight || cbHeight <= 2 * cbWidth ) | |
|           mh_intra_luma_mpm_flag[ x0 ][ y0 ] | ae(v) |
|         if( mh_intra_luma_mpm_flag[ x0 ][ y0 ] ) | |
|           mh_intra_luma_mpm_idx[ x0 ][ y0 ] | ae(v) |
|       } | |
|     } | |
|     if( sps_triangle_enabled_flag && slice_type == B && cbWidth * cbHeight >= 16 && !mh_intra_flag[ x0 ][ y0 ] ) | |
|       merge_triangle_flag[ x0 ][ y0 ] | ae(v) |
|     if( merge_triangle_flag[ x0 ][ y0 ] ) | |
|       merge_triangle_idx[ x0 ][ y0 ] | ae(v) |
|     else if( MaxNumMergeCand > 1 ) | |
|       merge_idx[ x0 ][ y0 ] | ae(v) |
|     if( merge_idx[ x0 ][ y0 ] < 2 && !mh_intra_flag[ x0 ][ y0 ] && !merge_triangle_flag[ x0 ][ y0 ] ) { | |
|       mmvd_flag[ x0 ][ y0 ] | ae(v) |
|       if( mmvd_flag[ x0 ][ y0 ] == 1 ) { | |
|         mmvd_distance_idx[ x0 ][ y0 ] | ae(v) |
|         mmvd_direction_idx[ x0 ][ y0 ] | ae(v) |
|       } | |
|     } | |
|   } | |
| } | |

*FIG. 32*

METHOD AND DEVICE FOR PROCESSING VIDEO SIGNAL BY USING SUBBLOCK-BASED MOTION COMPENSATION

CROSS-REFERENCE TO RELATED APPLICATIONS

This application is a continuation of U.S. application Ser. No. 17/234,688, which was filed on Apr. 19, 2021, and which is a continuation of pending PCT International Application No. PCT/KR2019/014016, which was filed on Oct. 23, 2019, and which claims priority from and the benefit of Korean Patent Application 10-2018-0126782, filed with the Korean Intellectual Property Office on Oct. 23, 2018, Korean Patent Application 10-2018-0137704, filed with the Korean Intellectual Property Office on Nov. 9, 2018, Korean Patent Application 10-2019-0000479, filed with the Korean Intellectual Property Office on Jan. 2, 2019, and Korean Patent Application 10-2019-0016537, filed with the Korean Intellectual Property Office on Feb. 13, 2019 the disclosure of which are hereby incorporated by reference in its entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE

Technical Problem

An aspect of the present invention is to increase coding efficiency of a video signal. Another aspect of the present invention is to provide a method of efficiently performing subblock-based motion compensation. Further, a motion compensation method based on a merge mode with Motion Vector Difference (MVD) is provided.

Technical Solution

In order to solve the problem, the present invention provides a video signal processing apparatus and a video signal processing method.

According to an embodiment of the present invention, a method of processing a video signal includes: acquiring a first syntax element indicating whether a subblock-based merge mode is applied to a current block; when the first syntax element indicates that the subblock-based merge mode is not applied to the current block, acquiring a second syntax element indicating whether a merge mode using a motion vector difference is applied to the current block; when the second syntax element indicates that the merge mode using the motion vector difference is applied to the current block, acquiring a third syntax element indicating a candidate used for inter prediction of the current block among candidates included in a merge candidate list of the current block; acquiring information related to the motion vector difference; inducing a motion vector of the current block by adding the motion vector difference to a motion vector of the candidate indicated by the third syntax element; and generating a predicted block of the current block using the motion vector of the current block.

As an embodiment, the third syntax element may indicate the candidate used for the inter prediction of the current block among a first candidate and a second candidate of the merge candidate list of the current block.

As an embodiment, the third syntax element may be parsed from a bitstream when a maximum number of merge candidates is larger than 1, and it may be inferred that the third syntax element is 0 when the maximum number of merge candidates is not larger than 1.

As an embodiment, the acquiring the information related to the motion vector difference may include acquiring a fourth syntax element indicating a distance of the motion vector difference; and acquiring a fifth syntax element indicating a direction of the motion vector difference.

As an embodiment, the method may further include acquiring a sixth syntax element indicating a candidate used for the inter prediction of the current block among candidates included in a subblock merge candidate list of the current block when the first syntax element indicates that the subblock-based merge mode is applied to the current block, wherein the motion vector of the current block may be induced in units of at least one subblock included in the current block, based on a motion vector of the candidate indicated by the sixth syntax element when the first syntax element indicates that the subblock-based merge mode is applied to the current block.

As an embodiment, when the first syntax element indicates that the subblock-based merge mode is applied to the current block, it may be inferred that the second syntax element is 0.

As an embodiment, the sixth syntax element may be parsed from a bitstream when a maximum number of subblock merge candidates is larger than 1, and it may be inferred that the sixth syntax element is 0 when the maximum number of subblock merge candidates is not larger than 1.

According to an embodiment of the present invention, an apparatus for processing a video signal includes: a processor, wherein the processor is configured to acquire a first syntax element indicating whether a subblock-based merge mode is applied to a current block, acquire a second syntax element indicating whether a merge mode using a motion vector difference is applied to the current block when the first syntax element indicates that the subblock-based merge mode is not applied to the current block, acquire a third syntax element indicating a candidate used for inter prediction of the current block among candidates included in a merge candidate list of the current block when the second syntax element indicates that the merge mode using the motion vector difference is applied to the current block, acquire information related to the motion vector difference, induce a motion vector of the current block by adding the motion vector difference to a motion vector of the candidate indicated by the third syntax element; and generate a predicted block of the current block using the motion vector of the current block.

As an embodiment, the third syntax element may indicate the candidate used for the inter prediction of the current block among a first candidate and a second candidate of the merge candidate list of the current block.

As an embodiment, the third syntax element may be parsed from a bitstream when a maximum number of merge candidates is larger than 1, and it may be inferred that the third syntax element is 0 when the maximum number of merge candidates is not larger than 1.

As an embodiment, the processor may be configured to acquire a fourth syntax element indicating a distance of the motion vector difference and acquire a fifth syntax element indicating a direction of the motion vector difference.

As an embodiment, the processor may be configured to acquire a sixth syntax element indicating a candidate used for the inter prediction of the current block among candidates included in a subblock merge candidate list of the current block when the first syntax element indicates that the subblock-based merge mode is applied to the current block, wherein the motion vector of the current block is induced in units of at least one subblock included in the current block, based on a motion vector of the candidate indicated by the sixth syntax element when the first syntax element indicates that the subblock-based merge mode is applied to the current block.

As an embodiment, when the first syntax element indicates that the subblock-based merge mode is applied to the current block, it may be inferred that the second syntax element is 0.

As an embodiment, the sixth syntax element may be parsed from a bitstream when a maximum number of subblock merge candidates is larger than 1, and it may be inferred that the sixth syntax element is 0 when the maximum number of subblock merge candidates is not larger than 1.

According to an embodiment of the present invention, a method of processing a video signal includes: encoding a first syntax element indicating whether a subblock-based merge mode is applied to a current block; when the first syntax element indicates that the subblock-based merge mode is not applied to the current block, encoding a second syntax element indicating whether a merge mode using a motion vector difference is applied to the current block; when the second syntax element indicates that the merge mode using the motion vector difference is applied to the current block, encoding a third syntax element indicating a candidate used for inter prediction of the current block among candidates included in a merge candidate list of the current block; encoding information related to the motion vector difference; inducing a motion vector of the current block by adding the motion vector difference to a motion vector of the candidate indicated by the third syntax element; and generating a predicted block of the current block using the motion vector of the current block.

Advantageous Effects

According to an embodiment of the present invention, it is possible to increase coding efficiency of a video signal. Particularly, according to an embodiment of the present invention, it is possible to reduce signaling overhead and increase compression efficiency by controlling a syntax parsing order.

DESCRIPTION OF DRAWINGS

FIG. 22 illustrates an MMVD-related syntax structure according to an embodiment of the present invention;

FIG. 23 illustrates an MMVD-related syntax structure according to an embodiment of the present invention;

FIG. 24 illustrates an MMVD-related syntax structure according to an embodiment of the present invention;

FIG. 25 illustrates MMVD syntax according to an embodiment of the present invention;

FIG. 26 illustrates MMVD syntax according to an embodiment of the present invention;

FIG. 27 illustrates MMVD syntax according to an embodiment of the present invention;

FIG. 28 illustrates MMVD syntax according to an embodiment of the present invention;

FIG. 29 illustrates a coding unit syntax structure according to an embodiment of the present invention;

FIG. 30 illustrates a merge data syntax structure according to an embodiment of the present invention;

FIG. 31 illustrates a merge data syntax structure according to an embodiment of the present invention;

FIG. 32 illustrates a merge data syntax structure according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
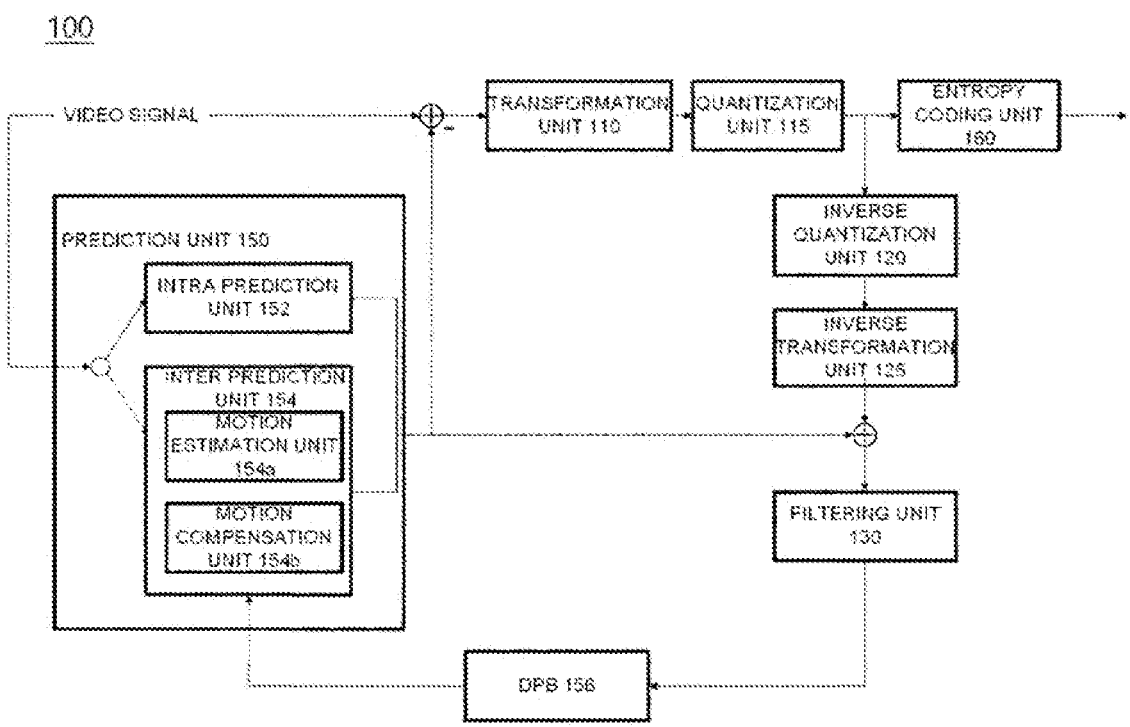
FIG. 1 is a block diagram schematically illustrating an apparatus for encoding a video signal according to an embodiment of the present invention.

FIG. 1 is a schematic block diagram of a video signal encoding apparatus according to an embodiment of the present disclosure. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
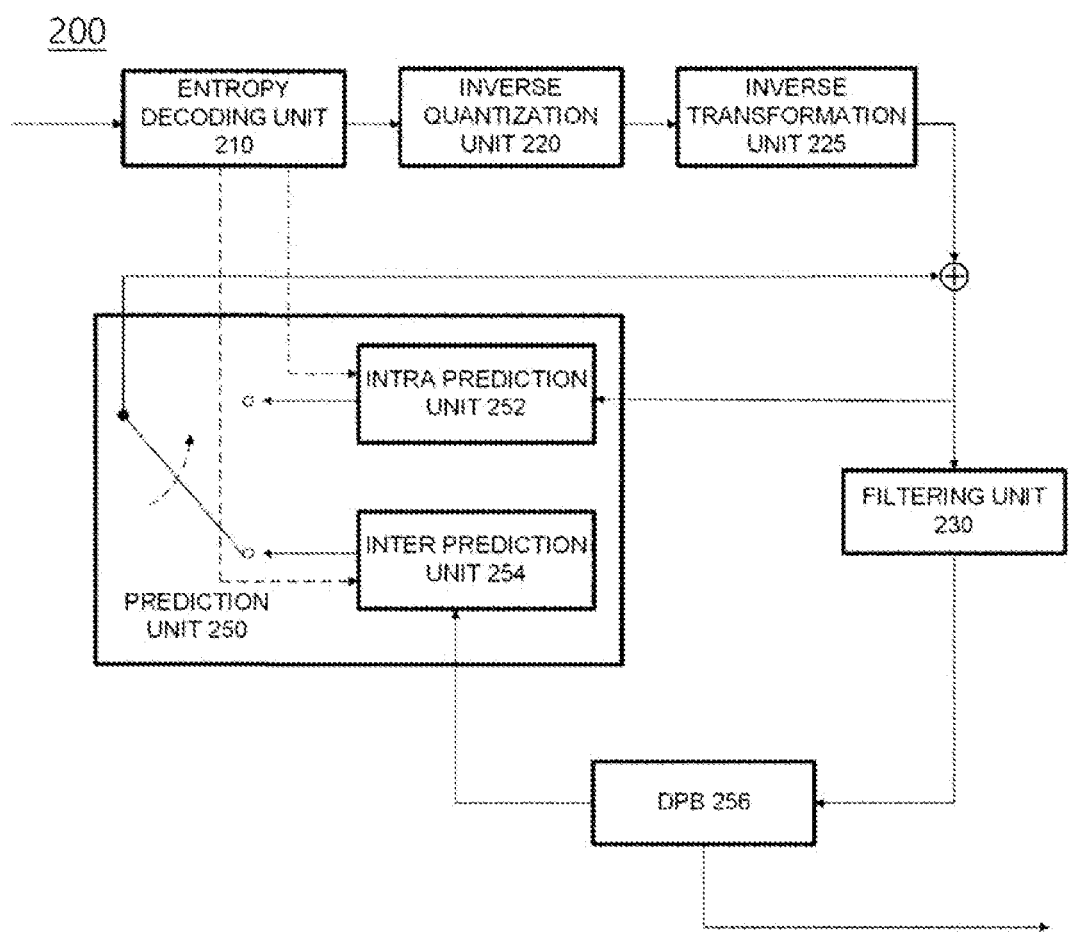
FIG. 2 is a block diagram schematically illustrating an apparatus for decoding a video signal according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
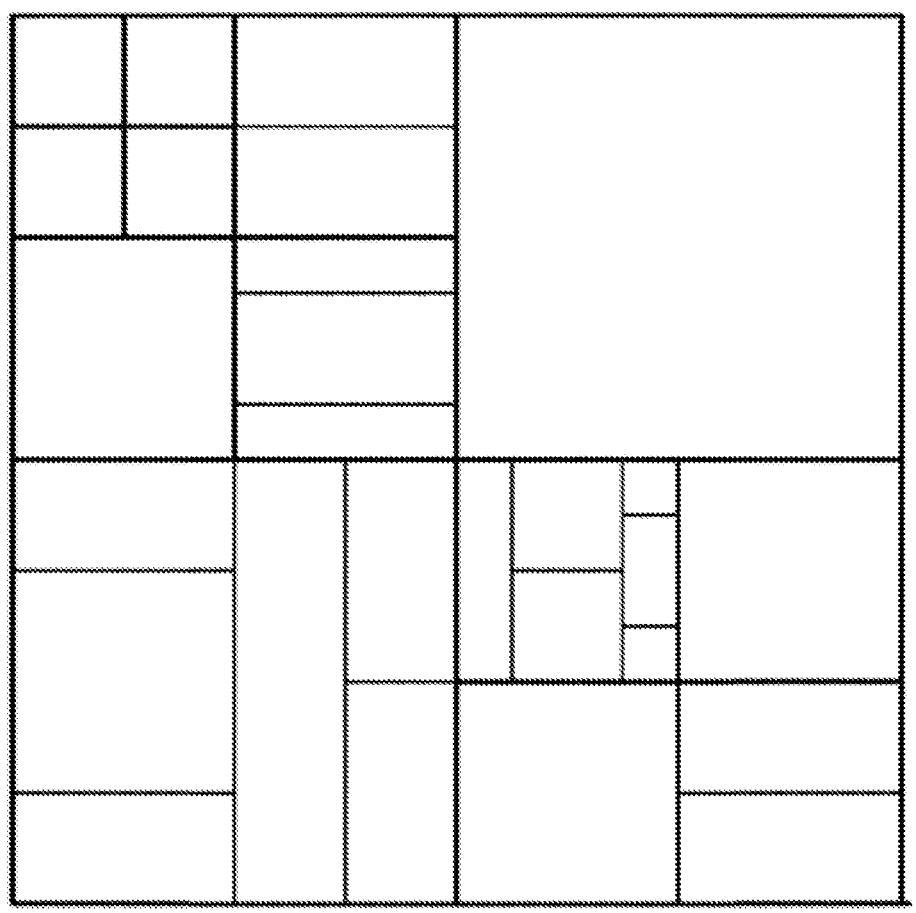
FIG. 3 illustrates an embodiment in which a coding tree unit is divided into coding units within a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
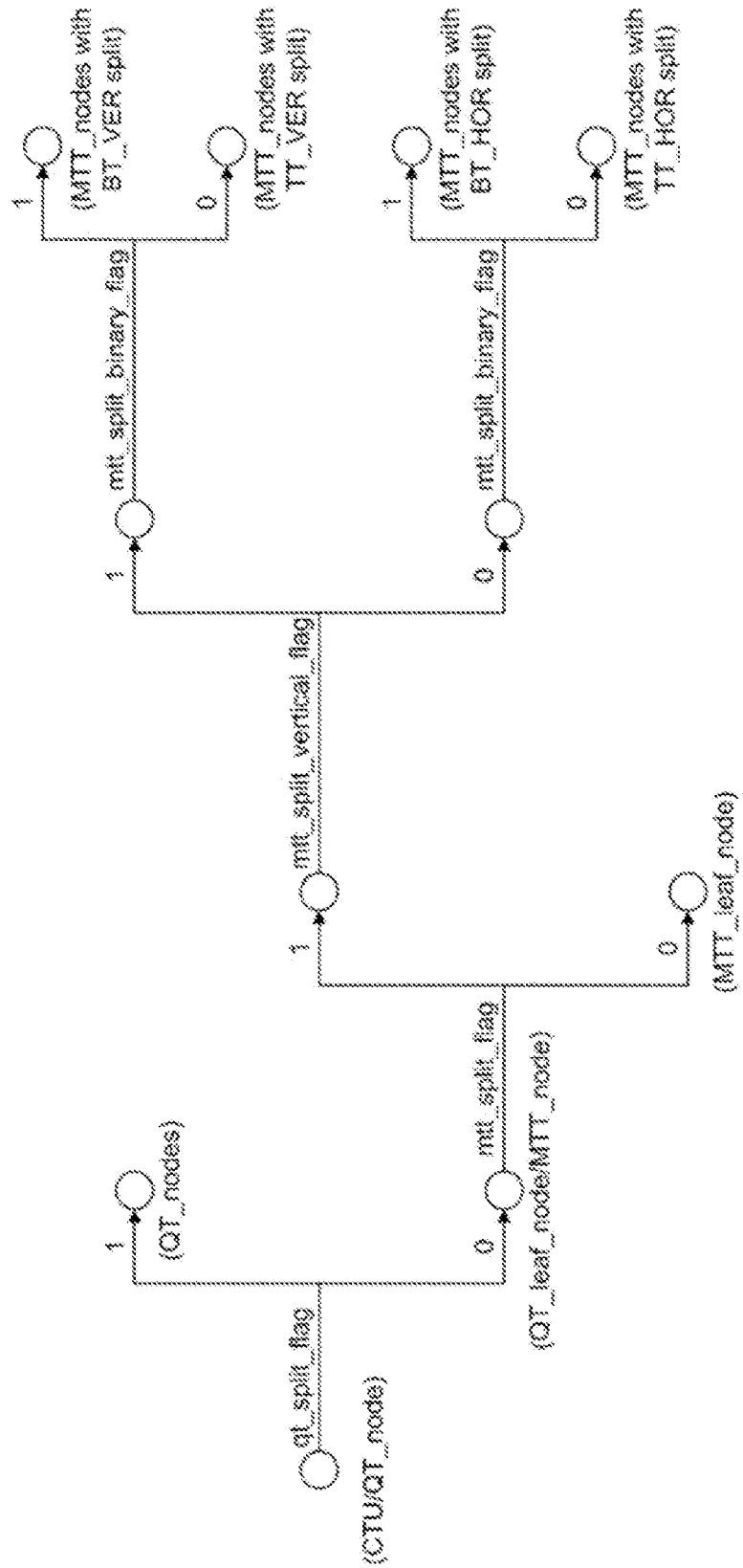
FIG. 4 illustrates an embodiment of a method of signaling division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
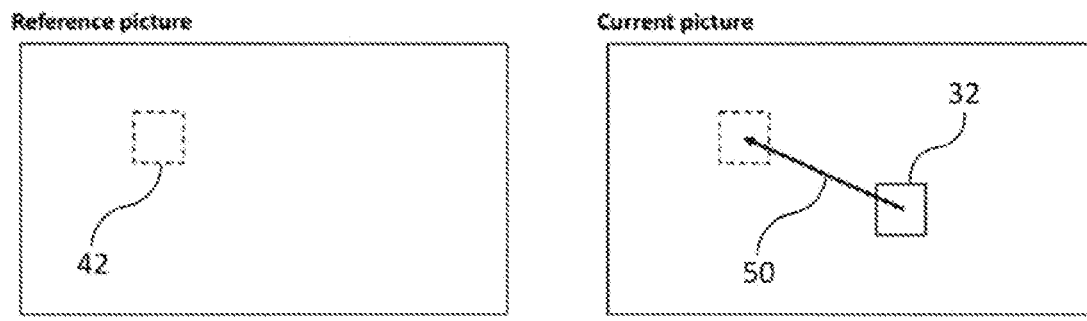
FIG. 5 illustrates inter prediction according to an embodiment of the present invention.

FIG. 5 illustrates inter prediction according to an embodiment of the present invention. As described above, the decoder may predict the current block with reference to restored samples of another decoded picture. Referring to FIG. 5, the decoder acquires a reference block 42 within the reference picture based on motion information of the current block 32. In this case, the motion information may include a reference picture index and a motion vector 50. The reference picture index indicates the reference picture of the current block in a reference picture list. Further, the motion vector 50 indicates an offset between a coordinate value of the current block 32 within the current picture and a coordinate value of the reference block 42 within the reference picture. The decoder acquires a predictor of the current block 32 based on sample values of the reference block 42 and restores the current block 32 using the predictor.

Meanwhile, according to an embodiment of the present invention, subblock-based motion compensation may be used. That is, the current block 32 may be divided into a plurality of subblocks, and an independent motion vector may be used for each subblock. Accordingly, respective subblocks may be predicted using different reference blocks within the current block 32. According to an embodiment, the subblock may have a preset size such as 4×4 or 8×8. The decoder acquires a predictor of each subblock of the current block 32 through a motion vector of each subblock. Through a combination of predictors of the respective subblocks, a predictor of the current block 32 may be acquired, and the decoder may restore the current block 32 using the acquired predictor of the current block 32.

According to an embodiment of the present invention, subblock-based motion compensation through various methods may be performed. Subblock-based motion compensation may include affine model-based motion compensation (hereinafter, referred to as affine motion compensation or affine motion prediction) and Subblock-based Temporal Motion Vector Prediction (SbTMVP). Hereinafter, various embodiments of the affine motion compensation and the SbTMVP are described with reference to drawings.

Figure 6:
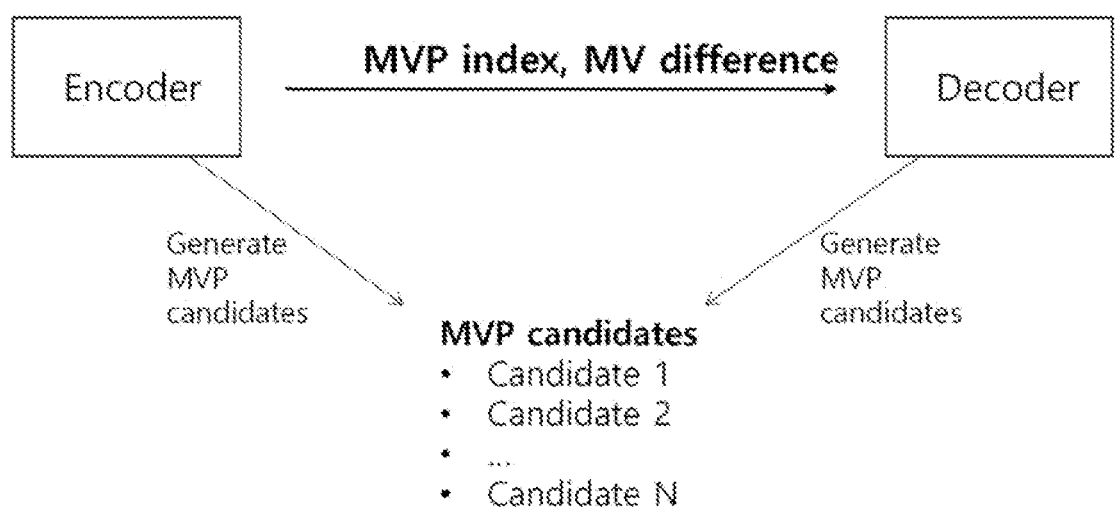
FIG. 6 illustrates a method of signaling a motion vector according to an embodiment of the present invention.

FIG. 6 illustrates a method of signaling a motion vector according to an embodiment of the present invention. According to an embodiment of the present invention, a Motion Vector (MV) may be generated based on Motion Vector Prediction (or Predictor) (MVP). For example, the MV may be determined by MVP as shown in [Equation 1] below. In other words, the MV may be determined (configured or induced) as a value which is the same as the MVP.

$$MV=MVP \qquad \text{[Equation 1]}$$

In another example, the MV may be determined based on MVP and a Motion Vector Difference (MVD) as shown in [Equation 2] below. The encoder may signal MVD information to the decoder in order to more accurately indicate the MV, and the decoder may induce the MV by adding the acquired MVD to the MVP.

$$MV=MVP+MVD \qquad \text{[Equation 2]}$$

According an embodiment of the present invention, the encoder may transmit the determined motion information to the decoder, and the decoder may generate the MV from the received motion information and generate (or induce) a predicted block on the basis thereof. For example, the motion information may include MVP information and MVD information. In this case, elements of the motion information may vary depending on the inter prediction mode. For example, the motion information may or may not include MVP information in the merge mode. In another example, the motion information may include MVP information and MVD information in an Advanced Motion vector Prediction (AMVP) mode.

In order to determine, transmit, and receive information on the MVP, the encoder and the decoder may generate MVP candidates (or an MVP candidate list) in the same way. For example, the encoder and the decoder may generate the same MVP candidates in the same order. Further, the encoder may transmit an index indicating (or representing) the determined (or selected) MVP from among the generated MVP candidates to the decoder, and the decoder may induce the determined MVP and/or MV based on the received index.

According to an embodiment of the present invention, the MVP candidates may include a spatial candidate, a temporal candidate, and the like. The MVP candidates may be referred to as merge candidates when the merge mode is applied, and may be referred to as AMVP candidates when the AMVP mode is applied. The spatial candidate may be an MV (or motion information) for a block positioned at a specific location from the current block. For example, the spatial candidate may be an MV of a block which is adjacent to or not adjacent to the current block. The temporal candidate may be an MV corresponding to a block within a picture different from the current picture. Further, for example, the MVP candidates may include an affine MV, an ATMVP, an STMVP, a combination of the MVs (or candidates), an average MV of the MVs (or candidates), a zero MV, and the like.

According to an embodiment, the encoder may signal information indicating a reference picture to the decoder. As an embodiment, when a reference picture of the MVP candidates is different from a reference picture of the current block (or currently processed block), the encoder/decoder may scale the MV (motion vector scaling) of the MVP candidates. In this case, the MV scaling may be performed based on a Picture Order Count (POC) of the current picture, a POC of the reference picture of the current block, and a POC of the reference picture of the MVP candidate.

A detailed embodiment of the MVD signaling method is described hereinafter. [Table 1] below shows a syntax structure for MVD signaling.

TABLE 1

| | Descriptor |
|---|---|
| mvd_coding( x0, y0, refList ) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_myd_greater0_flag[ 0 ] ) { | |
| if( abs_mvd_ greater0_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_fag[ 1 ] ) | |
| abs_mvd_minus2[ 1 ] | ae(v) |
| mvd_sign_flag[ 1 ] | ae(v) |
| } | |
| } | |

Referring to [Table 1], a sign and an absolute value of the MVD may be separately coded according to an embodiment of the present invention. That is, the sign and the absolute value of the MVD may have different syntax (or syntax elements). Further, the absolute value of the MVD may be directly coded or may be gradually coded based on a flag indicating whether the absolute value is larger than N as shown in [Table 1]. If the absolute value is larger than N, a value of (absolute value−N) may be also signaled. Specifically, in the example of [Table 1], abs_mvd_greater0_flag indicating whether the absolute value is larger than 0 may be transmitted. If abs_mvd_greater0_flag indicates (represents) that the absolute value is not larger than 0, the absolute value of the MVD may be determined as 0. Further, if abs_mvd_greater0_flag indicates that the absolute value is larger than 0, additional syntax (or syntax element) may exist.

For example, abs_mvd_greater_flag indicating that the absolute value is larger than 1 may be transmitted. If abs_mvd_greater_flag indicates (represents) that the absolute value is not larger than 1, the absolute value of the MVD may be determined as 1. If abs_mvd_greater1_flag indicates that the absolute value is larger than 1, additional syntax may exist. For example, abs_mvd_minus2 may exist. abs_mvd_minus2 may be a value of (absolute value−2). Since it is determined that the absolute value is larger than 1 (that is, larger than or equal to 2) according to the values of abs_mvd_greater0_flag and abs_mvd_greater1_flag, the value of (absolute value−2) may be signaled. Hierarchically performing syntax signaling on the information on the absolute value may use a smaller number of bits than binarizing and signaling the absolute value.

According to an embodiment, the syntax related to the absolute value may be coded by applying a binarization method of a variable length such as exponential-Golomb, truncated unary, truncated rice, or the like. Further, a flag indicating the sign of the MVD may be signaled through mvd_sign_flag.

Although a method of coding the MVD has been described in the above-described embodiment, the sign and the absolute value of information as well as the MVD may be separately signaled. The absolute value may be coded to a flag indicating whether the absolute value is larger than a predefined specific value or a value obtained by subtracting the specific value from the absolute value. In [Table 1], [0] and [1] may indicate component indexes. For example, [0] and [1] may be an x-component (that is, a horizontal component) and a y-component (that is, a vertical component).

Figure 7:
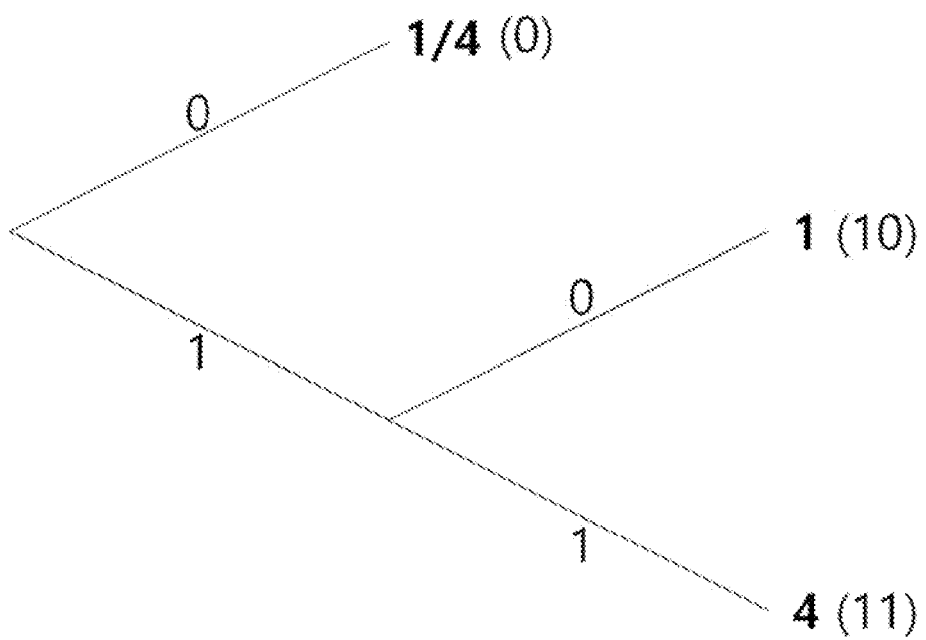
FIG. 7 illustrates a method of signaling adaptive motion vector resolution information according to an embodiment of the present invention.

FIG. 7 illustrates a method of signaling adaptive motion vector resolution information according to an embodiment of the present invention. According to an embodiment of the present invention, a resolution indicating the MV or the MVD may vary. For example, the resolution may be expressed based on a pixel (or a pel). For example, the MV or the MVD may be signaled in units of ¼ (quarter), ½ (half), 1 (integer), 2, or 4 pixels. The encoder may signal resolution information of the MV or the MVD to the decoder. Further, for example, 16 may be coded to 64 in units of ¼ (¼*64=16), to 16 in units of 1 (1*16=16), and to 4 in units of 4 (4*4=16). That is, the MV or MVD value may be determined using [Equation 3] below.

$$valueDetermined = resolution * valuePerResolution \quad \text{[Equation 3]}$$

In [Equation 3], valueDetermined indicates the MV or MVD value. Further, valuePerResolution is a value signaled based on the determined resolution. In this case, when the value signaled by the MV or the MVD cannot be divided by the determined resolution, a rounding process and the like may be applied. When the high resolution is used, the accuracy may increase but a coded value is large and thus the larger number of bits may be used. When the low resolution is used, the accuracy may decrease but a coded value is small and thus the smaller number of bits may be used. According to an embodiment, the resolution may be differently configured in units of sequences, pictures, slices, Coding Tree Units (CTUs), Coding Units (CUs), and the like. That is, the encoder/decoder may adaptively determine/apply the resolution according to a predefined unit among the above-described units.

According to an embodiment of the specification, the resolution information may be signaled from the encoder to the decoder. In this case, the resolution information may be binarized and signaled based on the variable length. In this case, signaling overhead may be reduced when signaling is performed based on an index corresponding to the smallest value (that is, foremost value). As an embodiment, the resolution may be mapped to signaling indexes in the order from the high resolution to the low resolution.

According to an embodiment of the specification, FIG. 7 illustrates a signaling method when it is assumed that three resolutions are used among various resolutions. In this case, three signaling bits may be 0, 10, and 11, and three signaling indexes may be referred to as a first resolution, a second resolution, and a third resolution. Since 1 bit is needed to signal the first resolution and 2 bits are needed to signal the remaining resolutions, signaling overhead may be relatively reduced when the first resolution is signaled. In the example of FIG. 7, the first resolution, the second resolution, and the third resolution may be defined as ¼, 1, and 4 pixel resolutions, respectively. In the following embodiments, the MV resolution may be the resolution of the MVD.

Figure 8:
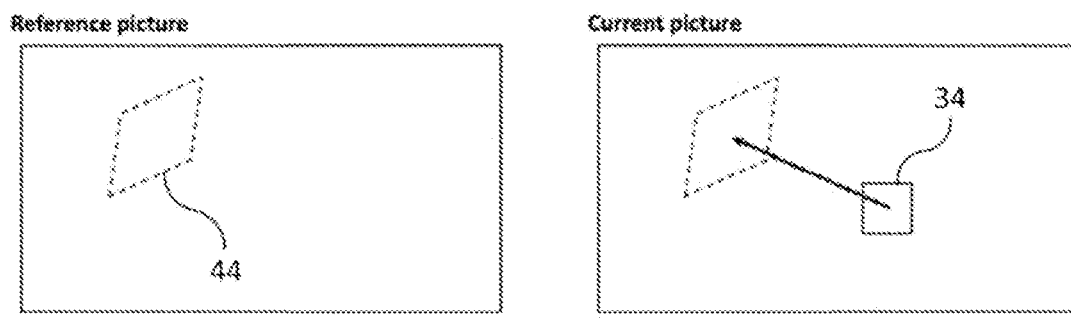
FIG. 8 illustrates affine motion compensation according to an embodiment of the present invention.

FIG. 8 illustrates affine motion compensation according to an embodiment of the present invention. According to the conventional inter prediction method, inter prediction is performed using only one motion vector for each of L0 prediction and L1 prediction for the current block, and thus is optimized for prediction of translation motion. However, it is required to use a reference block 44 in various shapes and sizes in order to efficiently perform motion compensation for zoom in/out, rotary, and other irregular motions.

Referring to FIG. 8, in affine motion compensation, the current block 34 may be predicted using the reference block 44 having a size, shape, and/or direction different from that of the current block 34. That is, the reference block 44 may have a non-rectangular shape, and may be larger or smaller than the current block 34. The reference block 44 may be acquired by performing affine transformation on the current block 34. Affine transform may include 6-parameter affine transformation using three Control Point Motion Vectors (CPMVs) and 4-parameter affine transformation using two control point motion vectors. A detailed embodiment thereof will be described below.

Figure 9:
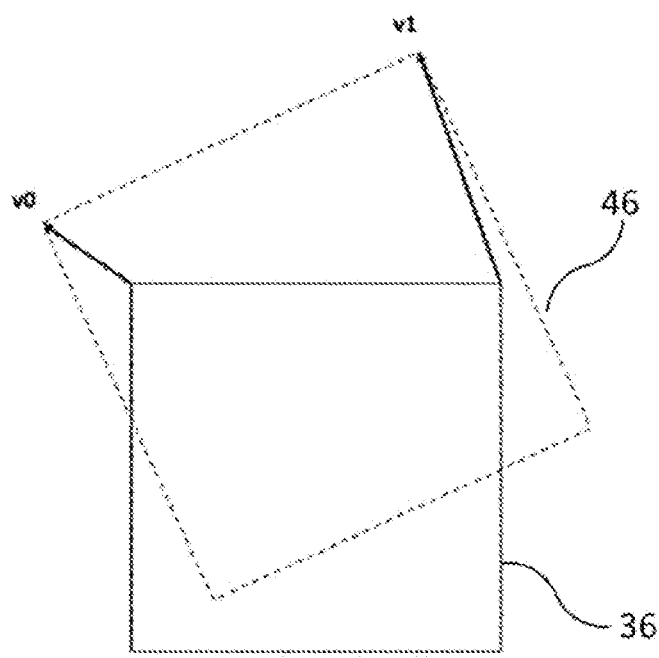
FIG. 9 illustrates an embodiment of a 4-parameter affine motion compensation method.

FIG. 9 illustrates an embodiment of a 4-parameter affine motion compensation method. In order to reduce an amount of calculations and signaling overhead of the affine transformation, affine motion compensation may be performed using the preset number of control point motion vectors (CPMVs). The control point motion vector (CPMV) is a motion vector corresponding to a specific control point (or sample location) of the current block. The specific control point may include at least one of corners of the current block. In the embodiment of the present invention, a CPMV corresponding to the top-left corner of the current block is referred to as v0 (or a first CPMV), a CPMV corresponding to the top-right corner of the current block is referred to as v1 (or a second CPMV), and a CPMV corresponding to the bottom-left corner of the current block is referred to as v2 (or a third CPMV). A CPMV set including at least two CPMVs may be used for affine motion prediction.

According to the embodiment of FIG. 9, 4-parameter affine motion prediction may be performed using v0 and v1. A current block 36 expressed by a solid line may be predicted using a reference block 46 at the location expressed by a dotted line. Samples of the current block 36 may be mapped to different reference samples through affine transformation. More specifically, a motion vector (Vx, Vy) at the sample location (x, y) of the current block 36 may be derived from [Equation 4] below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{[Equation 4]}$$

Here, (v0x, v0y) indicates a first CPMV corresponding to the top-left corner of the current block 36, and (v1x, v1y) indicates a second CPMV corresponding to the top-right corner of the current block. Further, w is a width of the current block 36.

Figure 10:
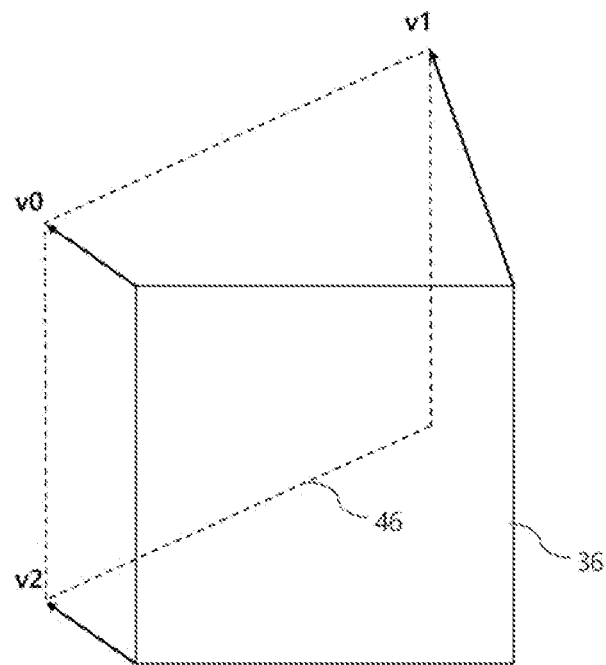
FIG. 10 illustrates an affine motion prediction method according to an embodiment of the present invention.

FIG. 10 illustrates an affine motion prediction method according to an embodiment of the present invention. According to an embodiment of the present invention, affine motion may be indicated using a plurality of CPMVs or a plurality of parameters.

Referring to FIG. 10, the encoder/decoder may perform affine motion prediction using CPMVs of v0, v1, and v2. When six parameters are used, three control point motion vectors (CPMVs) of v0, v1, and v2 may be used for affine motion prediction. A shape of the reference block from which the current block 36 is predicted may be indicated based on the three vectors v0, v1, and v2 or the six parameters. Referring to FIG. 10, the current block 36 expressed by the straight line may be predicted from the reference block 46 expressed by the dotted line of FIG. 10 in the reference picture. That is, each control point (or pixel) at the corresponding location) of the current block 36 may be mapped to another point (or pixel) through affine transformation. Equation (5) below shows a motion vector field according to an embodiment of the present invention.

$$mv^x = \dfrac{(mv_1^x - mv_0^x)}{w}x + \dfrac{(mv_2^x - mv_0^x)}{h}y + mv_0^x \quad \text{[Equation 5]}$$
$$mv^y = \dfrac{(mv_1^y - mv_0^y)}{w}x + \dfrac{(mv_2^y - mv_0^y)}{h}y + mv_0^y$$

In [Equation 5], the CPMV of v0 indicating the motion vector of the top-left corner control point in FIG. 10 may be expressed by (mv_0^x, mv_0^y). The CPMV of v1 indicating the motion vector of the top-right corner control point may be expressed by (mv_1^x, mv_1^y). The CPMV of v2 indicating the motion vector of the bottom-left corner control point may be expressed by (mv_2^x, mv_2^y). In this case, a motion vector (mv^x, mv^y) at the location of (x, y) may be induced (or calculated) using [Equation 5]. Accordingly, the location of each pixel or a motion vector at a specific location may be induced according to [Equation 5] based on the control point motion vectors v0, v1, and v2.

Further, in [Equation 5], (x, y) may be relative coordinates in the block. For example, when the top-left location of the block is (0, 0), (x, y) may be the location based on the top-left location. Accordingly, when it is assumed that the location of v0 is (x0, y0), the location of v1 is (x1, y1), and the location of v2 is (x2, y2), and when the same coordinates as those of the location of v0, v1, and v2 are used for (x, y), x and y may be expressed as (x−x0) and (y−y0), respectively, in [Equation 5]. Further, in this case, w indicating the width of the block may be (x1−x0), and h indicating the height of the block may be (y2−y0).

Figure 11:
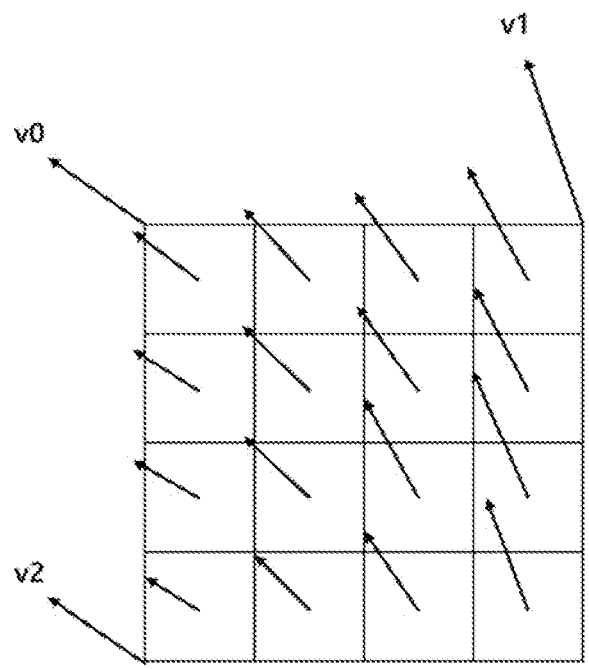
FIG. 11 illustrates an embodiment of a subblock-based affine motion compensation method.

FIG. 11 illustrates an embodiment of a subblock-based affine motion compensation method. As described above, the motion vector (that is, the motion vector field) at each sample location of the current block may be induced using affine motion transform. However, in order to reduce an amount of calculations, the subblock-based affine motion compensation may be performed according to an embodiment of the present invention. As illustrated in FIG. 8, the current block may include a plurality of subblocks, and a representative motion vector of each subblock is acquired based on a CPMV set. According to an embodiment, the representative motion vector of each subblock may be a motion vector corresponding to the location of the mid sample of the corresponding subblock. According to an additional embodiment, as the motion vector of the subband, a motion vector having higher accuracy than the general motion vector may be used. To this end, a motion compensation interpolation filter may be applied.

The size of the subblock passing through affine motion compensation may be configured through various methods. According to an embodiment of the present invention, the subblock may have a preset size such as 4×4 or 8×8. According to an embodiment of the present invention, the size M×N of the subblock may be determined by [Equation 6] below.

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases}$$ [Equation 6]

Here, w denotes a width of the current block, and MvPre denotes fraction unit accuracy of the motion vector. (v2x, v2y) is a third CPMV corresponding to the bottom-left corner of the current block, and may be calculated by [Equation 5] according to an embodiment. max(a, b) is a function that returns a larger value between a and b, and abs(x) is a function that returns an absolute value of x. Further, clip3(x, y, z) is a function that returns x in the case of z<x, returns y in the case of z>y, and returns z in other cases.

The decoder acquires a motion vector of each subblock of the current block through the CPMVs of the CPMV set. Further, the decoder acquires a predictor of each subblock based on a motion vector of each subblock and acquires a predictor of the current block by combining the predictors of the respective subblocks. The decoder may restore the current block using the acquired predictor of the current block.

Figure 12:
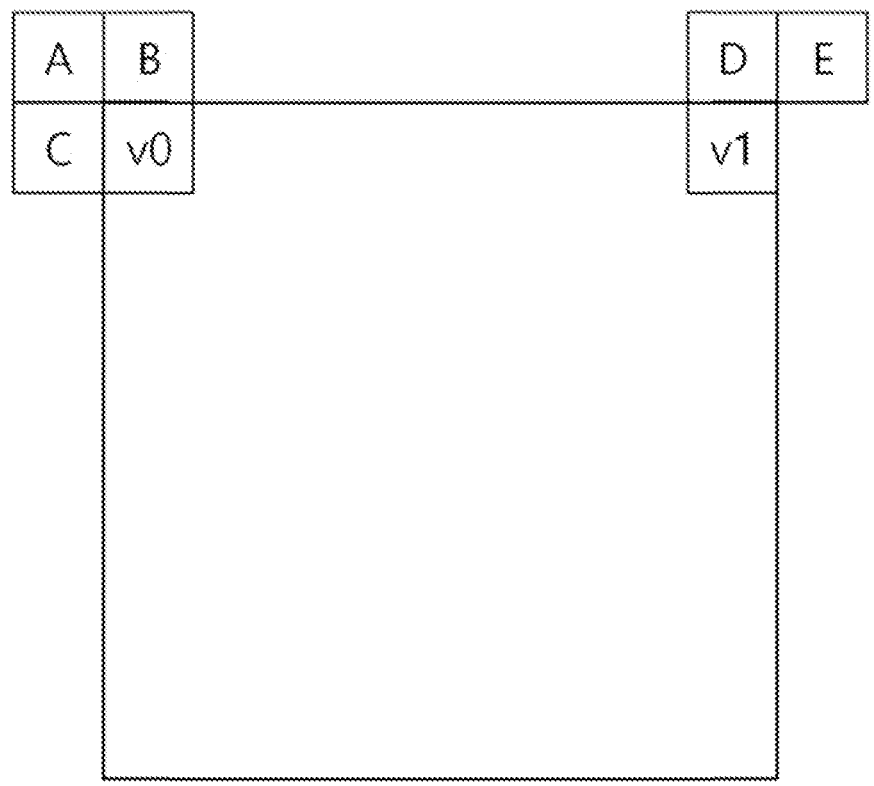
FIGS. 12 and 13 illustrate embodiments of the present invention of acquiring a control point motion vector set for prediction of a current block.
Figure 13:
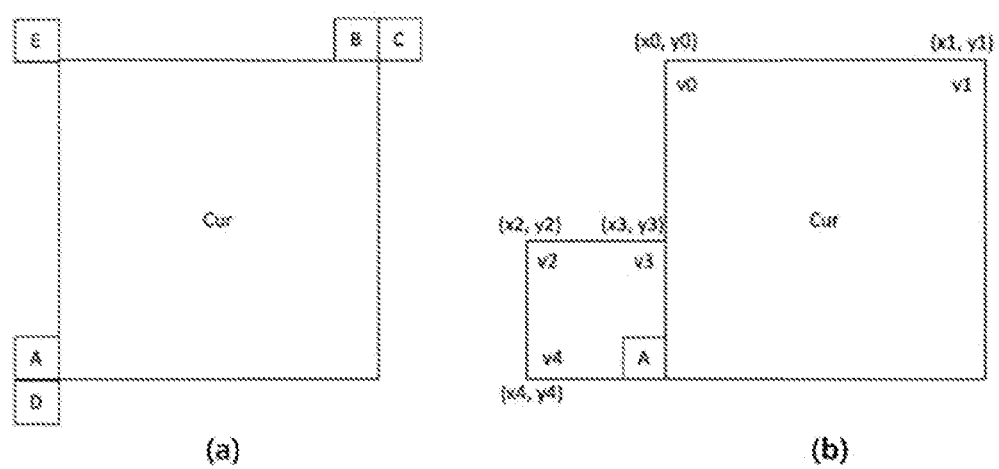

FIGS. 12 and 13 illustrate embodiments of the present invention of acquiring a control point motion vector set for prediction of the current block. According to an embodiment of the present invention, a CPMV set for prediction of the current block may be acquired through various methods. More specifically, the CPMV set for prediction of the current block may be acquired with reference to a motion vector information set of one or more neighboring blocks. According to an embodiment of the present invention, motion vector information may indicate a motion vector of the corresponding block or a CPMV of the corresponding block. Further, the motion vector information set indicates a set of motion vector information of one or more blocks. The neighboring blocks may be blocks including preset neighboring locations of the current block. In this case, the neighboring blocks may be coding units including preset neighboring locations or areas in preset units (for example, 4×4 or 8×8) including the neighboring locations.

There may be a plurality of candidates which may be referred to for inducing CPMVs of the current block. Accordingly, information on neighboring blocks to be referred to for inducing the CPMVs of the current block may be separately signaled. According to an embodiment of the present invention, an indicator indicating the motion vector information set to be referred to for inducing the motion vector of each subblock of the current block may be signaled. The indicator may indicate a motion vector information set of neighboring block(s) to be referred to for inducing the motion vector of each subblock of the current block. The decoder may acquire the indicator and acquire each CPMV of a CPMV set for the current block with reference to the motion vector information set of neighboring block(s) indicated by the indicator. According to a more detailed embodiment, the decoder may generate a candidate list including one or more motion vector information set candidates. Each motion vector information set candidate included in the candidate list is a motion vector set of neighboring blocks available for inducing motion vector information of the current block. In this case, the indicator may be an index indicating one motion vector information set in the candidate list. CPMVs of the current block may be acquired with reference to a motion vector information set selected from the candidate list based on the indicator (that is, the index). Hereinafter, various embodiments of the motion vector information set candidates which can be included in the candidate list for inducing the motion vector information (or CPMV set) of the current block will be described.

FIG. 12 illustrates an embodiment of acquiring a CPMV set of the current block. In the embodiment of FIG. 12, it is assumed that the CPMV set of the current block includes two CPMVs, that is, v0 and v1. According to an embodiment of the present invention, the CPMV of the current block may be induced from a motion vector of a neighboring block adjacent to the corresponding point. Referring to FIG. 12, v0 may be induced from one motion vector among neighboring blocks A, B, and C adjacent to the corresponding point, and v1 may be induced from one motion vector among neighboring blocks D and E adjacent to the corresponding point. When motion vectors of the neighboring blocks A, B, C, D, and E are vA, vB, vC, vD, and vE, a motion vector information set which can be included in a candidate list may be derived as shown in [Equation 7] below.

$\{(v0,v1)|v0=\{vA,vB,vC\},v1=\{vD,vE\}\}$  [Equation 7]

That is, a pair of (v0, v1) including v0 selected from among vA, vB, and vC, and v1 selected from among vD and vE may be acquired. In this case, v0 may be induced from a motion vector of a block adjacent to an upper left corner of the current block, and v1 may be induced from a motion vector of a block adjacent to an upper right corner of the current block. According to an additional embodiment, motion vector scaling may be performed based on a Picture Order Count (POC) of the current block, a POC of a reference picture of the neighboring block, and a POC of a reference picture of the current block.

As described above, the candidate list including the acquired motion vector information set candidates may be generated, and the indicator indicating one motion vector information set in the candidate list may be signaled. According to an additional embodiment of the present invention, the candidate list may include a motion vector information set candidate for another type of inter-prediction. For example, the candidate list may include a motion vector information set candidate for subblock-based temporal motion vector prediction (SbTMVP).

The decoder may derive CPMVs of the current block based on the motion vector information set acquired from the candidate list. According to an embodiment, the decoder may perform affine merge prediction by using motion vectors of the motion vector information set acquired from the candidate list as CPMVs of the current block without any separate motion vector differential value. According to another embodiment, the decoder may acquire a separate motion vector differential value for the CPMV of the current block. The decoder may acquire the CPMV of the current block by adding motion vectors of the motion vector information set acquired from the candidate list and the motion vector differential value. The decoder may separately signal a flag or an index indicating whether to use a separate motion vector differential value for affine motion compensation of the current block.

FIG. 13 illustrates another embodiment of acquiring the CPMV set of the current block. According to another embodiment of the present invention, the CPMV of the current block may be induced from motion vector information of the neighboring block on which affine motion compensation has been performed, that is, a CPMV or a motion vector of the neighboring block. In this case, the neighboring block may include a left neighboring block of the current block and a top neighboring block of the current block. Referring to (a) of FIG. 13, the left neighboring block may include blocks adjacent to the bottom-left corner of the current block, that is, a left block A and a bottom-left block D. Further, the top neighboring block includes blocks adjacent to the top-left corner of the current block, that is, a top-left block E, and blocks adjacent to the top-right corner of the current block, that is, a top block B and a top-right block C. The decoder identifies whether affine motion compensation has been performed on neighboring blocks in a preset order. When a neighboring block on which affine motion compensation has been performed is found, the decoder acquires a CPMV set of the current block using a CPMV set (or motion vector) of the corresponding neighboring block. Referring to (b) of FIG. 13, a CPMV set of the left block A may be used to induce a CPMV set of the current block. That is, the CPMV set (v0, v1) of the current block may be acquired based on the CPMV set (v2, v3, v4) of the left block A.

According to an embodiment of the present invention, information on neighboring blocks to be referred to may be separately signaled to induce CPMVs of the current block. In this case, CPMV sets of the adjacent blocks of the current block may become motion vector information set candidates included in the candidate list according to the preset order. More specifically, the motion vector information set candidates may include a first candidate induced from CPMVs (or motion vectors) of the left neighboring block of the current block and a second candidate induced from CPMVs (or motion vectors) of the top neighboring block of the current block. In this case, the left neighboring block is a block adjacent to the bottom-left corner of the current block, and the top neighboring block is a block adjacent to the top-left corner of the current block or a block adjacent to the top-right corner of the current block. As described above, the candidate list including the acquired motion vector information set candidates may be generated, and the indicator indicating one motion vector information set in the candidate list may be signaled. According to an embodiment, the indicator may indicate location information of neighboring block(s) referred to for inducing the motion vector of each subblock of the current block. The decoder may acquire the CPMV set of the current block with reference to the CPMV set (or motion vectors) of the neighboring block indicated by the indicator.

According to an additional embodiment of the present invention, the CPMVs of the current block may be induced based on the CPMVs of the neighboring block close to the corresponding point. For example, v0 may be acquired with reference to the CPMV of the left neighboring block, and v1 may be acquired with reference to the CPMV of the top neighboring block. Alternatively, v0 may be acquired with reference to the CPMV of the neighboring block A, D, or E, and v1 may be acquired with reference to the CPMV of the neighboring block B or C.

Figure 14:
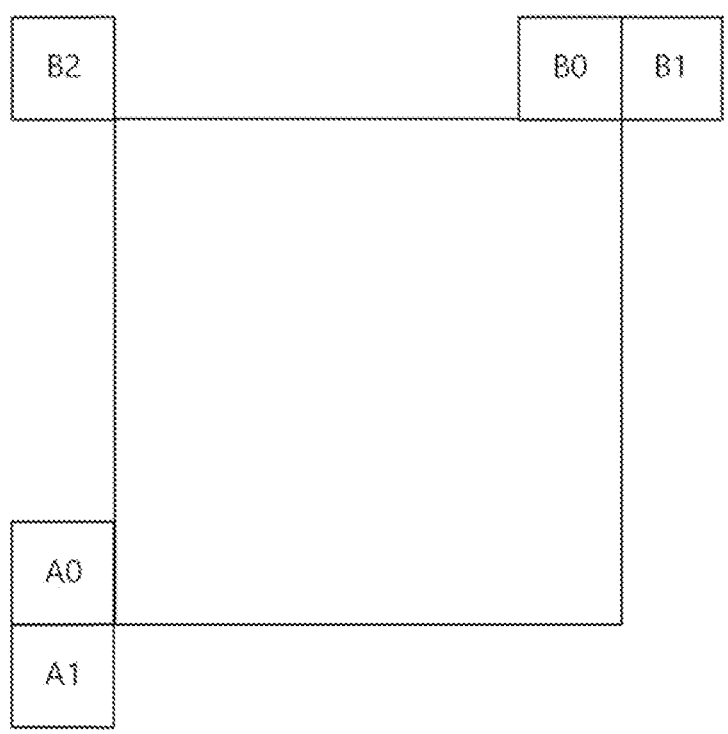
FIG. 14 illustrates an affine motion compensation method according to an embodiment of the present invention.

FIG. 14 illustrates an affine motion compensation method according to an embodiment of the present invention. According to an embodiment of the present invention, CPMVs may be needed for affine motion prediction, and a motion vector field, that is, a subblock or a motion vector at any location (or pixel) may be calculated based on the CPMVs. In this specification, the CPMV may be referred to as a seed vector. In this case, the CPMV may be induced based on a predictor. For example, the predictor may be determined as the CPMV. In another example, the CPMV may be calculated based on the predictor and a difference. Specifically, the CPMV may be calculated by adding the predictor and the difference or subtracting the difference from the predictor.

According to an embodiment of the present invention, the predictor of the CPMV may be induced from a CPMV or an MV of a neighboring affine Motion Compensation (MC) block (that is, a neighboring block coded in the affine mode). For example, when a block at a preset location is affine motion-predicted, the encoder/decoder may induce a predictor for affine motion compensation of the current block from a CPMV or an MV of the corresponding block. According to an embodiment, the preset location may be the location of A0, A1, B0, B1, or B2 illustrated in FIG. 14. Alternatively, the preset location may include the location adjacent to the current block and/or the location which is not adjacent to the current block. Further, the encoder/decoder may refer to a spatially neighboring CPMV or MV at a preset location or a temporally neighboring CPMV or MV at a preset location. In this specification, the candidate based on the affine MC block may be referred to as an inherited candidate. Alternatively, the candidate based on the affine MC block may be referred to as a merge candidate. Further, according to an embodiment, the encoder/decoder may refer to preset locations according to the order which was preset when the preset locations were referred to.

Figure 15:
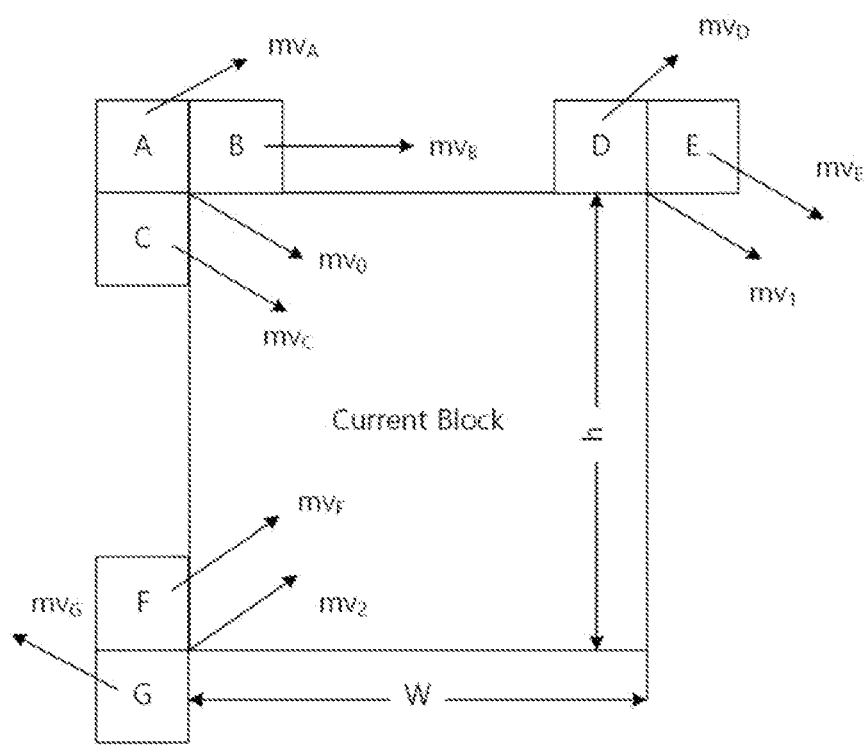
FIG. 15 illustrates an affine motion compensation method according to an embodiment of the present invention.

FIG. 15 illustrates an affine motion compensation method according to an embodiment of the present invention. CPMVs may be needed for affine motion prediction, and a motion vector field, that is, a subblock or a motion vector at any location may be calculated based on the CPMVs. In this specification, the CPMV may be referred to as a seed vector.

In this case, the CPMV may be induced based on a predictor. For example, the predictor may be determined as the CPMV. In another example, the CPMV may be calculated based on the predictor and a difference. Specifically, the CPMV may be calculated by adding the predictor and the difference or subtracting the difference from the predictor.

According to an embodiment of the present invention, the encoder/decoder may induce the predictor of the CPMV using an MV of a neighboring block. In this case, the MV of the neighboring block may include an MV which is not an MV of the affine-motion-compensated block. For example, when inducing each CPMV of the current block, the encoder/decoder may use an MV at a preset location for each CPMV as a predictor of the CPMV. For example, the preset location may be a part included in a block adjacent thereto.

Referring to FIG. 15, the encoder/decoder may determine CPMVs of mv0, mv1, and mv2. Here, mv0 indicates a top-left CPMV, mv1 indicates a top-right CPMV, and mv2 indicates a bottom-left CPMV. According to an embodiment of the present invention, the encoder/decoder may use an MV corresponding to a preset location A, B, or C as a predictor of mv0. Further, the encoder/decoder may use an MV corresponding to a preset location D or E as a predictor of mv1. In addition, the encoder/decoder may use an MV corresponding to a preset location F or G as a predictor of mv2.

When each predictor of the CPMV of mv0, mv1, or mv2 is determined according to an embodiment of FIG. 15, the order referring to the preset location of each control point may be predefined. For example, the number of preset locations which is referred to for the predictor of the CPMV may be plural for each control point location, and a combination of available preset locations may be predefined. According to the method illustrated in the embodiment of FIG. 15, a candidate (or predictor) for affine MC may be induced, and the candidate may be referred to as a constructed candidate. Alternatively, the candidate may be referred to as an inter candidate or a virtual candidate. Further, in the method of FIG. 15, the encoder/decoder may refer to preset locations according to the order which was preset when the preset locations were referred to.

According to an embodiment of the present invention, the encoder/decoder may generate a candidate list of affine MC or a CPMV candidate list of affine MC through the embodiments of FIGS. 12 to 15 or a combination thereof. [Equation 8] shows a method of inducing an affine motion predictor according to an embodiment of the present invention.

$$\begin{cases} v_{0x} = \dfrac{(v_{E1x} - v_{E0x})}{(x_{E1} - x_{E0})}(x_0 - x_{E0}) + \\ \quad \dfrac{(v_{E2x} - v_{E0x})}{(y_{E2} - y_{E0})}(y_0 - y_{E0}) + v_{E0x} \\ v_{0y} = \dfrac{(v_{E1y} - v_{E0y})}{(x_{E1} - x_{E0})}(x_0 - x_{E0}) + \\ \quad \dfrac{(v_{E2y} - v_{E0y})}{(y_{E2} - y_{E0})}(y_0 - y_{E0}) + v_{E0y} \end{cases}$$ [Equation 8]

$$\begin{cases} v_{1x} = \dfrac{(v_{E1x} - v_{E0x})}{(x_{E1} - x_{E0})}(x_1 - x_{E0}) + \\ \quad \dfrac{(v_{E2x} - v_{E0x})}{(y_{E2} - y_{E0})}(y_1 - y_{E0}) + v_{E0x} \\ v_{1y} = \dfrac{(v_{E1y} - v_{E0y})}{(x_{E1} - x_{E0})}(x_1 - x_{E0}) + \\ \quad \dfrac{(v_{E2y} - v_{E0y})}{(y_{E2} - y_{E0})}(y_1 - y_{E0}) + v_{E0y} \end{cases}$$

As described above, a CPMV for affine motion prediction of the current block may be induced from an affine motion-predicted neighboring block. In this case, [Equation 8] may be used. In [Equation 8], MVs of top-left, top-right, and bottom-left control points of the affine motion-predicted neighboring block may be expressed as (v_E0x, v_E0y), (v_E1x, v_E1y), and (v_E2x, v_E2y), respectively. Further, coordinates of the top-left, top-right, and bottom-left control points of the affine motion-predicted neighboring block may be expressed as (x_E0, y_E0), (x_E1, y_E1), and (x_E2, y_E2), respectively. In this case, the encoder/decoder may calculate predictors of CPMVs of the current block or the CPMVs corresponding to (v_0x, v_0y) and (v_1x, v_1y) according to [Equation 8]. [Equation 9] and [Equation 10] below show a method of inducing an affine motion predictor according to an embodiment of the present invention.

$$\overline{mv}_2^x = \overline{mv}_0^x - h\frac{(\overline{mv}_1^y - \overline{mv}_0^y)}{w},$$ [Equation 9]

$$\overline{mv}_2^y = \overline{mv}_0^y + h\frac{(\overline{mv}_1^x - \overline{mv}_0^x)}{w}$$

$$\overline{mv}_1^x = \overline{mv}_0^x + h\frac{(\overline{mv}_2^y - \overline{mv}_0^y)}{w},$$ [Equation 10]

$$\overline{mv}_1^y = \overline{mv}_0^y - h\frac{(\overline{mv}_2^x - \overline{mv}_0^x)}{w}$$

As described above, a plurality of CPMVs or a plurality of CPMV predictors may be used for affine motion compensation. In this case, the encoder/decoder may induce a CPMV or CPMV predictor from another CPMV or CPMV predictor. For example, the encoder/decoder may induce (or generate) two CPMVs or two CPMV predictors through the above-described method and induce another CPMV or another CPMV predictor on the basis thereof.

According to an embodiment of the present invention, the encoder/decoder may induce (or generate) mv0, mv1, and mv2 which are top-left, top-right, and bottom-left CPMV predictors or CPMVs using [Equation 9] and [Equation 10]. In [Equation 9] and [Equation 10], x and y indicate an x component and a y component, respectively, and the size of the current block may be w*h. The encoder/decoder may make a predictor for the CPMV in order to affine-motion-compensate the current block and determine the CPMV by adding a difference and the predictor. According to an embodiment, the predictor of the CPMV may be generated through the method described in FIGS. 14 to 15, and the difference of the CPMV may be signaled from the encoder to the decoder.

According to an embodiment, a difference for each CPMV may exist. Further, each difference for each CPMV may be signaled. Two CPMVs may be used in the 4-parameter model, and the MV of each CPMV may be induced by adding the predictor of each CPMV and each of mvd0 and mvd1. Three CPMVs may be used in the 6-parameter model, and the MV of each CPMV may be induced by adding the predictor of each CPMV and each of mvd0, mvd1, and mvd2.

According to an embodiment of the present invention, the encoder/decoder may determine a motion vector difference based on [Equation 11] below.

lMvd[compIdx]=abs_mvd_greater0_flag[compIdx]*
(abs_mvd_minus2[compIdx]+2)*(1−
2*mvd_sign_flag[compIdx])   [Equation 11]

In [Equation 11], when a reference list is 0, MvdL0[x0][y0][compIdx] may be configured as lMvd[compIdx]. In this case, compIdx indicates a component index and may have a value of 0 or 1. When the reference list is 1, MvdL0[x0][y0][compIdx] may be configured as lMvd[compIdx].

According to an embodiment, the motion vector difference may be signaled through the method described in [Table 1] and may be lMvd in [Equation 11]. As described above, the encoder/decoder may determine that signaled mvd is the difference for the predictor of the CPMV, and the determined difference may be MvdL0 and MvdL1 in [Equation 11]. In [Equation 11], L0 may indicate reference list 0, and L1 may indicate reference list 1.

According to an embodiment of the present invention, in order to perform affine MC on the current block, the encoder/decoder may induce the predictor of the CPMV and determine the CPMV by adding the difference and the predictor. As an embodiment, the encoder/decoder may generate the predictor of the CPMV through the method described in FIGS. 14 to 15. The difference of the CPMV may be signaled from the encoder to the decoder. According to an embodiment, the encoder/decoder may induce the CPMV based on [Equation 12] and [Equation 13] below.

$$mv_0 = \overline{mv}_0 + mvd_0$$

$$mv_1 = \overline{mv}_1 + mvd_1 + mvd_0 \qquad \text{[Equation 12]}$$

$$mv_0 = \overline{mv}_0 + mvd_0$$

$$mv_1 = \overline{mv}_{1\_1} + mvd_1 + mvd_0$$

$$mv_2 = \overline{mv}_{1\_2} + mvd_2 + mvd_0 \qquad \text{[Equation 13]}$$

Referring to [Equation 12] and [Equation 13], a predictor for a difference of each CPMV may exist. According to an embodiment, a difference of a CPMV may be determined based on a difference of another CPMV. This is based on a similarity between differences of CPMVs. That is, if a predictor of one CPMV is determined, a predictor of another CPMV may be determined using a small amount of information since differences of the CPMVs are similar. For example, a difference predictor of a CPMV may be signaled, and a difference from the difference predictor of the CPMV may be signaled from the encoder to the decoder. [Equation 12] assumes the case in which the 4-parameter model is used, and [Equation 13] assumes the case in which the 6-parameter model is used.

Referring to [Equation 12] and [Equation 13], the encoder/decoder may determine a difference of each CPMV and the CPMV based on a difference (mvd0) of mv0 corresponding to CPMV 0. mvd0, mvd1, and mvd2 in [Equation 12] and [Equation 13] may be signaled from the encoder to the decoder. In comparison with the method described above with reference to FIG. 15, the method of [Equation 12] and [Equation 13] may have different values of signaled mvd1 and mvd2 even though the same predictors as those in the method of FIG. 15 is used. If differences from predictors of CPMV mv0, mv1, and mv2 are similar, it is possible that absolute values of mdv1 and mvd2 are smaller in the method of [Equation 12] and [Equation 13] than in the method of FIG. 15, and thus signaling overhead of mvd1 and mvd2 may be effectively reduced through the method of [Equation 12] and [Equation 13]. The encoder/decoder may determine that a difference from the predictor of mv1 is (mvd1+mvd0) and that a difference from the predictor of mv2 is (mvd2+mvd0). In [Equation 12] and [Equation 13], elements with upper bars may indicate predictors of CMVPs.

According to an embodiment of the present invention, the encoder/decoder may determine a motion vector difference based on [Equation 14] below. In this case, [Equation 12] and [Equation 13] described above may be applied.

lMvd[cpIdx][compIdx]=abs_mvd_greater0_flag[cpIdx][compIdx]*(abs_mvd_minus2[cpIdx][compIdx]+2)*(1−2*mvd_sign_flag[cpIdx][compIdx])  [Equation 14]

According to an embodiment, the motion vector difference may be signaled according to [Table 1] described above or [Table 2] described below. The signaled motion vector difference may be lMvd in [Equation 14]. Further, the signaled mvds in [Equation 12] and [Equation 13], that is, mvd0, mvd1, and mvd2 may be lMvd in [Equation 14]. In [Equation 14], MvdLX may indicate a difference from a predictor of each CPMV That is, MvdLX may be (mv−mvp). In this case, as described in [Equation 12] and [Equation 13], for CPMV 0, the signaled motion vector difference may be directly used as a difference (MvdLX) for the CPMV For other CPMVs, the signaled motion vector difference may be used as MvdLX corresponding to the difference of the CPMV based on the signaled motion vector differences (mvd1 and mvd2 in [Equation 12] and [Equation 13]) and the signaled motion vector difference for CPMV 0 (mvd0 in [Equation 12] and [Equation 13]).

In [Equation 14], LX may indicate a reference list X. compIdx denotes a component index, and may indicate x and y components. cpIdx denotes a control point index. cpIdx may be 0 or 1, or 0, 1, or 2 in [Equation 12] or [Equation 13]. According to an embodiment, the encoder/decoder may consider a resolution of the motion vector difference in [Table 1], [Equation 14], and [Table 2]. For example, when the resolution is R, a value of lMvd*R may be used for lMvd in [Equation 14]. [Table 2] below shows a motion vector difference syntax structure according to an embodiment of the present invention.

TABLE 2

|  | Descriptor |
|---|---|
| mvd_coding( x0, y0, refList , cpIdx ) { | |
|   abs_mvd_greater0_flag[cpIdx][ 0 ] | ae(v) |
|   abs_mvd_greater0_flag[cpIdx][ 1 ] | ae(v) |
|   if( abs_mvd_greater0_flag[cpIdx][ 0 ] ) | |
|     abs_mvd_greater1_flag[cpIdx][ 0 ] | ae(v) |
|   if( abs_mvd_greater0_flag[cpIdx][ 1 ] ) | |
|     abs_med_greater1_flag[cpIdx][ 1 ] | ae(v) |
|   if( abs_med_greater0_flag[cpIdx][ 0 ] ) { | |
|     if( abs_mvd_greater1_flag[cpIdx][ 0 ] ) | |
|       abs_mvd_minus2[cpIdx][ 0 ] | ae(v) |
|     mvd_sign_flag[cpIdx][ 0 ] | ae(v) |
|   } | |
|   if( abs_mvd_greater0_flag[cpIdx][ 1 ] ) { | |
|     if( abs_mvd_greater1_flag[cpIdx][ 1 ] ) | |
|       abs_mvd_minus2[cpIdx][ 1 ] | ae(v) |
|     mvd_sign_flag[cpIdx][ 1 ] | ae(v) |
|   } | |
| } | |

Referring to [Table 2], the motion vector difference may be coded through substantially the same method as that described in [Table 1]. In this case, the motion vector difference may be individually coded according to cpIdx and/or the control point index.

Figure 16:
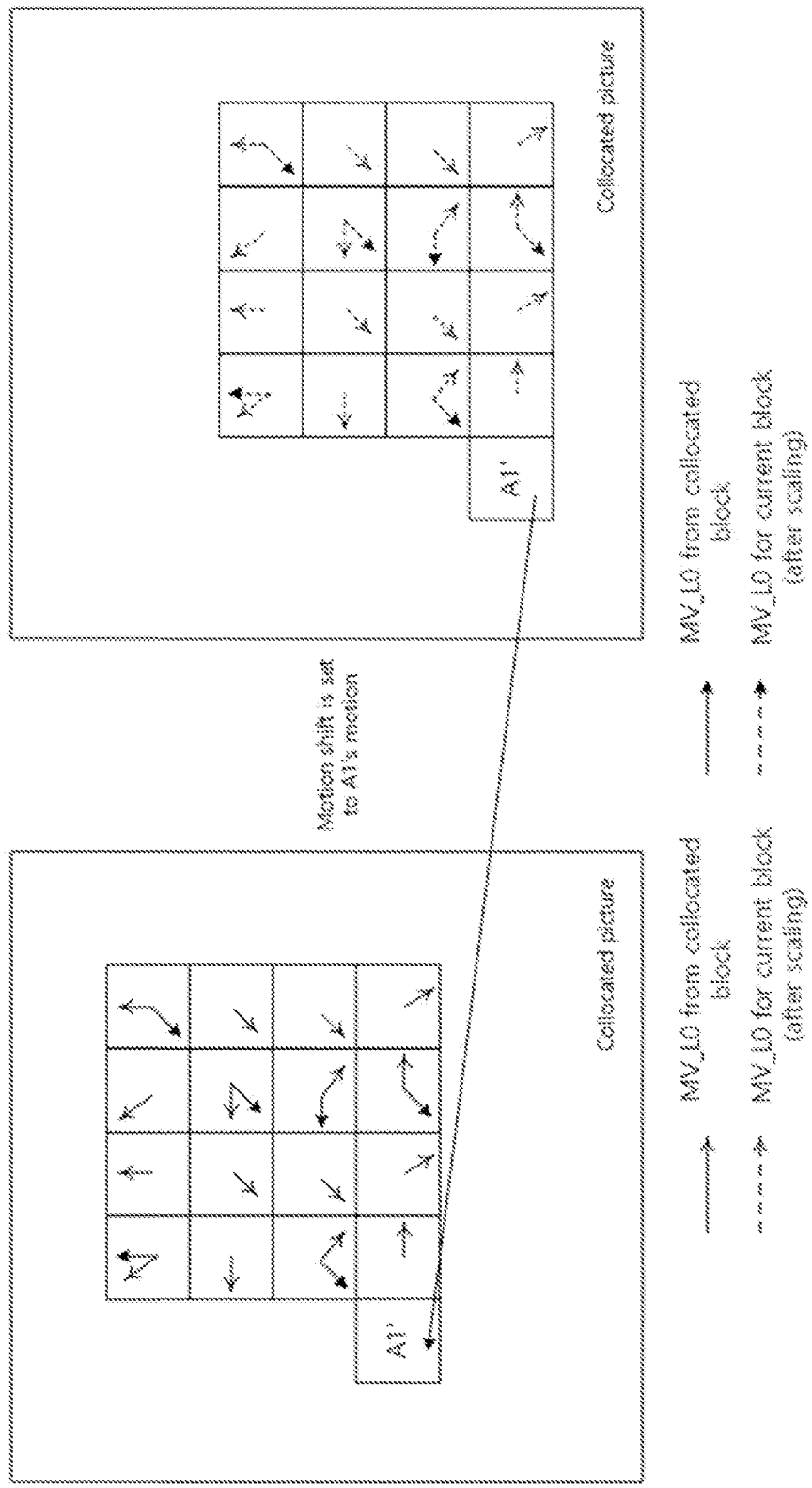
FIG. 16 illustrates a Subblock-based Temporal MVP (SbTMVP) according to an embodiment of the present invention.

FIG. 16 illustrates a Subblock-based Temporal MVP (SbTMVP) according to an embodiment of the present invention. According to an embodiment of the present invention, the encoder/decoder may fetch (or induce) a motion vector of a temporal neighboring block in units of subblocks. For example, the encoder/decoder may fetch motion vectors corresponding to subblocks of the current block from another picture. Here, the block may be a CU, and the subblock may be a sub-CU. Further, another picture may be a collocated picture. In the present invention, the SbTMVP may be referred to as a subblock-based temporal merge candidate or an Alternative Temporal Motion Vector Predictor (ATMVP).

According to an embodiment of the present invention, when the SbTMVP mode is applied, the encoder/decoder may search for a block (referred to as a corresponding block or a reference block) corresponding to the current block in another picture. In this case, the corresponding block may be referred to as a collocated block. According to an embodiment, the collocated block may be determined as a block of another picture corresponding to a preset location, such as a bottom-right location or a central location of the current block. In the SbTMVP, the collocated block may be a motion-compensated block. For example, the encoder/decoder may find the collocated block with reference to motion vectors around the current block.

Referring to FIG. 16, the collocated block may be determined (or induced) as a block moved from the location of the current block within another picture by a motion vector at the location A1 among neighboring blocks of the current block. The motion vector indicating (facing) the collocated block may be induced based on motion vectors of candidates found through scanning of preset locations around the current block according to a preset order. As another embodiment, the motion vector indicating the collocated block may be determined based on some of the merge candidate list. For example, the encoder/decoder may determine the collocated block based on a first merge candidate in the merge candidate list.

Further, according to an embodiment of the present invention, the encoder/decoder may determine (or induce) motion information of subblocks of the current block from motion information of subblocks of the collocated block. In this specification, a motion vector may be motion information including information on whether a motion vector, a reference index, and a reference list are used in spite of the expression. Subblocks of the collocated block which is the foundation of motion information of subblocks of the current block may have the same relative locations within the block (CU). That is, two subblocks may have the same relative locations within the block.

Further, according to an embodiment of the present invention, when the SbTMVP is used, the subblock size may be fixed to a predefined size. For example, the subblock size may be fixed to 8×8. According to another embodiment, the subblock size may be variable. In this case, in order to determine the variable subblock size, signaling in units of sequences, pictures, slices, CTUs, or CUs may exist. For example, the subblock size may be variably determined as 4×4 or 8×8.

Figure 17:
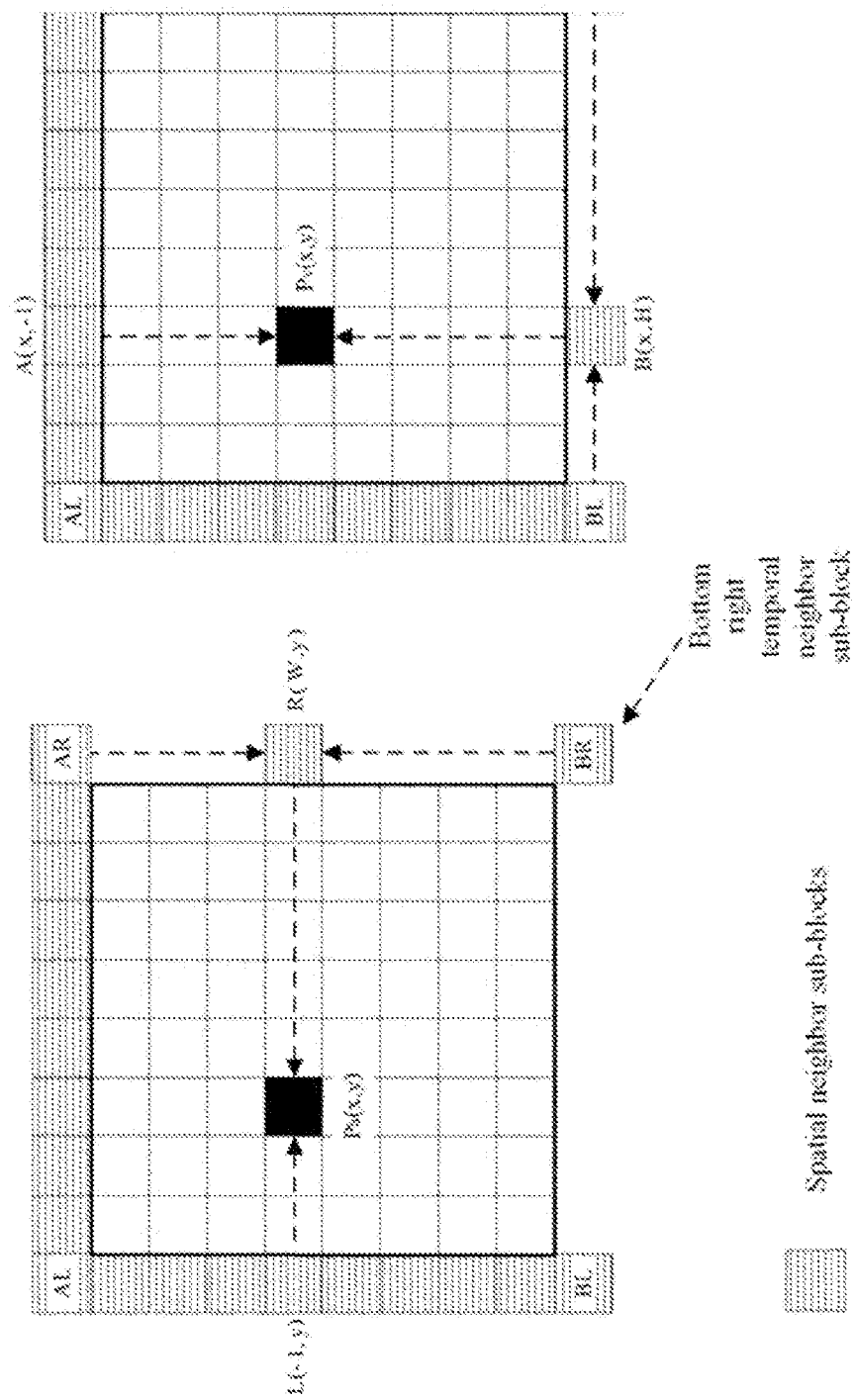
FIG. 17 illustrates planar MVP according to an embodiment of the present invention.

FIG. 17 illustrates planar MVP according to an embodiment of the present invention. According to an embodiment of the present invention, the encoder/decoder may generate a motion vector field in units of subblocks of the current block through a planar MVP method. Further, the encoder/decoder may refer to neighboring motion vectors through the planar MVP method. In addition, the encoder/decoder may determine a subblock motion vector based on linear weighted summation of one or more neighboring motion vectors in the planar MVP method. In this case, the neighboring motion vector may include motion information extrapolated from a motion vector of an adjacent block. For example, the encoder/decoder may perform an extrapolation process on a motion vector in the bottom side or right side of the current block using the motion vector of the adjacent block.

Referring to FIG. 17, a motion vector P(x,y) corresponding to the subblock of the current block may be determined based on P_h(x,y) or P_v(x,y). In FIG. 17, W and H indicates the width and the height of the current block, respectively. In this case, P_h(x,y) may be determined based on L(−1,y) or R(W,y). L(−1,y) may be a motion vector corresponding to a subblock adjacent to the current block in the left side of the current subblock. R(W,y) may be a value based on a motion vector corresponding to the top-right side of the current block and a temporal motion vector corresponding to the bottom-right side of the current block. P_v(x,y) may be determined based on A(x,−1) or B(x,H). A(x,−1) may be a motion vector corresponding to a subblock adjacent to the current block in the top side of the current subblock. B(x,H) may be a value obtained through weighted summarization based on a motion vector corresponding to the bottom-left side of the current block and a top-right motion vector corresponding to the bottom-right side of the current block.

[Table 3] shows an inter prediction-related syntax structure according to an embodiment of the present invention.

TABLE 3

|  | Descriptor |
|---|---|
| coding_unit( x0, y0, cbWidth, cbHeight, treeType ) { | |
|   { /* MODE_INTER */ | |
|     if( cu_skip_flag[ x0 ][ y0 ] ) { | |
|       if( sps_affine_enabled_flag && cbWidth >= 8 && cbHeight >= 8 ) | |
|         merge_subblock_flag[ x0 ][ y0 ] | ae(v) |
|       if( merge_subblock_flag[ x0 ][ y0 ] = = 0 && MaxNumMergeCand > 1 ) | |
|         merge_idx[ x0 ][ y0 ] | ae(v) |
|       if( merge_subblock_flag[ x0 ][ y0 ] = = 1 && MaxNumSubblockMergeCand > 1 ) | |
|         merge_subblock_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         if( sps_affine_enabled_flag && cbWidth >= 8 && cbHeight >= 8) | |
|           merge_subblock_flag[ x0 ][ y0 ] | ae(v) |
|         if( merge_subblock_flag[ x0 ][ y0 ] = = 0 && MaxNumMergeCand > 1 ) | |
|           merge_idx[ x0 ][ y0 ] | ae(v) |
|         if( merge_subblock_flag[ x0 ][ y0 ] = = 1 && MaxNumSubblockMergeCand > 1 ) | |
|           merge_subblock_idx[ x0 ][ y0 ] | ae(v) |
|       } else { | |
|         if( slice_type = = B ) | |

TABLE 3-continued

|  | Descriptor |
|---|---|
|     inter_pred_idc[ x0 ][ y0 ] | ae(v) |
|     if( sps_affine_enabled_flag cbWidth >= 16 && cbHeight >= 16 ) { |  |
|       inter_affine_flag[ x0 ][ y0 ] | ae(v) |
|       if( sps_affine_type_flag && inter_affine_flag[ x0 ][ y0 ] ) |  |
|         cu_affine_type_flag[ x0 ][ y0 ] | ae(v) |
|     } |  |
|     if( inter_pred_idc[ x ][ y0 ] != PRED_L1 ) { |  |
|       if( num_ref_idx_l0_active_minus1 > 0 ) |  |
|         ref_idx_l0[ x0 ][ y0 ] | ae(v) |
|       mvd_coding( x0, y0, 0, 0 ) |  |
|       if( MotionModelIdc[ x0 ][ y0 ] > 0 ) |  |
|         mvd_coding( x0, y0, 0, 1 ) |  |
|       if(MotionModelIdc[ x0 ][ y0 ] > 1 ) |  |
|         mvd_coding( x0, y0, 0, 2 ) |  |
|       mvp_l0_flag[ x0 ][ y0 ] | ae(v) |
|     } else { |  |
|       MvdL0[ x0 ][ y0 ][ 0 ] = 0 |  |
|       MvdL0[ x0 ][ y0 ][ 1 ] = 0 |  |
|     } |  |
|     if( inter_pred_idc[ x0 ][ y0 ] != PRED_L0 ) { |  |
|       if( num_ref_idx_l1_active_minus1 > 0 ) |  |
|         ref_idx_l1[ x0 ][ y0 ] | ae(v) |
|       if( mvd_l1_zero_flag && inter_pred_idc[ x0 ][ y0 ] = = PRED_BI ) { |  |
|         MvdL1[ x0 ][ y0 ][ 0 ] = 0 |  |
|         MvdL1[ x0 ][ y0 ][ 1 ] = 0 |  |
|         MvdCpL1[ x0 ][ y0 ][ 0 ][ 0 ] = 0 |  |
|         MvdCpL1[ x0 ][ y0 ][ 0 ][ 1 ] = 0 |  |
|         MvdCpL1[ x0 ][ y0 ][ 1 ][ 0 ] = 0 |  |
|         MvdCpL1[ x0 ][ y0 ][ 1 ][ 1 ] = 0 |  |
|         MvdCpL1[ x0 ][ y0 ][ 2 ][ 0 ] = 0 |  |
|         MvdCpL1[ x0 ][ y0 ][ 2 ][ 1 ] = 0 |  |
|       } else { |  |
|         mvd_coding( x0, y0, 1, 0 ) |  |
|         if( MotionModelIdc[ x0 ][ y0 ] > 0 ) |  |
|           mvd_coding( x0, y0, 1, 1 ) |  |
|         if(MotionModelIdc[ x0 ][ y0 ] > 1 ) |  |
|           mvd_coding( x0, y0, 1, 2 ) |  |
|         mvp_l1_flag[ x0 ][ y0 ] | ae(v) |
|       } else { |  |
|         MvdL1[ x0 ][ y0 ][ 0 ] = 0 |  |
|         MvdL1[ x0 ][ y0 ][ 1 ] = 0 |  |
|       } |  |
|       if( sps_amvr_enabled_flag && inter_affine_flag = = 0 && |  |
|         ( MvdL0[ x0 ][ y0 ][ 0 ] != 0 \| \| MvdL0[ x0 ][ y0 ][ 1 ] != 0 \| \| |  |
|         MvdL1[ x0 ][ y0 ][ 0 ] != 0 \| \| MvdL1[ x0 ][ y0 ][ 1 ] != 0 ) ) |  |
|         amvr_mode[ x0 ][ y0 ] | ae(v) |
|     } |  |
|   } |  |
| } |  |
| if( CuPredMode[ x0 ][ y0 ] != MODE_INTRA && cu_skip_flag[ x0 ][ y0 ] = = 0 ) |  |
|   cu_cbf | ae(v) |
| if( cu_cbf ) { |  |
|   transform_tree( x0, y0, cbWidth, cbHeight, treeType ) |  |
| } |  |

According to an embodiment of the present invention, an inter prediction method may include a skip mode, a merge mode, an inter mode, and the like. As an embodiment, a residual signal may not be transmitted in the skip mode. Further, an MV determination method such as the merge mode may be applied in the skip mode. For example, whether to use the skip mode may be determined according to a skip flag (or a syntax element). Referring to [Table 3], whether to use the skip mode may be determined according to a value of cu_skip_flag. The cu_skip_flag indicates whether the skip mode is applied to the current Cu.

In an embodiment, when the merge mode is applied, a motion vector difference may not be used. In this case, the encoder/decoder may determine a motion vector based on a motion candidate index. For example, whether to use the merge mode may be determined according to a merge flag (or a syntax element). Referring to [Table 3], whether to apply the merge mode may be determined according to a value of the merge flag (that is, merge flag). When the skip mode is not used, the merge mode may be used.

According to an embodiment of the present invention, the encoder/decoder may selectively use a candidate list set among one or more candidate list sets in the skip mode or the merge mode. For example, the candidate list sets may include a candidate list using a merge candidate and/or a candidate list using a subblock-based merge candidate. Further, the merge candidate may include a spatial neighboring candidate, a temporal neighboring candidate, and the like. The merge candidate may include a candidate using motion vectors for the entire current block (CU). That is, motion vectors of respective subblocks belonging to the current block may include the same candidate. Further, the subblock merge candidate may include a subblock-based temporal Motion Vector (MV), an affine merge candidate, and the like. According to an embodiment, the subblock merge candidate may include a candidate using a difference motion vector for each subblock of the current block (CU). In an embodiment, the affine merge candidate may indicate a merge candidate for determining a CPMV of affine motion prediction without any motion vector difference. Further, the subblock merge candidate may include methods of determining a motion vector in units of subblocks in the current block. For example, the subblock merge candidate may include a planar MV, a regression-based MV, an STMVP, and the like as well as the subblock-based temporal MV and the affine merge candidate.

According to an embodiment of the present invention, the encoder/decoder may use the motion vector difference in the inter mode. A motion vector predictor may be determined based on a motion candidate index, and a motion vector may be determined based on the motion vector predictor and the motion vector difference. Whether to use the inter mode may be determined according to information on whether other modes are used or not. As another embodiment, whether to use the inter mode may be determined by a flag (or a syntax element). In [Table 3], it is assumed that the inter mode is used when other modes, that is, the skip mode and the merge mode are not used. In an embodiment, the inter mode may include an AMVP mode, an affine inter mode, and the like. The inter mode may be a mode for determining a motion vector based on a motion vector predictor and a motion vector difference. In the affine inter mode, the encoder/decoder may use the motion vector difference when determining a CPMV of affine motion prediction.

Referring to [Table 3], after determining the skip mode or the merge mode, the encoder/decoder may determine whether to use a subblock merge candidate or a merge candidate. For example, when a specific condition is satisfied, the decoder may parse merge_subblock_flag indicating whether the subblock merge candidate is used. In this case, the specific condition may be a condition related to the block size. For example, the condition may be a condition related to a width, a height, an area, or the like, or may be a condition including a combination thereof.

Referring to [Table 3], for example, the specific condition may indicate whether a width and a height of the current block (CU) is larger than or equal to a specific value. When merge_subblock_flag is not parsed, the encoder/decoder may infer that the value is 0. The encoder/decoder may use the subblock merge candidate if merge_subblock_flag is 1, and use the merge candidate if merge_subblock_flag is 0. When the subblock merge candidate is used, merge_subblock_idx denoting an index (or a syntax element) indicating a specific candidate within a candidate list (subblock merge candidate list) may be parsed. When the merge candidate is used, a merge index denoting an index indicating a specific candidate within a candidate list (merge candidate list) may be parsed. When the maximum number of candidate lists is 1, the encoder/decoder may not perform parsing. That is, the encoder/decoder may parse the index in the case in which the maximum number of candidate lists is larger than 1. When merge_subblock_idx or the merge index is not parsed, the encoder/decoder may infer that the value is 0.

[Table 3] shows a coding unit function, and the content related to intra prediction may be omitted therein. [Table 3] is an example in the case in which it is determined that inter prediction is applied.

Hereinafter, a method of configuring a subblock merge candidate list according to an embodiment of the present invention is described. [Table 3] has described the subblock merge candidate, and the method of configuring the subblock merge candidate list is described hereinafter. According to an embodiment of the present invention, the encoder/ decoder may determine whether to add a candidate to the candidate list in consideration of the current block size or the subblock size. The sizes may be defined based on the width, height, area, or the like of the subblock.

In an embodiment, when there are a plurality of candidates which can belong to the subblock merge candidate, it may be determined whether to add the candidates to the candidate list in consideration of the size of the current block if sizes of subblocks of the plurality of candidates are different. Further, the condition that considers the size of the current block with respect to any candidate may be based on the size of the subblock of the candidate. The candidate (before being added to the candidate list) may refer to an MVP method or mode, or can include all methods of making an MVP or an MV The candidate added to the candidate list may refer to a candidate, MVP method, mode, or the like available for the current block.

According to an embodiment of the present invention, the encoder/decoder may determine a candidate to be added to the candidate list according to a block size condition of the current block. For example, the encoder/decoder may determine whether to add the candidate to the candidate list according to whether the size of the current block is larger than or equal to a threshold of the size of any block. Further, the block size condition or the threshold may be determined according to the subblock size of any candidate. This is because compression efficiency can be increased through subblock-based prediction in a block larger than the subblock or a block sufficiently larger block than the subblock. For example, in the case of a block equal to or smaller than the subblock, it may not be possible to acquire motion information in units of subblocks, which may not contribute to compression efficiency even though the subblock-based prediction is applied.

In an embodiment, the encoder/decoder may configure a first candidate list when the size of the current block is equal to or smaller than a preset size, and configure a second candidate list when the size of the current block is larger than or equal to the preset size. Further, the type of candidates belonging to the second candidate list may include the type of candidates belonging to the first candidate list. For example, when the subblock size of a first mode is configured as a first subblock size and the subblock size of a second mode is configured as a second subblock size, the encoder/decoder may add only the second mode to the candidate list if the current block is equal to the preset size, and add both the first mode and the second mode to the candidate list if the current block is larger than the preset size. For example, the first subblock size may be 8×8, and the second subblock size may be 4×4. Further, the preset size may be 8×8. Alternatively, the preset size may have a width (or height) of 8. For example, the first mode may be the SbTMVP, and the second mode may be the affine merge mode.

In an embodiment, the subblock-based merge candidate list may be configured (or generated) through the following method. Hereinafter, first, i is configured as 0 (i=0).

If a value of (availableFlagSbCol && blockSizeCondition) is true, subblockMergeCandList[i++] is configured as SbCol. That is, SbCol may be added to the candidate list. subblockMergeCandList[i++] indicates an i++th subblock merge candidate within the subblock merge candidate list, and SbCol indicates a subblock-based temporal merge candidate (or SbTMVP).

If a value of (availableFlagA && i<MaxNumSubblockMergeCand) is true, subblockMergeCandList[i++] is configured as A. That is, the candidate A (or candidate at the location A) may be added as the next candidate.

If a value of (availableFlagB && i<MaxNumSubblockMergeCand) is true, subblockMergeCandList[i++] is configured as B. That is, the candidate B may be added as the next candidate.

If a value of (availableFlagConst1 && i<MaxNumSubblockMergeCand) is true, subblockMergeCandList[i++] is configured as Const1. That is, the candidate Const1 may be added as the next candidate. Const1 indicates a first candidate among the configured candidates.

If a value of (availableFlagConst2 && i<MaxNumSubblockMergeCand) is true, subblockMergeCandList[i++] is configured as Const2. That is, the candidate Const2 may be added as the next candidate. Const2 indicates a second candidate among the configured candidates.

If a value of (availableFlagConst3 && i<MaxNumSubblockMergeCand) is true, subblockMergeCandList[i++] is configured as Const3. That is, the candidate Const3 may be added as the next candidate. Const3 indicates a third candidate among the configured candidates.

If a value of (availableFlagConst4 && i<MaxNumSubblockMergeCand) is true, subblockMergeCandList[i++] is configured as Const4. That is, the candidate Const4 may be added as the next candidate. Const4 indicates a fourth candidate among the configured candidates.

If a value of (availableFlagConst5 && i<MaxNumSubblockMergeCand) is true, subblockMergeCandList[i++] is configured as Const5. That is, the candidate Const5 may be added as the next candidate. Const5 indicates a fifth candidate among the configured candidates.

If a value of (availableFlagConst6 && i<MaxNumSubblockMergeCand) is true, subblockMergeCandList[i++] is configured as Const6. That is, the candidate Const1 may be added as the next candidate. Const6 indicates a sixth candidate among the configured candidates.

According to an embodiment of the present invention, the encoder/decoder adds the candidate SbCol to the candidate list subblockMergeCandList only when a predefined block size condition is satisfied. In an embodiment, the block size condition for determining whether to add the SbTMVP to the candidate list may be determined according to the subblock size of the SbTMVP. For example, specifically, the block size condition may be (cbWidth>=16 && cbHeight>=16). Here, cbWidth denotes the width of a current coding block, and cbHeight denotes the height of the current coding block. Further, A, B, Const1, Const2, Const3, Const4, Const5, and Const6 may be affine merge candidates. A and B may be affine-inherited candidates, and ConstX (X is one of 1 to 6) may be an affine-configured candidate.

In another embodiment, the encoder/decoder may determine whether to parse a candidate index according to the block size condition of the current block. For example, when there are a plurality of candidates, the encoder/decoder may not parse a candidate index if all candidates except for one of the plurality of candidates are not added to the candidate list according to the block size condition and another condition. For example, when the number of candidates which can be added to the candidate list is two, the encoder/decoder may determine whether to parse candidate indexes according to the block size condition. For example, when one of the two candidates which can be added to the candidate list does not satisfy the block size condition, the encoder/decoder may not parse candidate indexes.

[Table 4] below shows inter prediction-related syntax according to an embodiment of the present invention.

TABLE 4

| | Descriptor |
|---|---|
| coding_unit( x0, y0, cbWidth, cbHeight, treeType ) { | |
|   { /* MODE_INTER */ | |
|     if( cu_skip_flag[ x0 ][ y0 ] ) { | |
|       if( sps_affine_enabled_flag && cbWidth >= 16 && cbHeight >= 16 ) | |
|         merge_subblock_flag[ x0 ][ y0 ] | ae(v) |
|       if( merge_subblock_flag[ x0 ][ y0 ] = = 0 && MaxNumMergeCand > 1 ) | |
|         merge_idx[ x0 ][ y0 ] | ae(v) |
|       if( merge_subblock_flag[ x0 ][ y0 ] = = 1 && MaxNumSubblockMergeCand > 1 ) | |
|         merge_subblock_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         if( sps_affine_enabled_flag && cbWidth >= 16 && cbHeight >= 16) | |
|           merge_subblock_flag[ x0 ][ y0 ] | ae(v) |
|         if( merge_subblock_flag[ x0 ][ y0 ] = = 0 && MaxNumMergeCand > 1 ) | |
|           merge_idx[ x0 ][ y0 ] | ae(v) |
|         if( merge_subblock_flag[ x0 ][ y0 ] = = 1 && MaxNumSubblockMergeCand > 1 ) | |
|           merge_subblock_idx[ x0 ][ y0 ] | ae(v) |
|       } else { | |
|         if( slice_type = = B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |

TABLE 4-continued

|  | Descriptor |
|---|---|
|       ref_idx_l0[ x0 ][ y0 ] | ae(v) |
|      mvd_coding( x0, y0, 0, 0 ) | |
|      if( MotionModelIdc[ x0 ][ y0 ] > 0 ) | |
|        mvd_coding( x0, y0, 0, 1 ) | |
|      if(MotionModelIdc[ x0 ][ y0 ] > 1 ) | |
|        mvd_coding( x0, y0, 0, 2 ) | |
|      mvp_l0_fag[ x0 ][ y0 ] | ae(v) |
|    } else { | |
|      MvdL0[ x0 ][ y0 ][ 0 ] = 0 | |
|      MvdL0[ x0 ][ y0 ][ 1 ] = 0 | |
|    } | |
|    if( inter_pred_idc[ x0 ][ y0 ] != PRED_L0 ) { | |
|      if( num_ref_idx_l1_active_minus1 > 0 ) | |
|        ref_idx_l1[ x0 ][ y0 ] | ae(v) |
|      if( mvd_l1_zero_flag && inter_pred_idc[ x0 ][ y0 ] PRED_BI ) { | |
|        MvdL1[ x0 ][ y0 ][ 0 ] = 0 | |
|        MvdL1[ x0 ][ y0 ][ 1 ] = 0 | |
|        MvdCpL1[ x0 ][ y0 ][ 0 ][ 0 ] = 0 | |
|        MvdCpL1[ x0 ][ y0 ][ 0 ][ 1 ] = 0 | |
|        MvdCpL1[ x0 ][ y0 ][ 1 ][ 0 ] = 0 | |
|        MvdCpL1[ x0 ][ y0 ][ 1 ][ 1 ] = 0 | |
|        MvdCpL1[ x0 ][ y0 ][ 2 ][ 0 ] = 0 | |
|        MvdCpL1[ x0 ][ y0 ][ 2 ][ 1 ] = 0 | |
|      } else { | |
|        mvd_coding( x0, y0, 1, 0 ) | |
|        if( MotionModelIdc[ x0 ][ y0 ] > 0 ) | |
|          mvd_coding( x0, y0, 1, 1 ) | |
|        if(MotionModelIdc[ x0 ][ y0 ] > 1 ) | |
|          mvd_coding( x0, y0, 1, 2 ) | |
|        mvp_l1_flag[ x0 ][ y0 ] | ae(v) |
|      } else { | |
|        MvdL1[ x0 ][ y0 ][ 0 ] = 0 | |
|        MvdL1[ x0 ][ y0 ][ 1 ] = 0 | |
|      } | |
|      if( sps_amvr_enabled_flag && inter_affine_flag = = 0 && | |
|        ( MvdL0[ x0 ][ y0 ][ 0 ] != 0 \| \| MvdL0[ x0 ][ y0 ][ 1 ] != 0 \| \| | |
|          MvdL1[ x0 ][ y0 ][ 0 ] != 0 \| \| MvdL1[ x0 ][ y0 ][ 1 ] != 0 ) ) | |
|        amvr_mode[ x0 ][ y0 ] | ae(v) |
|      } | |
|    } | |
|  } | |
|  if( CuPredMode[ x0 ][ y0 ] != MODE_INTRA && cu_skip_flag[ x0 ][ y0 ] = = 0 ) | |
|    cu_cbf | ae(v) |
|  if( cu_cbf ) { | |
|    transform_tree( x0, y0, cbWidth, cbHeight, treeType ) | |
| } | |

According to an embodiment of the present invention, when the size of the current block is larger than the subblock size, a subblock mode may be used. For example, when there are a plurality of candidates which can be added to the subblock merge candidate list and subblock sizes of the plurality of candidates are the same as each other, the subblock merge mode may be used if the size of the current block is larger than the subblock size. In a detailed example, when the subblock size is 8×8 and the size of the current block is larger than or equal to 16×16 (or the width or height is larger than or equal to 16), the subblock mode may be used. The use of the subblock mode may indicate whether a flag indicating whether a mode corresponding to the subblock mode is used is parsed. Further, the flag indicating whether the mode corresponding to the subblock mode is used may be merge_subblock_flag, inter_affine_flag, or the like. In [Table 4], the description that overlaps that in [Table 3] is omitted.

According to an embodiment of the present invention, referring to [Table 4], the decoder may parse merge_subblock_flag and inter_affine_flag only when cbWidth>=16 and cbHeight>=16. As another embodiment, the encoder/decoder may use the subblock mode even when the size of the current block is equal to the subblock size as well as the case in which the size of the current block is larger than the subblock size. This is because a motion compensation method of the subblock mode may be different from modes other than the subblock mode. In this specification, the subblock-based merge mode may be referred to as the subblock mode.

[Table 5] below shows inter prediction-related syntax according to an embodiment of the present invention.

TABLE 5

|  | Descriptor |
|---|---|
| coding_unit( x0, y0, cbWidth, cbHeight, treeType ) { | |
|   { /* MODE_INTER */ | |
|     if( cu_skip_flag[ x0 ][ y0 ] ) { | |
|       if( sps_affine_enabled_flag && (cbWidth >= 8 \|\| cbHeight >= 8) ) | |
|         merge_subblock_flag[ x0 ][ y0 ] | ae(v) |
|       if( merge_subblock_flag[ x0 ][ y0 ] = = 0 && MaxNumMergeCand > 1 ) | |
|         merge_idx[ x0 ][ y0 ] | ae(v) |
|       if( merge_subblock_flag[ x0 ][ y0 ] = = 1 && MaxNumSubblockMergeCand > 1 ) | |
|         merge_subblock_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         if( sps_affine_enabled_flag && (cbWidth >= 8 \|\| cbHeight >= 8)) | |
|           merge_subblock_flag[ x0 ][ y0 ] | ae(v) |
|         if( merge_subblock_flag[ x0 ][ y0 ] = = 0 && MaxNumMergeCand > 1 ) | |
|           merge_idx[ x0 ][ y0 ] | ae(v) |
|         if( merge_subblock_flag[ x0 ][ y0 ] = = 1 && MaxNumSubblockMergeCand > 1 ) | |
|           merge_subblock_idx[ x0 ][ y0 ] | ae(v) |
|       } else { | |
|         if( slice_type = = B ) | |
|           inter_pred_idc[ x0 ][ y0 ] | ae(v) |
|         if( sps_affine_enabled_flag && (cbWidth >= 16 \|\| cbHeight >= 16) ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|         if( inter_pred_idc[ x0 ][ y0 ] != PRED_L1 ) { | |
|           if( num_ref_idx_l0_active_minus1 > 0 ) | |
|             ref_idx_l0[ x0 ][ y0 ] | ae(v) |
|           mvd_coding( x0, y0, 0, 0 ) | |
|           if( MotionModelIdc[ x0 ][ y0 ] > 0 ) | |
|             mvd_coding( x0, y0, 0, 1 ) | |
|           if(MotionModelIdc[ x0 ][ y0 ] > 1 ) | |
|             mvd_coding( x0, y0, 0, 2 ) | |
|           mvp_l0_flag[ x0 ][ y0 ] | ae(v) |
|         } else { | |
|           MvdL0[ x0 ][ y0 ][ 0 ] = 0 | |
|           MvdL0[ x0 ][ y0 ][ 1 ] = 0 | |
|         } | |
|         if( inter_pred_idc[ x0 ][ y0 ] != PRED_L0 ) { | |
|           if( num_ref_idx_l1_active_minus1 > 0 ) | |
|             ref_idx_l1[ x0 ][ y0 ] | ae(v) |
|           if( mvd_l1_zero_flag && inter_pred_idc[ x0 ][ y0 ] = = PRED_BI ) { | |
|             MvdL1[ x0 ][ y0 ][ 0 ] = 0 | |
|             MvdL1[ x0 ][ y0 ][ 1 ] = 0 | |
|             MvdCpL1[ x0 ][ y0 ][ 0 ][ 0 ] = 0 | |
|             MvdCpL1[ x0 ][ y0 ][ 0 ][ 1 ] = 0 | |
|             MvdCpL1[ x0 ][ y0 ][ 1 ][ 0 ] = 0 | |
|             MvdCpL1[ x0 ][ y0 ][ 1 ][ 1 ] = 0 | |
|             MvdCpL1[ x0 ][ y0 ][ 2 ][ 0 ] = 0 | |
|             MvdCpL1[ x0 ][ y0 ][ 2 ][ 1 ] = 0 | |
|           } else { | |
|             mvd_coding( x0, y0, 1, 0 ) | |
|             if( MotionModelIdc[ x0 ][ y0 ] > 0 ) | |
|               mvd_coding( x0, y0, 1, 1 ) | |
|             if(MotionModelIdc[ x0 ][ y0 ] > 1 ) | |
|               mvd_coding( x0, y0, 1, 2 ) | |
|             mvp_l1_flag[ x0 ][ y0 ] | ae(v) |
|           } else { | |
|             MvdL1[ x0 ][ y0 ][ 0 ] = 0 | |
|             MvdL1[ x0 ][ y0 ][ 1 ] = 0 | |
|           } | |
|           if( sps_amvr_enabled_flag && inter_affine_flag = = 0 && | |
|             ( MvdL0[ x0 ][ y0 ][ 0 ] != 0 \|\| MvdL0[ x0 ][ y0 ][ 1 ] != 0 \|\| | |
|               MvdL1[ x0 ][ y0 ][ 0 ] != 0 \|\| MvdL1[ x0 ][ y0 ][ 1 ] != 0 ) ) | |
|             amvr_mode[ x0 ][ y0 ] | ae(v) |
|         } | |
|       } | |
|     } | |
|   } | |
|   if( CuPredMode[ x0 ][ y0 ] != MODE_INTRA && cu_skip_flag[ x0 ][ y0 ] = = 0 ) | |
|     cu_cbf | ae(v) |
|   if( cu_cbf ) { | |
|     transform_tree( x0, y0, cbWidth, chHeight, treeType ) | |
| } | |

According to an embodiment of the present invention, when the width of the current block satisfies a specific condition or the height of the current block satisfies a specific condition, the subblock mode may be used. For example, this is because a plurality of subblocks may exist within the current block even though the width or the height of the current block is equal to the size of one side of the subblock size, if the width or the height is larger than the size of one side (or the size of another side) of the subblock size. Accordingly, when the width of the current block is larger than the width of the subblock or when the height of the current block is larger than the height of the subblock, the subblock mode may be used. Alternatively, when the width of the current block is larger than or equal to the width of the subblock or when the height of the current block is larger than or equal to the height of the subblock, the subblock mode may be used. In [Table 5], the description that overlaps that in [Table 3] and [Table 4] is omitted. Referring to [Table 5], when the width of the current block is larger than or equal to 8 or the height of the current block is larger than or equal to 8, the encoder/decoder may use the subblock merge mode. When the width of the current block is larger than or equal to 16 or the height of the current block is larger than or equal to 16, the decoder may use the affine inter mode.

[Table 6] and [Table 7] below show subblock merge-related syntax according to an embodiment of the present invention.

TABLE 6 if( (sps_affine_enabled_flag || sps_sbtmvp_enabled_flag) && cbWidth >= 8
&& cbHeight >= 8)
  merge_subblock_flag[ x0 ][ y0 ]                                                                                   ae(v)

TABLE 7 if( (sps_affine_enabled_flag && cbWidth >= 8 &&
cbHeight >= 8) ||
(sps_sbtmvp_enabled_flag && cbWidth >= 16 &&
cbHeight >= 16) )
  merge_subblock_flag[ x0 ][ y0 ]                                  ae(v)

According to an embodiment of the present invention, whether a specific mode is available may be signaled in a first unit. When availability is indicated through signaling, the encoder may signal information on which mode is actually used in a second unit belonging to the first unit to the decoder. In this case, whether a syntax element is parsed in the second unit may be determined according to a signaled value in the first unit. For example, the first unit may be a sequence, a picture, a slice, a tile, or the like, and the second unit may be a CUT, a CU, or the like. In an embodiment, the specific mode may be a subblock mode. The first unit may be referred to as a higher unit, and the second unit may be referred to as a lower unit.

[Table 6] shows a signaling parsing process indicating whether the subblock mode is used in the case in which subblock sizes of modes belonging to the subblock mode are all the same or difference between the subblock sizes is not considered. According to an embodiment of the present invention, when the number of modes belonging to the subblock mode is plural and the number of signalings indicating whether higher units of modes corresponding to the subblock mode are available is plural, if at least one of the signalings indicating whether the plurality of higher units are available indicates availability, the subblock mode can be used in a lower unit. Further, signaling indicating whether higher units are available may correspond to a plurality of modes. For example, when different modes exist according to locations of referred neighboring blocks, information indicating whether higher units for the modes are available may be signaled. In this case, this may be combined and applied together with a condition such as a block size condition. In this specification, availability of the subblock mode may mean that signaling indicating whether the subblock mode is available is parsed, and the above embodiments may be referred to therefor.

Referring to [Table 6], the decoder may parse merge_subblock_flag only when at least one of sps_affine_enabled_flag and sps_sbtmvp_enabled_flag indicating whether the affine merge mode belonging to the subblock merge mode and the SbTMVP are available is 1.

Referring to [Table 7], when subblock sizes of modes belonging to the subblock mode are different, the decoder may parse a syntax element indicating whether the subblock mode is used in consideration thereof. According to an embodiment of the present invention, both signaling indicating whether a higher unit of any mode belonging to the subblock mode is available and a block size condition of the mode are satisfied, the encoder/decoder may use the subblock mode. For example, when a first mode and a second mode belonging to the subblock mode exist, first signaling indicating whether a higher unit corresponding to the first mode is available and second signaling indicating whether a higher unit corresponding to the second mode is available are used, and there are a first block size condition of the first mode and a second block size condition of the second mode, if the first signaling indicating whether the higher unit is available indicates that the higher unit is available and the first block size condition is satisfied, the encoder/decoder may use the subblock mode. When the second signaling indicating whether the higher unit is available indicates that the higher unit is available and the second block size condition is satisfied, the encoder/decoder may use the subblock mode.

As an embodiment, referring to [Table 7], syntax elements sps_affine_enabled_flag and sps_sbtmvp_enabled_flag indicating whether the affine merge mode belonging to the subblock merge mode and the SbTMVP are available may be signaled from the encoder to the decoder. In this case, when a condition of [Equation 15] below is satisfied, the decoder may parse merge_subblock_flag. Similarly, when [Equation 15] below is satisfied, the encoder may perform syntax signaling on merge_subblock_flag.

$$((sps\_affine\_enabled\_flag \;\&\&\; affine\;merge\;block\;size\;condition) || (sps\_sbtmvp\_enabled\_flag \;\&\&\; SbTMVP\;block\;size\;condition)) \quad \text{[Equation 15]}$$

[Table 7] shows the case in which the block size condition of the affine merge mode is (cbWidth>=8 && cbHeight>=8) and the block size condition of the SbTMVP is (cbWidth>=16 && cbHeight>=16).

[Table 8] below shows syntax indicating another example using the condition of [Table 7].

TABLE 8

```
if( (sps_affine_enabled_flag || sps_sbtmvp_enabled_flag) &&
cbWidth >= 16
&& cbHeight >= 16)
    merge_subblock_flag[ x0 ][ y0 ]                          ae(v)
else if( sps_affine_enabled_flag && cbWidth == 8 &&
cbHeight == 8)
    merge_subblock_flag[ x0 ][ y0 ]                          ae(v)
```

When there are a first mode and a second mode belonging to the subblock mode, there are first signaling indicating whether a higher unit corresponding to the first mode is available and second signaling indicating whether a higher unit corresponding to the second mode is available, and there are a first block size condition of the first mode and a second block size condition of the second mode, if the first block size condition belongs to the second block size condition (that is, the first block size condition is satisfied and the second block size condition is satisfied), the encoder/decoder can use the subblock mode as shown in [Equation 16] below.

```
if ((first signaling indicating whether higher unit is
    available||second signaling indicating whether
    higher unit is available) && (first block size
    condition))

subblock mode is available else if ((second signaling indicating whether higher
    unit is available) && (second block size condi-
    tion))

subblock mode is available                    [Equation 16]
```

In another embodiment, signaling indicating whether higher units corresponding to all subblock modes are available may exist. Alternatively, signaling indicating whether higher units corresponding to all subblock merge modes are available may exist. In this case, the decoder may parse lower unit signaling only when it is indicated that the higher unit is available. According to an embodiment of the present invention, the encoder/decoder may configure a block size condition using the subblock mode according to the subblock size. In this case, when the subblock size is variable, the encoder/decoder may configure a block size condition based on the larger size among available subblock sizes.

[Table 9] and [Table 10] below show subblock merge-related syntax according to an embodiment of the present invention.

TABLE 9

```
if( merge_subblock_flag[ x0 ][ y0 ] = = 1 &&
MaxNumSubblockMergeCand > 1 && sps_affine_enabled_flag )
    merge_subblock_idx[ x0 ][ y0 ]                          ae(v)
if( merge_subblock_flag[ x0 ][ y0 ] = = 1 &&
MaxNumSubblockMergeCand > 1 && (sps_affine_enabled_flag ||
(sps_sbtmvp_enabled_flag + sps_planar_enabled_flag >= 2)) )
    merge_subblock_idx[ x0 ][ y0 ]                          ae(v)
```

According to an embodiment of the present invention, whether a specific mode is available may be signaled in a first unit. When availability is indicated through signaling, the encoder may signal information on which mode is actually used in a second unit belonging to the first unit to the decoder. In this case, whether a syntax element is parsed in the second unit may be determined according to a signaled value in the first unit. For example, the first unit may be a sequence, a picture, a slice, a tile, or the like, and the second unit may be a CUT, a CU, or the like. In an embodiment, the specific mode may be a subblock mode. The first unit may be referred to as a higher unit, and the second unit may be referred to as a lower unit. Further, signaling indicating that the higher unit is available may correspond to a plurality of modes. For example, when different modes exist according to locations of neighboring blocks to be referred to, signaling indicating whether higher units for the plurality of modes are available may exist.

According to an embodiment of the present invention, whether to parse a candidate index may be determined with reference to signaling indicating whether the higher unit is available. For example, when one or more of signaling indicating whether a plurality of higher units are available indicate availability, the candidate index may be parsed. According to an embodiment, signaling indicating whether higher units corresponding to a plurality of modes (in this case, the modes may indicate units included in a candidate list as candidates) are available may exist. In this specification, signaling indicating whether the higher units corresponding to the plurality of modes are available may be indicated by a first flag, a second flag, a third flag, . . . , and the like. Further, signaling indicating whether a higher unit corresponding to one mode (candidate; unit holding a position in the candidate list) is available may exist. In this specification, signaling indicating whether the higher unit corresponding to the one mode is available may be referred to as a flag A, a flag B, or a flag C.

According to an embodiment of the present invention, if at least one of signalings indicating whether higher units corresponding to a plurality of modes are available indicates availability, the encoder/decoder may parse the candidate index. That is, in the case of (first flag||second flag||third flag, . . . ) (that is, a flag value of 1 indicates availability), the encoder/decoder may parse the candidate index.

When the number of signalings indicating whether a higher unit corresponding to one mode is available is 0 or 1 or the number of modes having no signaling indicating whether a higher unit is available is 0 or 1, if at least one of signalings indicating higher units corresponding to a plurality of modes are available indicates availability, the encoder/decoder may parse a candidate index. That is, in the case of (first flag||second flag||third flag, . . . ) (a flag value of 1 indicates availability), the encoder/decoder may parse the candidate index.

When the number of signalings indicating whether a higher unit corresponding to one mode is available is 1 and the number of modes having no signaling indicating whether a higher unit is available is 1, if the signaling indicating whether the higher unit corresponding to one mode indicates availability, the encoder/decoder may parse the candidate index. In this case, this may be regardless of a value of signaling indicating whether the higher units corresponding to the plurality of modes are available. Accordingly, in this case, when at least one of the plurality of signalings indicating whether the higher units corresponding to the plurality of modes are available and the signaling indicating whether the higher unit corresponding to one mode is available indicates availability, the encoder/decoder may parse the candidate index. That is, in the case of (first flag||second flag||third flag, . . . ) (a flag value of 1 indicates availability), the encoder/decoder may parse the candidate index.

When the candidate index is not parsed, the encoder/decoder may use the only candidate of the candidate list. Alternatively, when the candidate index is not parsed, the encoder/decoder may infer that the candidate index is 0.

Referring to [Table 9], the affine merge mode and the SbTMVP may correspond to the subblock merge mode, and the affine merge mode may be configured as a plurality of candidates through the method. Whether the higher unit corresponding to the affine merge mode is available may be signaled through a syntax element of sps_affine_enabled_flag. In this case, when sps_affine_enabled_flag indicates that the higher unit is available, the encoder/decoder may parse merge_subblock_idx corresponding to the candidate index.

According to an embodiment of the present invention, if the number of signalings indicating whether the higher unit corresponding to one mode is available is two or more, and at least two of the plurality of the signalings indicating whether the higher unit corresponding to the one mode is available indicate that the higher unit is available, the encoder/decoder may parse the candidate index. That is, in the case of (flag A+flag B+flag C+ . . . >=2) (a flag value of 1 indicates availability), the encoder/decoder may parse the candidate index. In this case, there may be a mode having no signaling indicating whether the higher unit can be used.

In the case in which the number of signalings indicating whether the higher unit corresponding to one mode is available is two or more and signaling indicating whether higher units corresponding to a plurality of modes are available exists, if at least two of the plurality of signalings indicating whether the higher unit corresponding to the one mode is available indicate that the higher unit is available or at least one of the plurality of signalings indicating whether the higher units corresponding to the plurality of modes are available indicates that the higher units are available, the encoder/decoder may parse the candidate index. That is, in the case of ((first flag||second flag||third flag, . . . ) (flag A+flag B+flag C+ . . . >=2)) (a flag value of 1 indicates availability), the encoder/decoder may parse the candidate index. In this case, there may be a mode having no signaling indicating whether the higher unit can be used.

In the case in which the number of modes having no signaling indicating whether the higher unit is available is 1, the candidate index may be parsed when at least one of the plurality of signalings indicating whether the higher unit corresponding to one mode is available indicates that the higher unit is available rather than when at least two of the plurality of signalings indicating whether the higher unit corresponding to the one mode is available indicate that the higher unit is available. That is, in the case in which (flag A||flag B||flag C+ . . . ), but not the case in which (flag A+flag B+flag C+ . . . >=2), the encoder/decoder may parse the candidate index.

Referring to FIG. 10, the subblock merge mode may include the affine merge mode, the SbTMVP, and the planar MVP. The affine merge mode may be configured as a plurality of candidates. The SbTMVP may be configured as one candidate. The planar MVP may be configured as one candidate. Whether higher units corresponding to the affine merge mode, the SbTMVP, and the planar MVP are available may be signaled using syntax elements of sps_affine_enabled_flag, sps_sbtmvp_enabled_flag, and sps_planar_enabled_flag. In this case, when sps_affine_enabled_flag indicates that the higher unit is available or when both sps_sbtmvp_enabled_flag and sps_planar_enabled_flag indicate that the higher units are available (or two or more of sps_sbtmvp_enabled_flag and sps_planar_enabled_flag indicate that the higher unit are available), the encoder/decoder may parse merge_subblock_idx corresponding to the candidate index. In the present invention, when both sps_sbtmvp_enabled_flag and sps_planar_enabled_flag indicate that the higher units are available, (sps_sbtmvp_enabled_flag+sps_planar_enabled_flag>=2) may be expressed.

SbTMVP availability conditions according to an embodiment of the present invention may be induced through the following method. Hereinafter, availableFlagSbCol indicates a parameter (or flag) indicating whether the SbTMVP is available.

If one or more of the following conditions are true, availableFlagSbCol may be configured as 0.
1) tile_group_temporal_mvp_enable_flag is 0
2) sps_sbtmvp_flag is 0
3) cbWidth is smaller than 8
4) cbHeight is smaller than 8

According to an embodiment of the present invention, whether the SbTMVP is available may be expressed by an availability flag. The availability flag indicating whether the SbTMVP is available may be availableFlagSbCol. Further, the SbTMVP may also be referred to as SbCol. Further, the availability flag having a value of 1 indicates that the SbTMVP is available, and the availability flag having a value of 0 indicates that the SbTMVP is not available.

According to an embodiment of the present invention, conditions of not using the SbTMVP may exist. As an embodiment, the SbTMVP is not available based on the above-described higher unit signaling. A higher unit for the current block, the CU, or the PU may be a slice, a tile, a tile group, a sequence, a picture, a CTU, or the like. The higher unit signaling may include tile_group_temporal_mvp_enable_flag. For example, tile_group_temporal_mvp_enable_flag indicates a flag indicating whether a temporal motion vector (or temporal motion vector prediction) is available. Since the SbTMVP can be a technology using the temporal motion vector, the SbTMVP may not be used if the temporal MV is not configured to be available. Further, higher unit signaling may include sps_sbtmvp_flag. For example, sps_sbtmvp_flag may be a flag indicating whether the SbTMVP is available.

In another embodiment, the SbTMVP may not be used based on the block size. The block size may include the block width, the block height, a value based on the block width or height, or the like. Further, the value based on the block width or height may include an area of the block. When the block width or height is smaller than a threshold, the SbTMVP may not be used. As an embodiment, the threshold may be the subblock width or height. For example, the threshold may be configured as 8.

When a condition under which the SbTMVP cannot be used is satisfied, the encoder/decoder may configure the availability flag corresponding to the SbTMVP as 0. Otherwise, the availability flag may be determined through an additional operation.

Figure 18:
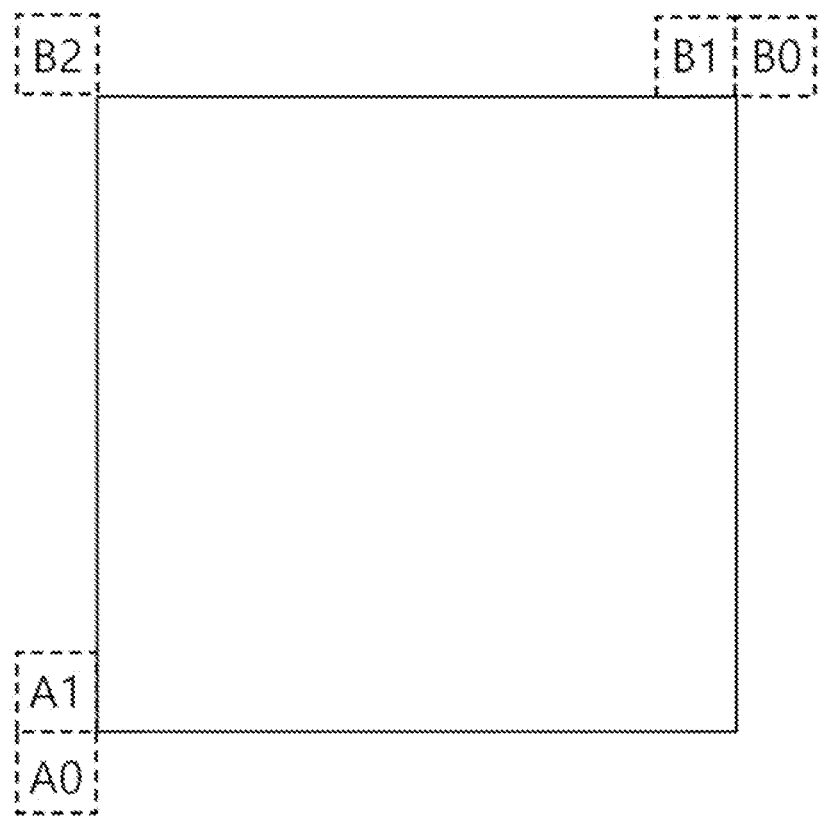
FIG. 18 illustrates a method of determining a temporary motion vector according to an embodiment of the present invention.

FIG. 18 illustrates a method of determining a temporary motion vector according to an embodiment of the present invention. In this specification, a motion vector indicating the collocated block is referred to as a temporary motion vector. The temporary motion vector is not limited to the name thereof, and may be referred to as an initial motion vector, a temporal motion vector, a subblock-based merge base motion vector (subblock-based temporal merging base MV), or a base motion vector. That is, the encoder/decoder may determine a motion vector specifying the collocated block based on the initial motion vector, the temporal motion vector, the subblock-based merge base motion vector, or the base motion vector.

According to an embodiment of the present invention, the encoder/decoder may determine the temporary motion vector based on motion information of the location around the current block. Further, the location around the current block may be a preset location. The location around the current block may include a spatial candidate location of the merge candidate. Alternatively, the location around the current block may include a spatial candidate location of the AMVP candidate.

Referring to FIG. 18, locations corresponding to A0, A1, B0, B1, and B2 may be preset. Further, the locations may be brightness locations. When the top left location of the current block is (xCb, yCb), A0, A1, B0, B1, and B2 may be (xCb−1, yCb+cbHeight), (xCb−1, yCb+cbHeight−1), (xCb+cbWidth, yCb−1), (xCb+cbWidth−1, yCb−1), and (xCb−1, yCb−1), respectively. In this case, cbWidth and cbHeight may be the width and the height of the current block, respectively. (xCb, yCb) may be the top left location in a shared merge list area. When a plurality of blocks use the same merge candidate list, areas of the plurality of blocks may be shared merge list areas. Further, there may be a preset reference order corresponding to preset locations. [Table 11] shows the preset reference order.

TABLE 11

```
tempMV = zero MV
If ( predefinedPosition1 is available)
{
  if ( predefinedPosition1 refers to the collocated picture as a reference
  picture )
  {
    tempMV = mvLXpredefinedPosition1
  }
}
Else if ( predefinedPosition2 is available)
{
  if ( predefinedPosition2refers to the collocated picture as a reference
  picture )
  {
    tempMV = mvLXpredefinedPosition2
  }
}
//...
Else if (predefinedPositionN is available )
{
  if (predefinedPositionNrefers to the collocated picture as a reference
  picture)
  {
    tempMV = mvLXpredefinedPositionN
  }
}
```

Referring to [Table 11], preset locations may be predefinedPosition1, predefinedPosition2, predefinedPositionN, and the like. The reference order may be preset as predefinedPosition1, predefinedPosition2, . . . , and predefinedPositionN. The reference order may be a forward direction or a backward direction of the reference order of merge candidate list construction. Alternatively, the reference order may be a forward direction or a backward direction of the reference order of AMVP candidate list construction. For example, the reference locations and the reference order may be A1, B1, B0, and A0. Alternatively, predefinedPosition1, predefinedPosition2, . . . , and predefinedPositionN may indicate motion information corresponding to preset locations.

In [Table 11], the temporary motion vector may be configured as a zero motion vector. If motion information of the preset location is not available, the encoder/decoder may configure the temporary motion vector as the zero motion vector. When the motion information of the preset location is available, the motion information of the preset location may be configured as the temporary motion vector. The meaning of availability may include the case in which the corresponding location is not intra prediction. Alternatively, the meaning of availability may include the case in which the corresponding location is inter prediction. Alternatively, the meaning of availability may include the case in which a reference picture of motion information of the corresponding location is the same as a collocated picture corresponding to the current block. Alternatively, the meaning of availability may include the case in which a reference picture of motion information of the corresponding location is the same as a reference picture corresponding to the current block.

In [Table 11], it may be identified whether motion information of a first corresponding location that satisfies a first availability condition among the preset locations satisfies a second availability condition. When the second availability condition is satisfied, the encoder/decoder may configure the motion information of the corresponding location as the temporary motion vector. In the other cases, the encoder/decoder may configure the temporary motion vector as the zero motion vector. This may be expressed by pseudo code as shown in [Table 12] below.

TABLE 12

```
{
tempMV = zero MV
If ( predefinedPosition1 is available )
{
  if ( predefinedPosition1 refers to the collocated picture as a reference
  picture )
  {
    tempMV = mvLXpredefinedPosition1
  }
}
Else if ( predefinedPosition2 is available )
{
  if ( predefinedPosition2 refers to the collocated picture as a reference
  picture )
  {
    tempMV = mvLXpredefinedPosition2
  }
}
// ...
Else if ( predefinedPositionN is available )
{
  if ( predefinedPositionN refers to the collocated picture as a reference
  picture )
  {
    tempMV = mvLXpredefinedPositionN
  }
}
}
```

In the embodiment, in order to allow only the first location of the preset locations that satisfy the first availability condition to be used as the temporary motion vector, the else if statement may be used in [Table 12]. Further, the first availability condition and the second availability condition may be the above-described availability. For example, the first availability condition may mean that the corresponding location uses inter prediction. The second availability condition may mean that a reference picture of motion information of the corresponding location is the same as a collocated picture corresponding to the current block. In the embodiment, when any location satisfies the first availability condition but does not satisfy the second availability condition, locations referred to after the location may not be identified.

In another embodiment, the encoder/decoder may configure motion information of the first corresponding location that satisfies both the first availability condition and the second availability condition among the preset locations as the temporary motion vector. In the other cases, the encoder/decoder may configure the temporary motion vector as the zero motion vector. This may be expressed by pseudo code as shown in [Table 13] below.

TABLE 13

```
{
tempMV = zero MV
If ( ( predefinedPosition1 is available ) && ( predefinedPositon1 refers
to the collocated picture as a reference picture ) )
{
    tempMV = mvLXpredefinedPosition1
}
Else if ( ( predefinedPosition2 is available ) && ( predefinedPosition2
refers to the collocated picture as a reference picture ) )
{
    tempMV = mvLXpredefinedPosition2
}
// ...
Else if ( ( predefinedPositionN is available ) && ( predefinedPositionN
refers to the collocated picture as a reference picture ) )
{
    tempMV = mvLXpredefinedPositionN
}
}
```

In [Table 13], if any location satisfies the first availability condition but does not satisfy the second availability condition, the encoder/decoder may also identify locations referred to after the location.

According to an embodiment of the present invention, the number of preset locations may be only one. This may be expressed by pseudo code as shown in [Table 14] below.

TABLE 14

```
{
tempMV = zero MV
If ( predefinedPosition1 is available )
{
    If ( predefinedPosition1 refers to the collocated picture as a reference
    picture )
    {
        tempMV = mvLXpredefinedPosition1
    }
}
}
```

That is, when motion information corresponding to one preset location is available, the encoder/decoder may configure the temporary motion vector as the corresponding motion information. Otherwise, the encoder/decoder may configure the temporary motion vector as the zero motion vector. As an embodiment, the one preset location may be the left location of the current block. That is, x coordinates of the one preset location may be smaller than left coordinates within the current block. For example, the one preset location may be location A1.

Although the example of using both the first availability condition and the second availability condition has been described in the embodiments, the present invention is not limited thereto and may include the case in which more availability conditions exist. The motion information may include a motion vector (mvLX), a reference index (refIdxLX), a prediction utilization flag (predFlagLX), and the like.

In an embodiment, a process of identifying the second availability condition and configuring the temporary motion vector may be performed as follows. That is, if availableFlagN is true, the following process may be applied.

A. If all of the following conditions are true, the temporary motion vector may be configured as mvL1N.
      a. the case in which predFlagL1N is 1
      b. the case in which DiffPicOrderCnt(ColPic, RefPcList1[refIdxL1N]) is 0
      c. the case in which DiffPicOrderCnt(aPic, currPic) is equal to or smaller than 0, aPic indicating all pictures within all reference picture lists of a slice (or tile group)
      d. the case in which tile_group_type is B
      e. the case in which collocated_from_l0_flag is 0
   B. Otherwise, if all of the following conditions are true, the temporary motion vector may be configured as mvL0N.
      a. predFlagL0N is 1
      b. the case in which DiffPicOrderCnt(ColPic, RefPicList0[refIdxL0N]) is 0

When availableFlagN is true, it may mean that the first availability condition is satisfied. In an embodiment of using only the one preset location, a parameter which can be availableFlagN may be availableFlag corresponding to the preset location. For example, when only the location A1 is used, availableFlagN may be availableFlagA1, which may be a value indicating whether motion information of the location A1 is available.

Figure 19:
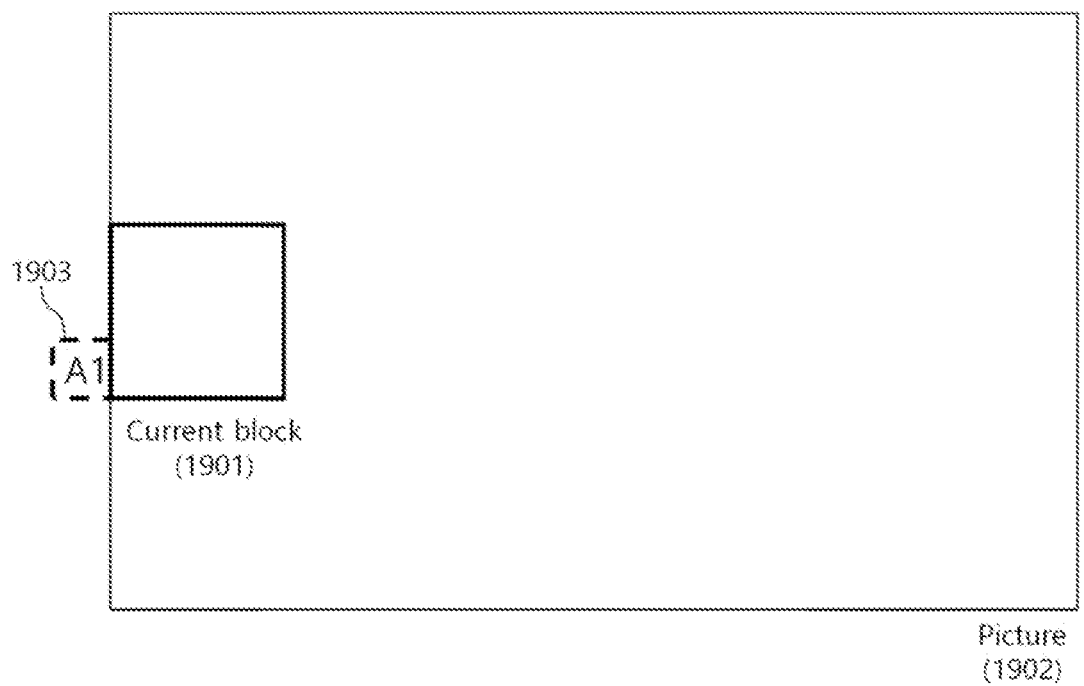
FIG. 19 illustrates whether to use the SbTMVP according to an embodiment of the present invention.

FIG. 19 illustrates whether to use the SbTMVP according to an embodiment of the present invention. According to an embodiment of the present invention, the encoder/decoder may determine whether a specific mode is used based on a location of a current block 1901. According to another embodiment of the present invention, the encoder/decoder may determine whether a specific mode is used based on a location of a merge list sharing area to which the current block 1901 belongs.

According to an embodiment of the present invention, the encoder/decoder may determine whether the SbTMVP is used based on the location of the current block 1901. According to another embodiment of the present invention, whether to use the SbTMVP may be determined based on the location of the merge list sharing area to which the current block 1901 belongs. As an embodiment, the location of the current block 1901 or the location of the merge list sharing area to which the current block belongs may be top-left coordinates or may be expressed from the top-left coordinates. Further, the location of the current block 1901 or the location of the merge list sharing area to which the current block 1901 belongs may be a relative location within a higher group. The higher group may include a picture, a tile, a tile group, a CTU, a slice, and the like. Further, the higher group may be a group to which the current block belongs. That is, for example, the encoder/decoder may determine whether to use the SbTMVP based on a location within a picture 1902 of the current block 1901. In this specification, the current block or the merge list sharing area of the current block may be referred to as a current area.

According to an embodiment of the present invention, the encoder/decoder may determine whether to use the SbTMVP based on whether the current area borders a boundary of the higher group. For example, when the current area borders the boundary of the higher group, it may be determined or decided that the SbTMVP is not used. Alternatively, whether to use the SbTMVP may be determined based on whether the preset location referred to for determining the temporary motion vector corresponding to the current area described in FIG. 19 is out of the higher group. For example, when all of the preset locations referred to for determining the temporary motion vector corresponding to the current area are out of the higher group, the encoder/decoder may determine or decide that the SbTMVP is not used. Further, whether all of the preset locations referred to for determining the temporary motion vector corresponding to the current area are out of the higher group may be determined based on coordinates of the current area. This is because, when all of the preset locations referred to for determining the temporary motion vector corresponding to the current area are out of the higher group, the zero motion vector may be used as the temporary motion vector and accordingly prediction performance of the SbTMVP may deteriorate. In an embodiment, in this case, by determining that the SbTMVP is not available, another mode signaled through the same syntax element as the SbTMVP may be signaled using the smaller number of bits. For example, as described above, the SbTMVP and the affine merge mode may be included in the subblock merge mode, and when it is determined that the SbTMVP is not available, the affine merge mode may be signaled using the smaller number of indexes. Accordingly, in this case, index 0 may always indicate the affine merge mode.

Referring to FIG. 19, as described above, only the location A1 1903 may be referred to for determining the temporary motion vector of the current area. When motion information of the location A1 1903 is not available, the zero motion vector may be used as the temporary motion vector. If the current area borders a left boundary of the picture 1902, the temporary motion vector may be always the zero motion vector. Accordingly, when the current area borders the left boundary of the picture 1902, the SbTMVP is not used. Further, when the current area borders not only the left boundary of the picture 1902 but also a left boundary of a unit in which parallel processing is possible, the SbTMVP is not used. The unit in which parallel processing is possible may be a tile, a tile group, a slice, or the like. Accordingly, when top-left coordinates of the current area are (xCb, yCb) and xCb is 0, the encoder/decoder may border the left boundary of the picture 1902 and, in this case, determine that the SbTMVP is not used. Alternatively, when (xCb−(left coordinates of the unit in which parallel processing is possible)) is 0, the SbTMVP is not used.

In an embodiment, if only a top side of the current area is referred to for determining the temporary motion vector of the current area, the encoder/decoder may configure that the SbTMVP is not used if the current area borders a top boundary of the picture 1902 or the unit in which parallel processing is possible.

In another additional embodiment, although the condition of deciding or determining that the SbTMVP is not used has been described, the SbTMVP is not used only when a condition related to the block size is satisfied in addition to the condition. That is, for example, when the coordinates of the current area satisfy a preset condition and the condition related to the block size, the SbTMVP is not used. As an embodiment, the condition related to the block size may correspond to the case in which the block size of the current block is equal to or smaller than the subblock size. When the current block size is equal to or smaller than the subblock size, the number of subblocks of the current block is only one and, in this case, advantages and performance of the SbTMVP may be reduced. For example, the subblock size may be 8×8. Accordingly, the following embodiment may be applied to the above-described embodiments. If the current area borders the left boundary of the picture and the current block is equal to or smaller than 8×8, the encoder/decoder may decide or determine that the SbTMVP is not used. However, an embodiment in which the subblock merge mode can be used only in a block larger than or equal to 8×8 may exist. In this case, when the current area borders the left boundary of the picture 1902 and the current block 1901 is 8×8, it may be decided and determined that the SbTMVP is not used.

Further, in another embodiment of the present invention, the availability flag indicating the SbTMVP availability condition may include whether xCb is 0 and the width and height of the current block are 8 as well as the above-described conditions. That is, when xCb is 0 and the width and height of the current block are 8, the availability flag may be configured as 0. When the condition or the conditions are all satisfied, or when one or more thereof are satisfied, the encoder/decoder may configure the availability flag as 0. As described above, whether the SbTMVP is available may be indicated by the availability flag. Further, when any condition is satisfied, the SbTMVP may be indicated as not available. That is, when any condition is satisfied, the encoder/decoder may configure avilableFlagSbCol as 0. Accordingly, in the embodiment described with reference to FIG. 19, the encoder/decoder may configure availableFlagSbCol based on the location of the current area. That is, the encoder/decoder may configure availableFlagSbCol based on coordinate (xCb, yCb) indicating the current area. For example, (xCb, yCb) may be top-left coordinates of the current area.

As described in FIG. 19, when the current area or the current block borders the left boundary of the picture, the SbTMVP may not be available. Accordingly, if xCb is 0, the encoder/decoder may configure avilableFlagSbCol as 0. For example, if the current area or the current block borders the left boundary of the picture and the current block is 8×8, the SbTMVP may not be available. Accordingly, if xCb is 0 and both the width and the height of the current block are 8, the encoder/decoder may configure avilableFlagSbCol as 0.

[Table 15] below shows a subblock merge mode syntax structure according to an embodiment of the present invention.

TABLE 15

| | |
|---|---|
| if( MaxNumSubblockMergeCand > 0 && cbWidth >= 8 && cbHeight >= 8 && !( x0 == 0 && !sps_affine_enabled_flag ) | |
|   merge_subblock_flag[ x0 ][ y0 ] | ae(v) |
| if( merge_subblock_flag[ x0 ][ y0 ] = = 1 ) { | |
|   if( MaxNumSubblockMergeCand > 1 ) | |
|     merge_subblock_idx[ x0 ][ y0 ] | ae(v) |
| } | |

As described above, the subblock merge mode (or subblock-based merge mode) may include the SbTMVP and/or the affine merge mode. sps_affine_enabled_flag corresponding to a syntax element (or flag) indicating whether the affine mode is available may be signaled from the encoder to the decoder through syntax of a higher level. As an embodiment, the higher level may be at least one of a sequence, a picture, a slice, or a CTU level. Further, in an embodiment, the SbTMVP non-availability (or non-applicable) condition may be predefined as described in FIG. 19.

According to an embodiment of the present invention, when the SbTMVP non-availability condition is satisfied and the affine mode is not available, the encoder/decoder may not parse merge_subblock_flag. For example, merge_subblock_flag may be signaling indicating that the subblock merge mode is used. If merge_subblock_flag does not exist, the encoder/decoder may infer that the value is 0. The case in which the affine mode is not available may be the case in which sps_affine_enabled_flag is 0. Accordingly, when the SbTMVP is available or the affine mode is available, merge_subblock_flag may be parsed. Conditions of parsing merge_subblock_flag may include an additional condition as well as the above-described conditions. For example, referring to [Table 15], in order to determine parsing of merge_subblock_flag, a condition related to MaxNumSubblockMergeCand indicating the maximum number of subblock merge candidates and a condition related to the block size may also be considered.

Referring to [Table 15], when x0 which is an x value of top-left coordinates of the current block is 0 and when sps_affine_enabled_flag indicating whether the affine mode is available is 0, merge_subblock_flag may not be parsed. When x0 is not 0 or sps_affine_enabled_flag is 1, merge_subblock_flag may be parsed.

In the above-described embodiment, it has been described based on the assumption that the SbTMVP and the affine merge mode are included in the subblock merge mode, but the present invention is not limited thereto and another mode may be included in the subblock merge mode. For example, the subblock merge mode may include a first mode and a second mode in addition to the SbTMVP. Further, syntax elements sps_mode1_enabled_flag and sps_mode2_enabled_flag indicating whether the first mode and the second mode are available may be signaled. In this case, when the SbTMVP non-availability condition is satisfied and both the first mode and the second mode are not available, the encoder/decoder may not parse merge_subblock_flag. In this case, the encoder/decoder may infer that merge_subblock_flag is 0. As an embodiment, if the SbTMVP non-availability condition is not satisfied, the first mode is available, or the second mode is available, the encoder/decoder may parse merge_subblock_flag. Conditions of parsing merge_subblock_flag may include an additional condition as well as the above-described conditions. Referring to [Table 15], in order to determine parsing of merge_subblock_flag, a condition related to MaxNumSubblockMergeCand indicating the maximum number of subblock merge candidates and a condition related to the block size may also be considered.

According to an embodiment of the present invention, when the affine mode is not configured to be available, the encoder/decoder may configure MaxNumSubblockMergeCand as 1. Alternatively, when the affine mode is not configured to be available and the SbTMVP is configured to be available, the encoder/decoder may configure MaxNumSubblockMergeCand as 1. Further, when the affine mode is not configured to be available and the SbTMVP is not configured to be available, the encoder/decoder may configure MaxNumSubblockMergeCand as 0.

Figures 20, 21:
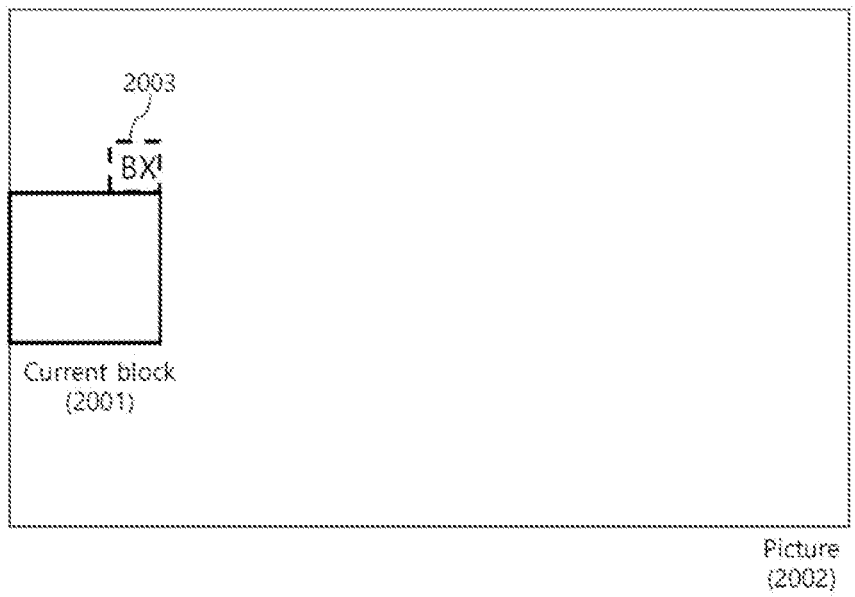
FIG. 20 illustrates a method of inducing the SbTMVP according to an embodiment of the present invention.
FIG. 21 illustrates an MMVD application method according to an embodiment of the present invention.

FIG. 20 illustrates a method of inducing the SbTMVP according to an embodiment of the present invention. According to an embodiment of the present invention, a preset location referred to for determining a temporary motion vector may be variable. Alternatively, the number of preset locations referred to for determining a temporary motion vector for a specific block may be configured as one, and the locations may be variable.

In an embodiment, a reference location for determining the temporary motion vector based on the location of a current block 2001 or a current area may be determined to be variable. The current area indicates the area described in FIG. 19. For example, when the current area borders a boundary of a picture 2002 or a boundary of a unit in which parallel processing is possible, motion information of a specific location is always non-available. Accordingly, the encoder/decoder may configure a location which is not the location which is not always available as the preset location referred to for determining the temporary motion vector. That is, the preset location referred to for determining the temporary motion vector may be configured as the location which is not always non-available based on the location of the current area. The always non-available location may be a location escaping the picture 2002 or a range in which parallel processing is possible.

According to the embodiment described in FIG. 18, the preset location referred to for determining the temporary motion vector may be defined as a left location of the current block 2001 or the current area. In this case, as described in FIG. 19, when the current block 2001 or the current area is positioned in a specific location, motion information of the preset location is not available, and thus the preset location may be configured (or determined) as a location which is not the left location. For example, the preset location may be configured as a top location 2003 in the current block 2001 or the current area. For example, the preset location may be a location B1 of (a) of FIG. 18.

Further, in an embodiment, referring to FIG. 20, when the current block 2001 or the current area borders the left boundary of the picture 2002 or borders the left boundary of the unit in which parallel processing is possible, the preset location referred to for determining the temporary motion vector may be determined as a top location of the current block 2001 or the current area. The top location of the current area may be a location having y coordinates smaller than y coordinates of the current area (that is, vertical direction coordinates). For example, when the current block 2001 or the current area borders the left boundary of the picture 2002 or borders the left boundary of the unit in which parallel processing is possible, the preset location referred to for determining the temporary motion vector may be the location B1 of (a) of FIG. 18.

Alternatively, in an embodiment, when the current block 2001 or the current area borders the top boundary of the picture 2002 or borders the top boundary of the unit in which parallel processing is possible, the preset location referred to for determining the temporary motion vector may be determined as a left location of the current block 2001 or the current area. The left location of the current area may be a location having x coordinates smaller than x coordinates of the current area (that is, horizontal direction coordinates). For example, when the current block 2001 or the current area borders the top boundary of the picture 2002 or borders the top boundary of the unit in which parallel processing is possible, the preset location referred to for determining the temporary motion vector may be a location A1 of (a) of FIG. 18.

The subblock-based motion compensation method has been described. Hereinafter, a method of applying a combination of embodiments for a merge mode-based motion compensation method using a motion vector difference (Merge mode with MVD (MMVD)) (or a merge MVD) and the subblock-based motion compensation is described.

FIG. 21 illustrates an MMVD application method according to an embodiment of the present invention. According to an embodiment of the present invention, the encoder/decoder may determine a Motion Vector (MV) based on a Motion Vector Predictor (MVP) and a Motion Vector Difference (MVD). In this specification, the MVP may be referred to as base motion vector (baseMV). That is, the encoder/decoder may induce the motion vector (that is, a final motion vector) by adding the base motion vector and the motion vector difference. However, the present invention is not limited to the names, and the MVP may be referred to as a base motion vector, a temporary motion vector, an initial motion vector, an MMVD candidate motion vector, or the like. The MVD may be expressed by a value for refining the MVP, and may be referred to as a refined motion vector (refineMV) or a merge motion vector difference.

According to an embodiment of the present invention, when the MMVD is applied, that is, in the MMVD mode, the MV may be determined based on a base motion vector, a distance parameter (or variable), or a direction parameter (or variable). Further, according to an embodiment of the present invention, the base motion vector may be determined from a candidate list. For example, the base motion vector may be determined from a merge candidate list. The encoder/decoder may determine the base motion vector from some of another candidate list. Some of the candidate list may be a front part of the candidate list (part having a smaller index). For example, the encoder/decoder may determine the base motion vector using first and second candidates among candidates of the merge candidate list. To this end, a candidate index indicating a specific candidate among the two candidates may be signaled from the encoder to the decoder. Referring to FIG. 21, a base candidate index which is an index for signaling the base motion vector may be defined. The encoder/decoder may determine a candidate applied to the current block among the candidates of the candidate list according to the base candidate index and determine a motion vector of the determined candidate as the base motion vector. In the present invention, the base candidate index is not limited to the name, and may be referred to as a base candidate index, a candidate index, a candidate flag, an MMVD index, an MMVD candidate index, an MMVD candidate flag, or the like.

According to an embodiment of the present invention, there may be an MVD different from the MVD described in FIGS. 6 and 7. For example, the MVD in the MMVD may be differently defined from the MVD described in FIGS. 6 and 7. In this specification, the MMVD may indicate a merge mode using a motion vector difference (that is, a motion compensation mode or method) or indicate a motion vector difference in the case in which the MMVD is applied. For example, the encoder/decoder may determine whether to apply (or use) the MMVD. If the MMVD is applied, the encoder/decoder may induce a merge candidate used for inter prediction of the current block from the merge candidate list and determine a motion vector of the current block by inducing the MMVD and applying (or adding) the MMVD to a motion vector of the merge candidate.

In an embodiment, the different MVD may be a simplified MVD, an MVD having a different (or small) resolution, MVDs having the small usable number, MVDs having different signaling methods, or the like. For example, while the MVD used in the conventional AMVP, affine inter mode, or the like described in FIGS. 6 and 7 may indicate all areas in x and y axes (that is, horizontal and vertical directions), for example, areas based on pictures (for example, picture areas or areas including pictures and surrounding areas) at uniform intervals for a specific signal unit (for example, x-pel), the MMVD may have a relatively limited unit of specific signaling. Further, areas (or units) for signaling the MMVD may not have uniform intervals. The MMVD may indicate only a specific direction for the specific signaling unit.

According to an embodiment of the present invention, the MMVD may be determined based on a distance and a direction. Referring to FIG. 21, the distance and the direction of the MMVD according to a distance index indicating the distance of the MMVD and a direction index indicating the direction of the MMVD may be preset. In an embodiment, the distance may indicate the MMVD size (for example, an absolute value) in units of specific pixels, and the direction may indicate the direction of the MMVD. The encoder/decoder may signal a relatively small distance through a relatively small index. That is, if the signaling is not signaling through fixed length binarization, the encoder/decoder may signal a relatively short distance through relatively small bits.

According to an embodiment of the present invention, the MVD may use a signaled MV or an MV based on the signaled MV For example, the MV based on the signaled MV may have a sign opposite to the sign of the signaled MV For example, MVD signaling may be performed based on a value corresponding to any reference list, and a value corresponding to another reference list different from the reference list may be the same as the value corresponding to the reference list (that is, signaled MVD) or have an opposite sign. Whether the reference list is the same as the value or has the opposite sign may be determined by a Picture Order Count (POC) relation between the current picture and a reference picture of the reference list and a POC relation between the current picture and a reference picture of another reference list different from the reference list. More specifically, only one MVD may be signaled even when both a reference list L0 and a reference list L1 are used. For example, the MVD corresponding to L0 may be signaled. Further, the MVD corresponding to L1 may be determined based on the MVD corresponding to L0.

For example, the MVD corresponding to L1 may be a value which is the same as the MVD corresponding to L0 or has a sign changed from the sign of the MVD corresponding to L0. Further, this may be determined by a POC relation between the current picture and an L0 reference picture and a POC relation between the current picture and an L1 reference picture. For example, whether to use the MVD corresponding to L0 which is the same as the MVD corresponding to L1 or the MVD corresponding to L0 which has the changed sign may be determined according to whether a value of (RefPicList0[refIdxLN0], currPic)*DiffPicOrderCnt(currPic, RefPicList1[refIdxLN1]) is larger than or smaller than 0. The value of DiffPicOrderCnt(RefPicList0[refIdxLN0], currPic)*DiffPicOrderCnt(currPic, RefPicList1[refIdxLN1]) larger than 0 may mean that both the L0 reference picture and the L1 reference picture may be temporally ahead of the current picture or temporally behind the current picture.

Accordingly, in this case, the L0 MVD and the L1 MVD can have the same sign. Further, the value of DiffPicOrderCnt(RefPicList0[refIdxLN0], currPic)*DiffPicOrderCnt(currPic, RefPicList1[refIdxLN1]) smaller than 0 may mean that one of the L0 reference picture and the L1 reference picture may be temporally ahead of the current picture and the other one may be temporally behind the current picture. Accordingly, in this case, the L0 MVD and the L1 MVD may have different signs. The position temporally ahead may mean a small POC and the position temporally behind may mean a large POC. In the above-described embodiment, an MV scaling process may be added. That is, a process of scaling the signaled MV or the MV modified from the signaled MV (for example, the MV having the opposite sign) may be added.

[Table 16] below shows an MMVD syntax structure according to an embodiment of the present invention.

TABLE 16

|  | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \| \| treeType = = DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \| \| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       mmvd_flag[ x0 ][ y0 ] | ae(v) |
|       if( mmvd_flag[ x0 ][ y0 ] = = 1 ) | |
|         mmvd_idx_coding ( x0, y0 ) | |
|       else if( subblock_merge_flag[ x0 ][ y0 ] = = 0 & MaxNumMergeCand > 1 ) | |
|         merge_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         mmvd_flag[ x0 ][ y0 ] | ae(v) |
|         if( mmvd_flag[ x0 ][ y0 ] = = 1 ) | |
|           mmvd_idx_coding ( x0, y0 ) | |
|         else if( subblock_merge_flag[ x0 ][ y0 ] = = 0 && MaxNumMergeCand > 1 ) | |
|           merge_idx[ x0 ][ y0 ] | ae(v) |
|       } else { | |
|         if( slice_type = = B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|       // ... | |
| } | |

According to an embodiment of the present invention, signaling indicating whether to use (or apply) the MMVD described in FIG. 21 may exist. Referring to [Table 16], the MMVD flag (that is, mmvd_flag) indicates a syntax element indicating whether the MMVD is used. For example, the MMVD may be applied to a skip mode or a merge mode. In an embodiment, when the MMVD is used, the decoder may parse MMVD-related syntax. When the MMVD is used, MMVD-related information may be additionally parsed in MMVD index coding (that is, mmvd_idx_coding) syntax.

As an embodiment, when the MMVD is not used, the decoder may parse a merge index. Referring to [Table 16], the merge index (that is, merge_idx) indicates a syntax element indicating a specific merge candidate in a merge candidate list. Further, in the case of the merge mode which is not the skip mode, the MMVD flag may be parsed when a merge flag is 1 after the merge flag (that is, the merge flag) is parsed. The merge flag may indicate whether to use (or apply) the merge mode or a subblock merge mode. The merge flag may indicate that an AMVP, an inter mode, an affine inter mode, and the like are not used. In this embodiment, the merge index may be an index different from the base candidate index described in FIG. 21.

According to an embodiment of the present invention, signaling indicating the maximum number of merge candidates may exist. Signaling indicating the maximum number of merge candidates may be performed in units larger than CUs or prediction units. For example, signaling indicating the maximum number of merge candidates may be performed in units of slices or tiles. When a condition based on signaling indicating the maximum number of merge candidates is satisfied, the decoder may parse a merge index. As an embodiment, when a value of a syntax element indicating the maximum number of merge candidates indicates that the maximum number of merge candidates is 1, the encoder/decoder may infer that the merge index is 0. That is, when signaling indicating the maximum number of merge candidates indicates that the maximum number of merge candidates is 1, the candidate may be determined without any parsing of the merge index.

Referring to [Table 16], MaxNumMergeCand corresponding to a value (variable or parameter) based on signaling indicating the maximum number of merge candidates may be defined. MaxNumMergeCand may refer to the maximum number of merge candidates. MaxNumMergeCand may have a value larger than or equal to 1. The maximum number of merge candidates for a signaling unit indicating the maximum number of merge candidates may be determined based on the maximum number of supportable merge candidates and signaling indicating the maximum number of merge candidates. For example, the encoder/decoder may determine the maximum number of merge candidates for the signaling unit indicating the maximum number of merge candidates by subtracting a signaling value indicating the maximum number of merge candidates from the maximum number of supportable merge candidates. Although only the maximum number of merge candidates has been described, the maximum number of subblock merge candidates and the maximum number of signalings may substantially identically exist.

In an embodiment, the merge index may be parsed when the skip mode or the merge mode is used. The decoder may parse the merge index when a condition using the skip mode or the merge mode is satisfied. For example, when the subblock merge mode is not used, the encoder/decoder may use the skip mode or the merge mode. In [Table 16] above, the merge index may be parsed after the MMVD flag is parsed. This may consider the MMVD in preference to the conventional skip mode or merge mode. Further, a subblock merge flag (that is, subblock_merge_flag) or a merge subblock flag (that is, merge_subblock_flag) syntax element indicating whether the subblock merge mode is used may be signaled.

FIG. 22 illustrates an MMVD-related syntax structure according to an embodiment of the present invention. The embodiment described above in [Table 16] may be identically applied to FIG. 22, and an overlapping description related thereto is omitted. Syntax illustrated in FIG. 22 additionally includes a process related to subblock merge compared to [Table 16]. In FIG. 22 and the following drawings (that is, FIGS. 23 to 31), the descriptions related to the intra prediction process, the inter mode of inter prediction, the AMVP mode, the affine inter mode, and the like may be omitted. Although the decoder is mainly described in FIG. 22 for convenience of the description, the coding process according to present embodiment may be applied to the encoder through substantially the same method.

According to an embodiment of the present invention, the decoder may parse the subblock merge flag earlier than the MMVD flag and/or the merge index. This is to consider the subblock merge mode in preference to at least one of the skip mode, the merge mode, and/or the MMVD. When the subblock merge mode is not used, the decoder may parse the MMVD flag and/or the merge index. For example, the decoder may first parse the subblock merge flag than the MMVD flag, and may parse the MMVD flag when the subblock merge mode is not applied. Since motion compensation is performed in units of subblocks that are of relatively small size in the subblock merge mode, the accuracy of motion prediction may be high and the improvement of the MV using one MVD may not be effective due to the characteristic of subblock-based motion compensation. According to an embodiment of the present invention, compression efficiency can be increased by identifying whether the MMVD is applied to the case in which the subblock merge mode is not applied, and such a purpose may be achieved by configuring a parsing order of syntax (or syntax elements) (that is, first parsing the subblock merge flag than the MMVD flag).

FIG. 23 illustrates an MMVD-related syntax structure according to an embodiment of the present invention. Syntax (or functions) illustrated in FIG. 23 may indicate syntax for parsing MMVD information indicated in [Table 16], FIG. 22, and MMVD-related syntax described below. As described with reference to FIG. 21, the MMVD may be determined based on a base motion vector, a distance, and a direction. Indexes (or syntax elements) for signaling the information may be defined. Referring to FIG. 23, the syntax elements for signaling the base motion vector, the distance, and the direction may be defined as base_mv_idx, distance_idx, and direction_idx. When it is determined to use the MMVD as described in [Table 16] and FIG. 22, syntax elements indicating detailed MMVD values illustrated in FIG. 23 may be signaled from the encoder to the decoder. Although the decoder is mainly described in FIG. 23 for convenience of the description, the coding process according to the present embodiment may be applied to the encoder through substantially the same method.

FIG. 24 illustrates an MMVD-related syntax structure according to an embodiment of the present invention. Syntax (or functions) illustrated in FIG. 24 may indicate syntax for parsing MMVD information indicated in [Table 16], FIG. 22, and MMVD-related syntax described below. According to an embodiment of the present invention, some of the MMVD-related syntax may be parsed when a predefined specific condition is satisfied. For example, when the predefined specific condition is satisfied after it is determined to use the MMVD, the decoder may parse some of the MMVD-related syntax. In an embodiment, some of the MMVD-related syntax may be base motion vector-related signaling. The determination that the MMVD is used may be based on an MMVD flag value. When the MMVD flag is parsed or the MMVD flag is inferred and indicates a specific value (for example, 1), it may be determined to use the MMVD. Although the decoder is mainly described in FIG. 24 for convenience of the description, the coding process according to the present embodiment may be applied to the encoder through substantially the same method.

According to an embodiment of the present invention, the specific condition may be related to the maximum number of available base motion vector candidates. For example, the decoder may parse base motion vector-related syntax when the maximum number of available base motion vector candidates is larger than or equal to 2, and may not parse base motion vector-related syntax when the maximum number of available base motion vector candidates is 1. When the base motion vector-related syntax does not exist, the decoder may infer the value. In this case, it may be inferred that the base motion vector-related syntax is 0. When the base motion vector candidate is the merge candidate, the decoder may determine whether to parse the base motion vector-related syntax using a condition based on the maximum number of available merge candidates.

As described above, the maximum number of available base motion vector candidates may be a value indicated by signaling indicating the maximum number of merge candidates described in [Table 16], and the value may be expressed as MaxNumMergeCand.

Referring to FIG. 24, the decoder may parse the base motion vector index only when MaxNumMergeCand indicating the maximum number of merge candidates is larger than 1. If there is no base motion vector index, for example, when the base motion vector index has not been parsed and thus does not exist, the decoder may infer that the value is 0. This is because the determination may be performed even though signaling is not performed when the maximum number of available candidates is 1.

FIG. 25 illustrates MMVD syntax according to an embodiment of the present invention. In the case of the syntax structure illustrated in FIG. 22, the MMVD flag is always parsed even when the skip mode or the merge mode is used without using the MMVD. Further, in both cases in which the MMVD is used and is not used, the base motion vector index or the merge index is parsed. Meanwhile, the MMVD flag may not be parsed when the skip mode or the merge mode is used without using the MMVD in the embodiment of FIG. 25. Although the decoder is mainly described in FIG. 25 for convenience of the description, the coding process according to the present embodiment may be applied to the encoder through substantially the same method.

According to an embodiment of the present invention, the base motion vector-related syntax and the merge index may be defined as the same value. For example, the base motion vector index and the merge index may be the same as each other. That is, signaling for indicating the corresponding candidate through one syntax element may be performed. Further, according to an embodiment of the present invention, the decoder may parse base motion vector-related syntax and parse the MMVD flag according to the condition. When the MMVD flag indicates that the MMVD is used, MMVD-related syntax as well as the base motion vector-related syntax may be parsed.

For example, after the merge index is parsed, it may be identified whether the corresponding candidate is a candidate which can be used for the MMVD. The MMVD flag may be parsed when the candidate can be used for the MMVD, and the MMVD flag may not be parsed when the candidate cannot be used for the MMVD. When the MMVD flag does not exist, it may be inferred that the MMVD is not used. For example, when the number of base motion vectors of the MMVD can be num_mmvd_baseCand in the front of the merge candidate list (in a direction of the small index), if parsed indexes are smaller than num_mmvd_baseCand, the MMVD flag may be parsed. Otherwise, it may be determined that the MMVD is not used without parsing the MMVD flag. In this case, if num_mmvd_baseCand candidate indexes or more are used, there is an advantage of reducing bits for the MMVD flag.

Referring to FIG. 25, after the merge index is parsed, the MMVD flag is parsed when the merge index is smaller than num_mmvd_baseCand. num_mmvd_baseCand may be the number of candidates available for the base motion vector of the MMVD. Further, the base motion vector index of the MMVD may be determined based on the merge index.

FIG. 26 illustrates MMVD syntax according to an embodiment of the present invention. Referring to FIG. 26, the MMVD flag may be positioned at a higher location than the merge flag. For example, the decoder may determine whether to parse the merge flag based on the MMVD flag. For example, this may be applied to the case that is not the skip mode. Although the decoder is mainly described in FIG. 26 for convenience of the description, the coding process according to the present embodiment may be applied to the encoder through substantially the same method.

According to an embodiment of the present invention, when the MMVD flag indicates that the MMVD is used, the merge flag may not be parsed. For example, a base motion vector candidate of the MMVD may be determined from merge candidates, and the decoder may not parse the merge flag when the MMVD flag indicates that the MMVD is used. When the MMVD is used (MMVD flag is 1), it may be inferred from the merge flag that the merge mode is used. Referring to FIG. 26, when the skip mode is used, that is, when cu_skip_flag is 1, the decoder may infer that the merge flag is 1 regardless of the use of the MMVD. Further, when the merge flag does not exist and the skip mode is not used, it may be inferred that the merge flag is 1 if the MMVD is used, and that the merge flag is 0 if the MMVD is not used.

Alternatively, in an embodiment, the decoder may infer that the merge flag is 1 when the merge flag does not exist and the skip mode is not used. Further, referring to FIG. 26, in the case that is not the skip mode, the decoder may parse MMVD-related syntax if the MMVD flag is 1, and parse the merge flag if the MMVD flag is 0.

According to an embodiment of the present invention, when the subblock merge flag is positioned higher than the merge flag and the subblock merge flag is 1, the merge flag may not be parsed and it may be inferred that the merge flag is 1. When the subblock merge flag is positioned higher than the MMVD flag and the subblock merge flag is 1, the MMVD flag may not be parsed and it may be inferred that the MMVD flag is 0. In this specification, 1 of modeX_flag may mean that modeX is used, and 0 of modeX_flag may mean that modeX is not used.

FIG. 27 illustrates MMVD syntax according to an embodiment of the present invention. According to an embodiment of the present invention, the MMVD may be always used for some candidates in a candidate list used as the base motion vector candidates of the MMVD. For example, when the base motion vector candidate of the MMVD is determined from the merge candidate list, the MMVD may be always used for some of the merge candidate list. For example, the MMVD may be always used for a predetermined candidate index. For example, when the candidate index is smaller than a preset value, the MMVD may be always used. In this case, whether to use the MMVD may be determined from the candidate index. Further, MMVD flag parsing may not exist.

For example, after the merge index is parsed, when the merge index corresponds to a value indicating that the MMVD is used, it may be determined to use the MMVD. Further, in this case, MMVD-related syntax (for example, distance, direction, signaling, and the like) may be parsed. Although the decoder is mainly described in FIG. 27 for convenience of the description, the coding process according to the present embodiment may be applied to the encoder through substantially the same method. Referring to FIG. 27, the MMVD may be always used until num_mmvd_baseCand candidates in the front of the merge candidate list. In this case, when the candidate index is smaller than num_mmvd_baseCand, it may be determined to use the MMVD and MMVD-related syntax may be parsed.

FIG. 28 illustrates MMVD syntax according to an embodiment of the present invention. According to an embodiment of the present invention, the decoder may always use the MMVD for some candidates in a candidate list used as the base motion vector candidates of the MMVD. For example, when the base motion vector candidate of the MMVD is determined from the merge candidate list, the decoder may always use the MMVD for some candidates in the merge candidate list. For example, the decoder may always use the MMVD for a predetermined candidate index. For example, when the candidate index is smaller than a preset value, the MMVD may be always used. Although the decoder is mainly described in FIG. 27 for convenience of the description, the coding process according to the present embodiment may be applied to the encoder through substantially the same method.

According to an embodiment of the present invention, the MMVD flag may be positioned higher than the merge flag in a syntax structure (or in a syntax parsing order). In this case, when the MMVD flag is 1, the decoder may parse MMVD-related syntax. Further, when the MMVD flag is 1, it may be inferred that the merge flag is 1. When the MMVD flag is 0, the decoder may parse the merge flag. When the merge flag is 1, the decoder may parse the merge index. In this case, an additional condition for parsing the merge index may exist. As an embodiment, the decoder may determine a merge index to be actually used after modifying the same based on the parsed merge index. For example, the merge index to be actually used may be determined as a value obtained by adding the parsed merge index and the number of candidates for which the MMVD is always used among values smaller than the parsed merge index. For example, when it is determined to always use the MMVD for num_mmvd_baseCand candidates in the front of the candidate list, a value obtained by adding the parsed merge index and num_mmvd_baseCand may be used as the merge index. When the MMVD flag is ahead of the merge flag and the MMVD flag is 0, candidates using the MMVD may be excluded from the candidate list.

Referring to FIG. 27, the MMVD flag exists ahead of the merge flag. Further, when the MMVD flag is 1, the decoder may parse MMVD-related syntax. When the MMVD flag is 0, the decoder may parse the merge flag. When the MMVD flag is 0 and the merge flag is 1, the decoder may parse the merge index. In this case, an additional condition for parsing the index may exist. The merge index to be actually used may be determined by adding the parsed merge index and num_mmvd_baseCand corresponding to the number of candidates which can be used as the base motion vectors of the MMVD.

FIG. 28 illustrates MMVD syntax according to an embodiment of the present invention. According to an embodiment of the present invention, the candidate index may exist ahead of a flag indicating whether the candidate index uses a mode. For example, the candidate index may exist ahead of the MMVD flag or the merge flag. In this case, after the candidate index is parsed, it may be determined whether the MMVD flag is parsed according to whether the parsed index is a candidate which can use the MMVD. For example, the MMVD flag is parsed when the parsed candidate index is the candidate which can use the MMVD, and the MMVD flag is not parsed and it may be inferred that the MMVD flag is 0 when the passed candidate index is a candidate which cannot use the MMVD. Further, when the MMVD flag is 0, the merge flag may be parsed. Through the merge flag, it may be determined whether the merge mode, the subblock merge mode, the inter mode, the AMVP mode, or the affine inter mode is used. Although the decoder is mainly described in FIG. 28 for convenience of the description, the coding process according to the present embodiment may be applied to the encoder through substantially the same method.

For example, when the number of candidates available for the first mode is numb1 and the number of candidates available for the second mode is num2, and num1<num2, if the candidate is parsed and the parsed index is larger than or equal to num1, syntax for determining one of the first mode and the second mode (for example, syntax indicating whether to use the first mode) may be not be parsed and it may be inferred that the first mode is not used. When the parsed index is smaller than num1, syntax for determining one of the first mode and the second mode may be parsed.

Referring to FIG. 28, after the merge index is parsed, the MMVD flag may be parsed when the merge index is smaller than num_mmvd_baseCand corresponding to the number of candidates which can use the MMVD. When the merge index is larger than or equal to num_mmvd_baseCand, the MMVD flag may not be parsed and, in this case, it may be inferred that the MMVD flag is 0. When the MMVD flag is 1, a distance index (distance_idx) and a direction index (direction_idx) indicating an MMVD-related syntax element may be parsed. When the MMVD flag is 0, the merge flag is parsed, and accordingly, the merge mode, the subblock merge mode, the inter mode, the AMVP mode, or the affine mode may be identified.

FIG. 29 illustrates a coding unit syntax structure according to an embodiment of the present invention. As illustrated in FIG. 29, when the merge flag is 1, a merge data (that is, merge_data) parsing process may be performed. Although the decoder is mainly described in FIG. 29 for convenience of the description, the coding process according to the present embodiment may be applied to the encoder through substantially the same method. In an embodiment, the merge data may include a portion of merge-related syntax. Further, the merge data may be referred to as merge data syntax. For example, the merge data may include a syntax parsing process performed when the merge flag is 1 in FIGS. 21 to 28 described above. Further, 1 of the merge flag may mean that the merge mode is used. 1 of the merge flag may mean that inter prediction that does not use mvd_coding indicated by FIG. 6 and [Table 1] above is used.

FIG. 30 illustrates a merge data syntax structure according to an embodiment of the present invention. As described in FIG. 29, the decoder may parse (or call) merge data syntax when the merge flag is 1. Although the decoder is mainly described in FIG. 30 for convenience of the description, the coding process according to the present embodiment may be applied to the encoder through substantially the same method. Further, as described above, when the merge mode or the skip mode is used, the merge flag is configured as 1.

Referring to FIG. 30, in the merge data syntax, the MMVD flag may be first parsed among the syntax elements. The MMVD flag may be syntax which can be first parsed after it is identified that the merge flag is 1. The MMVD flag may be parsed earlier than signaling indicating whether another prediction mode is used in which the merge flag is configured as 1. The MMVD flag may be signaling indicating whether the MMVD is used. A method which is the same as the embodiment described in [Table 16], and FIGS. 22 to 29 may be applied. As illustrated in FIG. 30, the merge data syntax may include a decoding process for the subblock merge mode, the multi-hypothesis prediction (or intra and inter combined prediction), the triangle prediction, and the like.

According to an embodiment of the present invention, when predicted blocks are generated, the multi-hypothesis prediction may be a method of generating and combining two or more predicted blocks. Alternatively, when predicted blocks are generated, the multi-hypothesis prediction may be a method using both inter prediction and intra prediction. Further, when prediction is performed, the inter prediction and the intra prediction may be methods using pictures which are different from or the same as a picture included in the current block. Referring to FIG. 30, a multi-hypothesis prediction flag indicates a syntax element indicating whether multi-hypothesis prediction is used.

According to an embodiment of the present invention, when the current block (for example, a coding unit or a predicted unit) is predicted, the subblock merge mode may be a method of performing motion compensation in units of subblocks (that is, determining a motion vector in units of subblocks). According to an embodiment, the subblock merge mode may include methods such as subblock-based temporal MVP, affine motion prediction, and the like. Referring to FIG. 30, the merge subblock flag indicates a syntax element indicating whether the subblock merge mode is used.

Further, according to an embodiment of the present invention, the triangle prediction is a method of performing motion compensation on an area which is not a rectangle within the current block. That is, in the triangle prediction, the unit having the same motion vector within the current block may not be a rectangle. Referring to FIG. 30, a triangle prediction flag (that is, merge_triangle_flag) indicates a syntax element indicating whether the triangle prediction is used.

According to an embodiment of the present invention, the MMVD flag may be parsed earlier than signaling (or syntax element) indicating that another merge other than the MMVD is used. Signaling indicating that another merge other than the MMVD is used may include a multi-hypothesis prediction flag, a merge subblock flag, a merge triangle flag, and the like.

Referring to FIG. 30, an MMVD merge index (that is, mmvd_merge_idx)(or an MMVD index) indicates a syntax element indicating which is used as the base motion vector of the MMVD. If the MMVD is used, it may be inferred that the merge index is an MMVD merge flag (that is, mmvd_merge_flag)(or an MMVD flag).

FIG. 31 illustrates a merge data syntax structure according to an embodiment of the present invention. The embodiment of FIG. 31 may be a portion of the merge data syntax performed when a merge flag is 1. In FIG. 29 Although the decoder is mainly described in FIG. 31 for convenience of the description, the coding process according to the present embodiment may be applied to the encoder through substantially the same method. According to an embodiment of the present invention, the MMVD flag may be parsed later than the merge index. For example, the MMVD flag may be parsed right after the merge index. For example, the MMVD flag may not be parsed at the location that is not the front in merge data syntax. That is, after it is identified that the merge flag is 1, the MMVD flag may be parsed after other syntax that is not the MMVD flag is parsed.

Further, according to an embodiment of the present invention, as illustrated in FIG. 21, the base motion vector of the MMVD may be determined from another candidate list. As an embodiment, the base motion vector may be determined from a portion of another candidate list. Accordingly, as illustrated in FIG. 25, according to an embodiment, whether to parse the MMVD flag may be determined based on an index related to another candidate list which can be used as the base motion vector of the MMVD. For example, the index related to another candidate list which can be used as the base motion vector of the MMVD may be parsed earlier than the MMVD flag. When the index related to another candidate list indicates that another candidate list can be used as the base motion vector of the MMVD, the MMVD flag is parsed. Otherwise, it is possible to not parse the MMVD flag.

Referring to FIG. 31, the base motion vector of the MMVD may be determined from the merge candidate. Accordingly, as an embodiment, when the merge index indicates availability as the base motion vector of the MMVD, the MMVD flag is parsed. Otherwise, the MMVD flag may not be parsed. Alternatively, when the base motion vector of the MMVD can be selected from among n candidates in the front of the merge candidate list, the MMVD flag may be parsed if the merge index is smaller than n (the merge index may start from 0), and the MMVD flag may not be parsed if the merge index is not smaller than n. More specifically, the base motion vector of the MMVD can be a first or second candidate of the merge candidate list. Referring to FIG. 31, when the merge index is smaller than 2, that is, 0 or 1, the MMVD flag may be parsed. The merge index may indicate a merge candidate index. Accordingly, in spite of the merge mode, when the merge index indicates non-availability of the MMVD, the MMVD flag may not be parsed and, accordingly, coding efficiency may be improved.

Further, the base motion vector of the MMVD may be determined from a candidate list of any mode. According to an embodiment of the present invention, when a plurality of signalings indicating whether each mode is used exist, the MMVD flag may be parsed after it is determined to use the mode. For example, when it is assumed that there are a first mode, a second mode and a third mode, and the MMVD is determined based on the third mode, or the base motion vector of the MMVD is determined from candidates of the third mode, the MMVD flag may be parsed after it is determined to use the third mode. For example, it may be determined to use the third mode through signaling indicating whether the third mode is used. Alternatively, for example, when it is determined to not use the available modes other than the third mode, for example, the first mode and the second mode, it may be determined to use the third mode. For example, when the subblock merge mode, the multi-hypothesis prediction, the triangle prediction, the conventional merge mode, and the like exist, and the MMVD can be applied to the conventional merge mode, the MMVD flag may be parsed after it is determined to use the conventional merge mode of the above-listed modes and the MMVD. The conventional merge mode is a mode for performing inter prediction using motion information of a neighboring intra-coded block and may be a merge mode of the conventional video compression technology (for example, high efficiency video coding (HEVC)).

Further, when the MMVD flag is parsed based on the index related to another candidate list which can be used as the base motion vector of the MMVD, the separate existence of signaling indicating the base motion vector of the MMVD is not needed. For example, in FIG. 23 or FIG. 24, signaling such as the base motion vector index exists separately from the merge index. Further, referring to FIG. 30, the MMVD merge flag may be signaling indicating the base motion vector of the MMVD. According to an embodiment of the present invention, the MMVD merge flag may not exist like in FIG. 31. For example, MMVD-related syntax may include only the MMVD flag, signaling indicating the MMVD distance (mmvd_distance_idx in FIGS. 30 to 31), and signaling indicating the MMVD direction (mmvd_direction_idx in FIGS. 30 to 31). Further, the base motion vector of the MMVD may be determined by the merge index. Accordingly, signaling indicating the base motion vector of the MMVD of FIG. 30 and a context model thereof may not exist in the embodiment of FIG. 31.

According to an embodiment of the present invention, the MMVD flag may be parsed later than signaling indicating whether any merge mode other than the MMVD is used. Referring to FIG. 31, the MMVD flag may be parsed later than the merge subblock flag, the multi-hypothesis prediction flag (that is, mh_intra_flag), and the merge triangle flag (that is, merge_triangle_flag). Further, a specific merge mode may not be used together with the MMVD. In this case, when the flag indicating whether any merge mode is used indicates that the merge mode is not used, the MMVD flag may be parsed. Referring to FIG. 31, it is possible to not use the MMVD together with the triangle prediction, and the MMVD flag may be parsed when the merge triangle flag is 0. Alternatively, it is possible to not use the MMVD together with MH intra, and the MMVD flag may be parsed when mh_intra_flag is 0. Alternatively, it is possible to not use the MMVD together with the subblock merge mode, and the MMVD flag may be parsed when the merge subblock flag is 0.

FIG. 32 illustrates a merge data syntax structure according to an embodiment of the present invention. The embodiment of FIG. 32 may be a portion of the merge data syntax performed when a merge flag is 1 in FIG. 29. Although the decoder is mainly described in FIG. 32 for convenience of the description, the coding process according to the present embodiment may be applied to the encoder through substantially the same method.

According to an embodiment of the present invention, an MMVD flag may be parsed later than signaling indicating whether another mode is used. Alternatively, the MMVD flag may be parsed later than signaling indicating whether another mode which is not the MMVD in which the merge flag is configured as 1 is used. For example, the MMVD flag may be parsed later than a merge subblock flag, a multi-hypothesis prediction flag (that is, mh_intra_flag), and a merge triangle flag (that is, merge triangle flag).

Further, in an embodiment, the MMVD flag may be parsed when modes other than the MMVD are not used. For example, when the merge subblock flag is 0, the MMVD flag may be parsed. When the multi-hypothesis prediction flag is 0, the MMVD flag may be parsed. When the merge triangle flag is 0, the MMVD flag may be parsed. The value of 0 of the flag indicating which mode is used may mean that the mode is not used. When the MMVD can be applied to the conventional merge mode, the MMVD flag may be parsed after it is determined that the conventional merge mode or the MMVD is used.

Further, in an embodiment, MMVD-related syntax may be parsed when the MMVD is used, and the merge index may be parsed when the MMVD is not used. Alternatively, the decoder may parse an MMVD merge flat (that is, mmvd_merge_flag), an MMVD distance index (mmvd_distance_idx), and an MMVD direction index (mmvd_direction_idx) when the MMVD is used, and may parse a merge index when the MMVD is not used. Further, when the MMVD flag is parsed later than the flag indicating whether another mode is used as illustrated in FIG. 32, signaling indicating a base motion vector of the MMVD may exist as a syntax element separated from the merge index. Referring to FIG. 32, signaling indicating the base motion vector of the MMVD may be the MMVD merge flag. For example, the MMVD flag may be parsed after it is determined that the conventional merge mode or the MMVD is used.

According to an embodiment of the present invention, the base motion vector of the MMVD may be determined from any candidate list, and the maximum number of candidates in the candidate list may be variable. For example, the maximum number of candidates may be determined from higher level syntax. The higher level syntax may be syntax of a level higher than the current coding unit. For example, the higher level syntax may be syntax of a sequence, picture, slice, or tile level. According to an embodiment, in this case, the maximum number of candidates of the base motion vector of the MMVD may follow the maximum number of candidates in the candidate list which can become the base motion vector of the MMVD. Accordingly, when the maximum number of candidates in the candidate list which can become the base motion vector of the MMVD is reduced, the maximum number of candidates which can become the base motion vector of the MMVD may also be reduced.

In an embodiment, the base motion vector of the MMVD may be determined from the merge candidate list, and the maximum number of merge candidates may be MaxNumMergeCand. Further, MaxNumMergeCand may be determined from higher level syntax. In this case, the maximum number of merge candidates which can become the base motion vector of the MMVD may be equal to or lower than MaxNumMergeCand. Accordingly, as illustrated in FIG. 32, whether to parse signaling indicating the base motion vector of the MMVD may be determined according to MaxNumMergeCand. For example, when MaxNumMergeCand is 1, signaling indicating the base motion vector of the MMVD may not be parsed. When signaling indicating the base motion vector of the MMVD does not exist, it may be inferred that MaxNumMergeCand is 0.

In another embodiment, when MaxNumMergeCand is 1, the MMVD may not be used. This is to reduce signaling overhead for MMVD-related syntax. Accordingly, when MaxNumMergeCand is 1, the MMVD flag may not be parsed. Further, when the MMVD flag does not exist, it may be inferred that MaxNumMergeCand is 0. Referring to FIG. 32, the merge triangle flag may be parsed only when the multi-hypothesis intra prediction is not used. If the merge triangle flag does not exist, it may be inferred that MaxNumMergeCand is 0.

According to an embodiment of the present invention, a plurality of modes which cannot be used together may exist. For example, the subblock merge mode, the triangle prediction, the multi-hypothesis intra prediction, and the MMVD may not be used together. Signalings indicating whether each of the plurality of modes which cannot be used together is used may be parsed according to a preset order. In this case, signalings indicating whether any mode of the plurality of modes is used may be parsed only when it is determined that signalings indicating other modes of the plurality of modes parsed therebefore are used all indicate that the other modes are not used.

Figure 33:
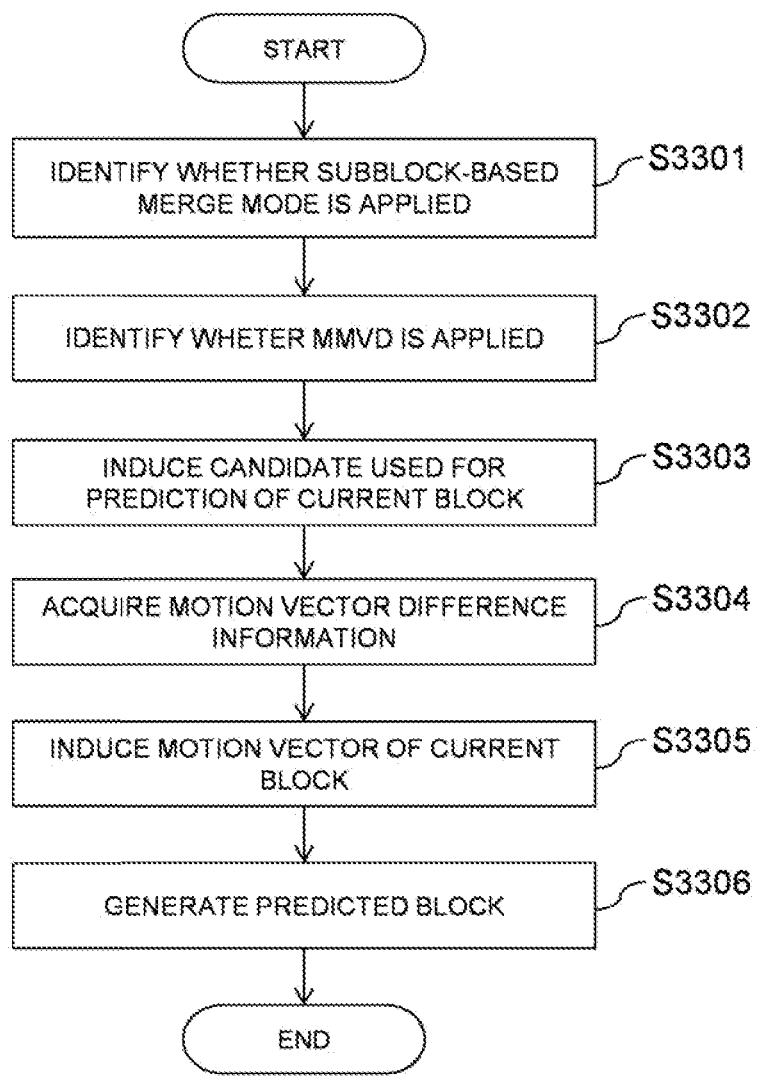
FIG. 33 illustrates a method of processing a video signal according to an embodiment to which the present invention is applied.

FIG. 33 illustrates a method of processing a video signal according to an embodiment to which the present invention is applied. Referring to FIG. 33, although the description is made mainly for the decoder for convenience of the description, the present invention is not limited thereto, and the multi-hypothesis prediction-based video signal processing method according to the present embodiment may be applied to the encoder through substantially the same method.

The decoder acquires a first syntax element indicating whether a subblock-based merge mode is applied to a current block in S3301. As described above, as an embodiment, the first syntax element may be a subblock merge flag (or a merge subblock flag).

When the first syntax element indicates that the subblock-based merge mode is not applied to the current block, the decoder acquires a second syntax element indicating whether the merge mode using a motion vector difference is applied to the current block in S3302. As described above, as an embodiment, the second syntax element may be an MMVD flag (or an MMVD merge flag).

When the second syntax element indicates that the merge mode using the motion vector difference is applied to the current block, the decoder acquires a third syntax element indicating a candidate used for inter prediction of the current block among candidates included in a merge candidate list of the current block in S3303. As described above, as an embodiment, the third syntax element may be an MMVD index (or an MMVD candidate index or an MMVD candidate flag).

The decoder acquires information related to the motion vector difference in S3304. As described above, as an embodiment, a step of acquiring the information related to the motion vector difference may include a step of acquiring a fourth syntax element indicating a distance of the motion vector difference and a step of acquiring a fifth syntax element indicating a direction of the emotion vector difference. As described above, as an embodiment, the fourth syntax element may be a distance index (or an MMVD distance index), and the fifth syntax element may be a direction index (or an MMVD direction index).

The decoder may induce a motion vector of the current block by adding a motion vector of the candidate indicated by the third syntax element and the motion vector difference in S3305.

The decoder generates a predicted block of the current block using the motion vector of the current block in S3306.

As described above, as an embodiment, the third syntax element may indicate a candidate used for inter prediction of the current block among a first candidate and a second candidate in a merge candidate list of the current block.

As described above, as an embodiment, the third syntax element may be parsed from a bitstream when the maximum number of merge candidates is larger than 1, and may be inferred as 0 when the maximum number of merge candidates is not larger than 1.

As described above, as an embodiment, when the first syntax element indicates that the subblock-based merge mode is applied to the current block, a step of acquiring a sixth syntax element indicating a candidate used for the inter prediction of the current block among candidates included in a subblock merge candidate list of the current block may be further included, and the motion vector of the current block may be induced in units of at least one subblock included in the current block, based on a motion vector of the candidate indicated by the sixth syntax element when the first syntax element indicates that the subblock-based merge mode is applied to the current block. As described above, as an embodiment, the sixth syntax element may be a subblock merge index (or a merge subblock index).

As described above, as an embodiment, when the first syntax element indicates that the subblock-based merge mode is applied to the current block, it may be inferred that the second syntax element is 0.

As described above, as an embodiment, the sixth syntax element may be parsed from a bitstream when a maximum number of subblock merge candidates is larger than 1, and it may be inferred that the sixth syntax element is 0 when the maximum number of subblock merge candidates is not larger than 1.

The embodiments of the present invention may be implemented through various means. For example, the embodiments of the present invention may be implemented by hardware, firmware, software, or a combination thereof.

In implementation by hardware, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, and the like.

In implementation by firmware or software, the method according to the embodiments of the present invention may be implemented in the form of a module, a procedure, a function, or the like for performing functions or operations described above. Software code may be stored in a memory and executed by a processor. The memory may be located inside or outside the processor, and may exchange data with the processor through already known various means.

Some embodiments may be implemented in the form of a recording medium including instructions executable by a computer, such as a program module executed by a computer. A computer-readable medium may be a random available medium which can be accessed by a computer, and includes all of volatile and nonvolatile media and separable and nonseparable media. Further, the computer-readable medium may include all of computer storage media and communication media. The computer storage media include all of volatile, nonvolatile, separable, and nonseparable media implemented by a random method or technology for storing information, such as computer-readable instructions, data structures, program modules, or other data. The communication media include computer-readable instructions, data structures, other data of modulated data signals such as program modules, or other transmission mechanism, and include a random information transfer medium.

The description according to the present invention is only for an example, and it may be understood by those skilled in the art that embodiments of the present invention can be easily changed into other detailed forms without departing from the technical idea or necessary features of the present invention. Therefore, the above-described embodiments should be construed as examples in all aspects and not be restrictive. For example, each element mentioned in a singular form may be implemented in a distributed manner, and also elements mentioned in a distributed form may be implemented in a combination form.

The scope of the present invention is defined by the appended claims rather than the detailed description. The meaning and scope of the claims and all modifications or modified forms derived from the concept of equivalents thereof should be construed to be included in the scope of the present invention.

What is claimed is:

1. A method of processing a video signal, the method comprising:

acquiring a first syntax element indicating whether a subblock-based merge mode is applied to a current block;

when the first syntax element indicates that the subblock-based merge mode is not applied to the current block, acquiring a second syntax element indicating whether a merge mode using a motion vector difference is applied to the current block;

when the second syntax element indicates that the merge mode using the motion vector difference is applied to the current block, acquiring a third syntax element indicating a candidate used for inter prediction of the current block among candidates included in a merge candidate list of the current block, acquiring a fourth syntax element indicating a distance of the motion vector difference, acquiring a fifth syntax element indicating a direction of the motion vector difference, and inducing a motion vector of the current block by adding the motion vector difference to a motion vector of the candidate indicated by the third syntax element, wherein the third syntax element indicates the candidate used for the inter prediction of the current block among a first candidate and a second candidate of the merge candidate list of the current block;

when the first syntax element indicates that the subblock-based merge mode is applied to the current block, inducing the motion vector of the current block without parsing the second syntax element; and generating a predicted block of the current block using the motion vector of the current block.

2. The method of claim 1, wherein the third syntax element is parsed from a bitstream when a maximum number of merge candidates is larger than 1, and it is inferred that the third syntax element is 0 when the maximum number of merge candidates is not larger than 1.

3. The method of claim 1, further comprising acquiring a sixth syntax element indicating a candidate used for the inter prediction of the current block among candidates included in a subblock merge candidate list of the current block when the first syntax element indicates that the subblock-based merge mode is applied to the current block, wherein the motion vector of the current block is induced in units of at least one subblock included in the current block, based on a motion vector of the candidate indicated by the sixth syntax element when the first syntax element indicates that the subblock-based merge mode is applied to the current block.

4. The method of claim 3, wherein, when the first syntax element indicates that the subblock-based merge mode is applied to the current block, it is inferred that the second syntax element is 0.

5. The method of claim 3, wherein the sixth syntax element is parsed from a bitstream when a maximum number of subblock merge candidates is larger than 1, and it is inferred that the sixth syntax element is 0 when the maximum number of subblock merge candidates is not larger than 1.

6. A method of processing a video signal, the method comprising:
   encoding a first syntax element indicating whether a subblock-based merge mode is applied to a current block;
   when the first syntax element indicates that the subblock-based merge mode is not applied to the current block, encoding a second syntax element indicating whether a merge mode using a motion vector difference is applied to the current block;
   when the second syntax element indicates that the merge mode using the motion vector difference is applied to the current block, encoding a third syntax element indicating a candidate used for inter prediction of the current block among candidates included in a merge candidate list of the current block, and encoding information related to the motion vector difference for inducing a motion vector of the current block by adding the motion vector difference to a motion vector of the candidate indicated by the third syntax element, wherein the third syntax element indicates the candidate used for the inter prediction of the current block among a first candidate and a second candidate of the merge candidate list of the current block, wherein encoding information related to the motion vector difference includes encoding a fourth syntax element indicating a distance of the motion vector difference and a fifth syntax element indicating a direction of the motion vector difference;
   when the first syntax element indicates that the subblock-based merge mode is applied to the current block, inducing the motion vector of the current block without encoding the second syntax element; and
   generating a predicted block of the current block using the motion vector of the current block.

7. A non-transitory computer-readable medium storing a bitstream, the bitstream being decoded by a decoding method,
   wherein the decoding method, comprising:
   acquiring a first syntax element indicating whether a subblock-based merge mode is applied to a current block;
   when the first syntax element indicates that the subblock-based merge mode is not applied to the current block, acquiring a second syntax element indicating whether a merge mode using a motion vector difference is applied to the current block;
   when the second syntax element indicates that the merge mode using the motion vector difference is applied to the current block, acquiring a third syntax element indicating a candidate used for inter prediction of the current block among candidates included in a merge candidate list of the current block, acquiring a fourth syntax element indicating a distance of the motion vector difference, acquiring a fifth syntax element indicating a direction of the motion vector difference, and inducing a motion vector of the current block by adding the motion vector difference to a motion vector of the candidate indicated by the third syntax element, wherein the third syntax element indicates the candidate used for the inter prediction of the current block among a first candidate and a second candidate of the merge candidate list of the current block;
   when the first syntax element indicates that the subblock-based merge mode is applied to the current block, inducing the motion vector of the current block without parsing the second syntax element; and
   generating a predicted block of the current block using the motion vector of the current block.

* * * * *